United States Patent
Zhang et al.

[19]

[11] Patent Number: 5,955,854
[45] Date of Patent: Sep. 21, 1999

[54] POWER DRIVEN VENTING OF A VEHICLE

[75] Inventors: Jianjun Zhang, Nashua, N.H.; Cliff Chuang, Lowell, Mass.; John Z. W. Zhang; Peter J. Pan, both of Nashua, N.H.; James S. Li, Lowell, Mass.; Michael Yuan Lu; Ziqiang Chen, both of Nashua, N.H.; Chong Tian Wang, Lowell, Mass.; Yong Bo Shao, Providence, R.I.

[73] Assignee: Prospects Corporation, Tyngsboro, Mass.

[21] Appl. No.: 08/435,977

[22] Filed: May 5, 1995

Related U.S. Application Data

[63] Continuation-in-part of application No. 08/220,977, Mar. 31, 1994, abandoned, which is a continuation-in-part of application No. 08/210,240, Mar. 17, 1994, abandoned, which is a continuation-in-part of application No. 07/953,508, Sep. 29, 1992, abandoned, and a continuation-in-part of application No. 08/032,608, Mar. 17, 1993, abandoned.

[51] Int. Cl.$^6$ ...................................................... H02P 1/22
[52] U.S. Cl. ........................ 318/480; 318/264; 318/283; 318/445; 49/26; 49/28; 340/540; 340/901
[58] Field of Search ................................ 49/26, 29, 25, 49/28; 250/221, 342, 206.3, 341, 208.2, 206.1; 318/53, 28, 264, 266, 608, 444, 445, 480, 283; 340/540, 555, 556, 557, 904, 903, 435, 901

[56] References Cited

U.S. PATENT DOCUMENTS

| | | | |
|---|---|---|---|
| Re. 33,668 | 8/1991 | Gray | 250/221 |
| 1,306,701 | 6/1919 | Liston | 250/221 |
| 2,230,756 | 2/1941 | Lohry | 250/221 |
| 2,617,912 | 11/1952 | Colvin | 250/221 |
| 2,640,958 | 6/1953 | Davis | 250/221 |
| 2,693,355 | 11/1954 | Puccinelli | 250/221 |
| 2,731,588 | 1/1956 | McLeod | 250/221 |
| 2,748,687 | 6/1956 | Ballard | 250/221 |
| 2,753,508 | 7/1956 | Inman | 250/221 |
| 2,754,460 | 7/1956 | Goldman | 250/221 |
| 2,802,694 | 8/1957 | Murray | 250/221 |
| 2,823,346 | 2/1958 | Weber | 250/221 |
| 2,991,069 | 7/1961 | Onksen et al. | 250/221 |
| 2,994,525 | 8/1961 | Onksen et al. | 250/221 |
| 3,168,303 | 2/1965 | Skinner | 250/221 |
| 3,231,880 | 1/1966 | Stein | 250/221 |

(List continued on next page.)

FOREIGN PATENT DOCUMENTS

| | | | |
|---|---|---|---|
| 446-167 | 9/1991 | European Pat. Off. | 250/221 |
| 2821681 | 11/1979 | Germany | 250/221 |
| 4007-271 | 9/1991 | Germany | 250/221 |
| 4030607 | 4/1992 | Germany . | |
| 9302676 | 4/1993 | Germany | 250/221 |
| 42 26 134 | 2/1994 | Germany | 250/221 |
| 59-140299 | 1/1986 | Japan | 250/221 |
| 60-55942 | 9/1986 | Japan | 250/221 |
| 64-82827 | 10/1990 | Japan | 250/221 |
| 3-167464 | 7/1991 | Japan | 250/221 |
| 798634 | 2/1979 | Russian Federation | 250/221 |
| WO 87/08100 | 5/1987 | WIPO | 250/221 |
| WO 89/08952 | 9/1989 | WIPO | 250/221 |
| 94/08120 | 4/1994 | WIPO . | |

*Primary Examiner*—John W. Cabeca
*Attorney, Agent, or Firm*—Fish & Richardson P.C.

[57] ABSTRACT

An obstruction detection apparatus is provided for use in closing a power driven vent, such as a window, that is located in an opening. When the vent includes a first closing edge that moves as the vent is closed and the opening includes a second closing edge that is contacted by the first closing edge when the vent is in a fully closed position, the apparatus includes a detector configured to detect an obstruction at points all along the second closing edge without requiring contact between the obstruction and the vent and to deliver a detection signal when an obstruction is detected. A controller is connected to the detector for receiving the detection signal and delivering a corresponding alarm signal.

52 Claims, 50 Drawing Sheets

U.S. PATENT DOCUMENTS

| | | | |
|---|---|---|---|
| 3,299,571 | 1/1967 | Carpenter et al. | 250/221 |
| 3,307,095 | 2/1967 | Redmond, Jr. | 250/221 |
| 3,330,199 | 7/1967 | Campbell | 250/221 |
| 3,337,992 | 8/1967 | Tolson | 49/29 |
| 3,386,022 | 5/1968 | Redmond, Jr. | 49/29 |
| 3,391,268 | 7/1968 | Libby et al. | 49/29 |
| 3,601,675 | 8/1971 | Radtke | 49/29 |
| 3,627,082 | 12/1971 | Berkovitz | 187/52 |
| 3,646,890 | 3/1972 | Snyder | 104/1 |
| 3,662,491 | 5/1972 | Boyriven | 104/1 |
| 3,710,050 | 1/1973 | Richards | 104/1 |
| 3,727,348 | 4/1973 | Steinmann et al. | 104/1 |
| 3,747,053 | 7/1973 | Goes et al. | 104/1 |
| 3,793,772 | 2/1974 | Kouth | 104/1 |
| 3,802,479 | 4/1974 | Newell, III et al. | 104/1 |
| 4,028,690 | 6/1977 | Buckley et al. | 340/258 B |
| 4,107,941 | 8/1978 | Hamilton | 104/1 |
| 4,132,881 | 1/1979 | Ciarniello et al. | 219/203 |
| 4,139,801 | 2/1979 | Linares | 315/83 |
| 4,220,900 | 9/1980 | Mintz . | |
| 4,236,594 | 12/1980 | Ramsperger | 180/167 |
| 4,257,319 | 3/1981 | Kucharczyk . | |
| 4,266,124 | 5/1981 | Weber et al. | 250/221 |
| 4,274,226 | 6/1981 | Evans | 49/25 |
| 4,278,922 | 7/1981 | Grebe | 49/25 |
| 4,304,070 | 12/1981 | Musacchia | 49/25 |
| 4,338,526 | 7/1982 | Martin et al. | 49/25 |
| 4,347,465 | 8/1982 | Goertler et al. | 49/25 |
| 4,351,016 | 9/1982 | Felbinger | 49/25 |
| 4,354,155 | 10/1982 | Speidel et al. | 49/25 |
| 4,376,971 | 3/1983 | Landgraf et al. | 49/25 |
| 4,410,843 | 10/1983 | Sauer et al. | 49/25 |
| 4,452,009 | 6/1984 | Baumeler et al. | 49/25 |
| 4,453,112 | 6/1984 | Sauer et al. | 318/281 |
| 4,458,445 | 7/1984 | Sauer et al. | 49/25 |
| 4,458,446 | 7/1984 | Mochida et al. | 49/25 |
| 4,464,651 | 8/1984 | Duhame | 49/25 |
| 4,468,596 | 8/1984 | Kinzl | 49/25 |
| 4,471,274 | 9/1984 | Ross et al. | 49/25 |
| 4,478,049 | 10/1984 | Fukui et al. | 49/25 |
| 4,481,450 | 11/1984 | Watanabe et al. | 49/25 |
| 4,502,726 | 3/1985 | Adams | 49/25 |
| 4,514,631 | 4/1985 | Guscott | 250/342 |
| 4,533,901 | 8/1985 | Lederle . | |
| 4,544,865 | 10/1985 | Sharp | 318/53 |
| 4,546,845 | 10/1985 | Meyer et al. . | |
| 4,553,656 | 11/1985 | Lense | 192/142 R |
| 4,561,691 | 12/1985 | Kawai et al. . | |
| 4,571,584 | 2/1986 | Hetmann et al. | 49/72 |
| 4,575,662 | 3/1986 | Lehnhoff . | |
| 4,578,995 | 4/1986 | Meyer | 73/171 |
| 4,585,981 | 4/1986 | Zintler . | |
| 4,593,609 | 6/1986 | Nagatomo et al. | 98/2.01 |
| 4,621,223 | 11/1986 | Murakami et al. . | |
| 4,621,452 | 11/1986 | Deeg | 49/28 |
| 4,628,434 | 12/1986 | Tashiro et al. . | |
| 4,641,067 | 2/1987 | Iizawa et al. . | |
| 4,686,598 | 8/1987 | Herr . | |
| 4,692,751 | 9/1987 | Upton et al. | 340/602 |
| 4,733,081 | 3/1988 | Mizukami . | |
| 4,734,575 | 3/1988 | Wagli et al. | 250/221 |
| 4,736,097 | 4/1988 | Philipp | 250/221 |
| 4,740,701 | 4/1988 | Wuthrich et al. | 250/342 |
| 4,742,763 | 5/1988 | Holter et al. | 250/342 |
| 4,746,845 | 5/1988 | Mizuta et al. | 250/342 |
| 4,749,924 | 6/1988 | Watanabe et al. | 250/342 |
| 4,773,183 | 9/1988 | Okushima | 250/342 |
| 4,785,292 | 11/1988 | Kern et al. | 340/578 |
| 4,803,807 | 2/1989 | Stockermann et al. | 340/578 |
| 4,804,140 | 2/1989 | Cantrell | 340/578 |
| 4,808,894 | 2/1989 | Mizuta | 340/578 |
| 4,810,944 | 3/1989 | Chance | 340/578 |
| 4,815,046 | 3/1989 | Dorr | 367/95 |
| 4,818,866 | 4/1989 | Weber | 250/221 |
| 4,823,010 | 4/1989 | Kornbrekke et al. | 250/341 |
| 4,851,689 | 7/1989 | Hasegawa | 250/214 B |
| 4,852,469 | 8/1989 | Chuang | 98/2.01 |
| 4,861,089 | 8/1989 | Compeau et al. | 296/76 |
| 4,866,881 | 9/1989 | Morrow et al. | 49/25 |
| 4,870,333 | 9/1989 | Itoh et al. . | |
| 4,875,406 | 10/1989 | Holter et al. . | |
| 4,893,852 | 1/1990 | Harris et al. | 292/251.5 |
| 4,894,952 | 1/1990 | Trett et al. | 49/25 |
| 4,899,645 | 2/1990 | Wolfe et al. . | |
| 4,906,976 | 3/1990 | Guscott | 340/567 |
| 4,908,554 | 3/1990 | Chance | 340/567 |
| 4,909,044 | 3/1990 | Gudmundsen | 340/567 |
| 4,911,257 | 3/1990 | Kajimoto et al. | 340/567 |
| 4,912,748 | 3/1990 | Horii et al. | 340/567 |
| 4,922,168 | 5/1990 | Waggamon et al. | 340/567 |
| 4,924,166 | 5/1990 | Roussel | 318/608 |
| 4,926,170 | 5/1990 | Beggs et al. | 340/904 |
| 4,933,610 | 6/1990 | Memmola . | |
| 4,942,385 | 7/1990 | Kobayashi et al. | 340/556 |
| 4,942,806 | 7/1990 | Hwang | 340/556 |
| 4,943,757 | 7/1990 | Richter et al. | 340/556 |
| 4,944,116 | 7/1990 | Mewald | 340/556 |
| 4,952,855 | 8/1990 | Meins et al. | 340/556 |
| 4,956,591 | 9/1990 | Schierbeek et al. | 340/556 |
| 4,967,083 | 10/1990 | Kornbrekke et al. | 250/341 |
| 4,973,837 | 11/1990 | Bradbeer | 250/221 |
| 4,980,547 | 12/1990 | Griffin | 250/221 |
| 4,983,896 | 1/1991 | Sugiyama et al. . | |
| 4,990,783 | 2/1991 | Muller et al. | 250/353 |
| 5,040,411 | 8/1991 | Medzius | 73/73 |
| 5,046,851 | 9/1991 | Morgan | 356/375 |
| 5,047,620 | 9/1991 | Durvasula et al. | 250/208.2 |
| 5,053,592 | 10/1991 | Zuercher | 200/553 |
| 5,054,686 | 10/1991 | Chuang | 236/49.3 |
| 5,059,877 | 10/1991 | Teder | 318/444 |
| 5,062,065 | 10/1991 | Lampe . | |
| 5,069,000 | 12/1991 | Zuckerman . | |
| 5,074,073 | 12/1991 | Zwebner | 49/26 |
| 5,081,586 | 1/1992 | Barthel et al. | 346/424.05 |
| 5,103,085 | 4/1992 | Zimmerman | 250/221 |
| 5,122,796 | 6/1992 | Beggs et al. | 340/904 |
| 5,126,555 | 6/1992 | Hawryluk | 250/221 |
| 5,134,292 | 7/1992 | Segawa et al. | 250/342 |
| 5,142,152 | 8/1992 | Boiucaner | 250/341 |
| 5,149,921 | 9/1992 | Picado | 187/130 |
| 5,191,268 | 3/1993 | Duhame | 318/266 |
| 5,210,406 | 5/1993 | Beran et al. | 250/221 |
| 5,244,177 | 9/1993 | Cole et al. | 160/1 |
| 5,245,177 | 9/1993 | Schiller | 250/221 |
| 5,278,425 | 1/1994 | Bendicks . | |
| 5,323,637 | 6/1994 | Bendicks . | |
| 5,326,967 | 7/1994 | Herrmann et al. | 250/221 |
| 5,334,876 | 8/1994 | Washeleski et al. . | |
| 5,424,711 | 6/1995 | Muller et al. | 340/426 |
| 5,463,384 | 10/1995 | Juds | 340/903 |
| 5,506,567 | 4/1996 | Bichlmaier et al. | 340/555 |

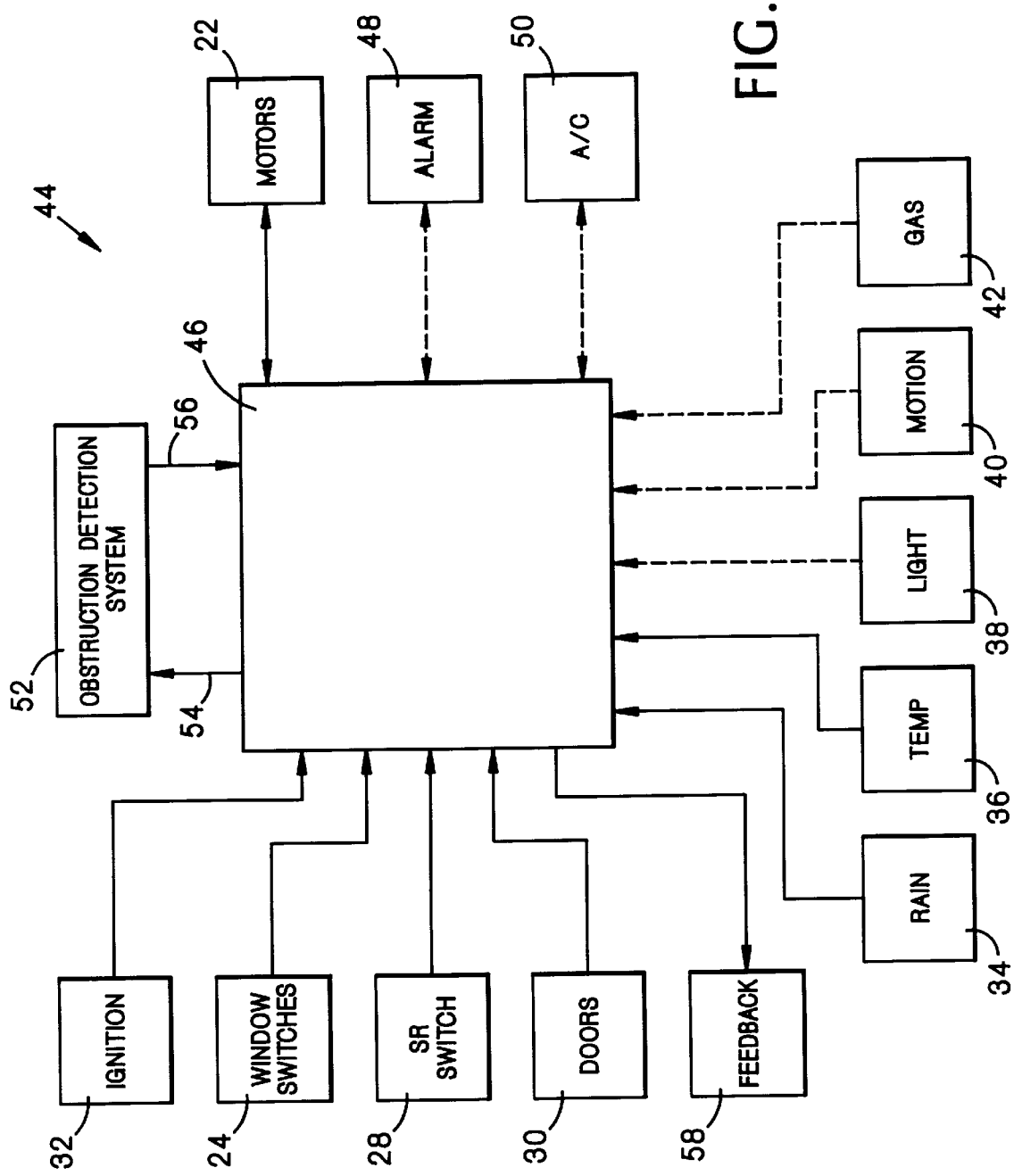

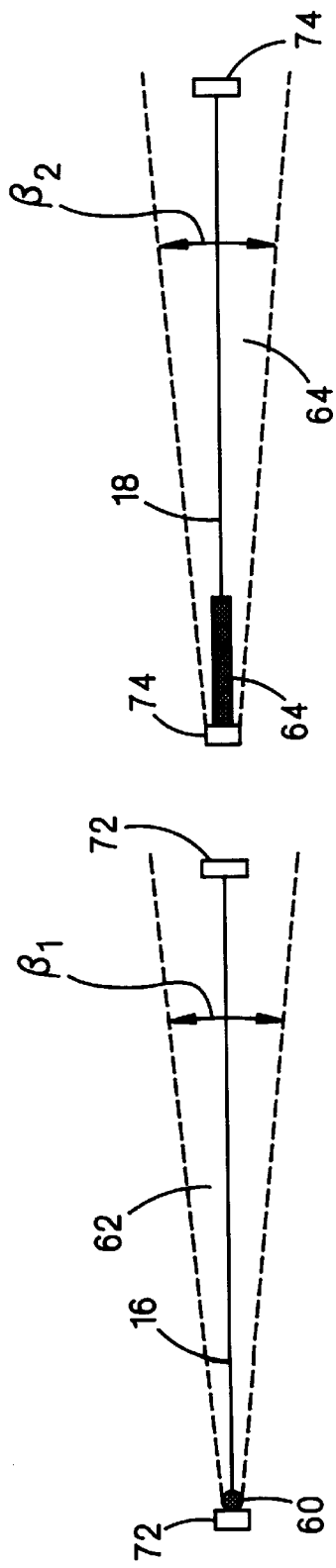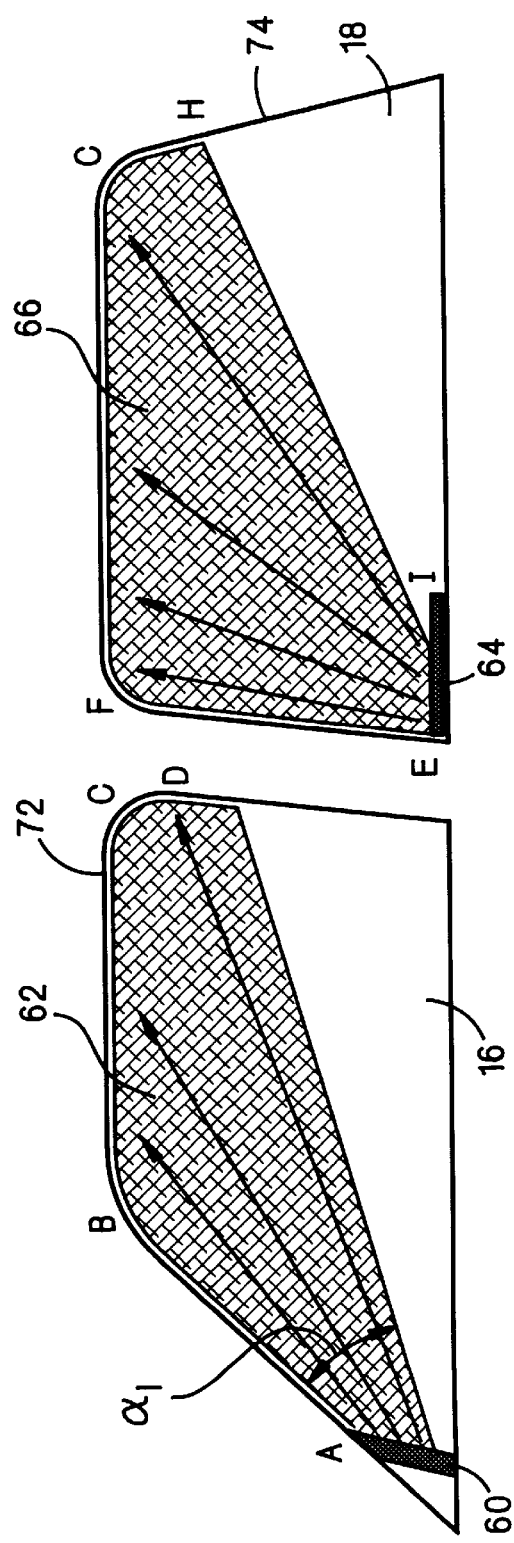
FIG. 5
FIG. 4

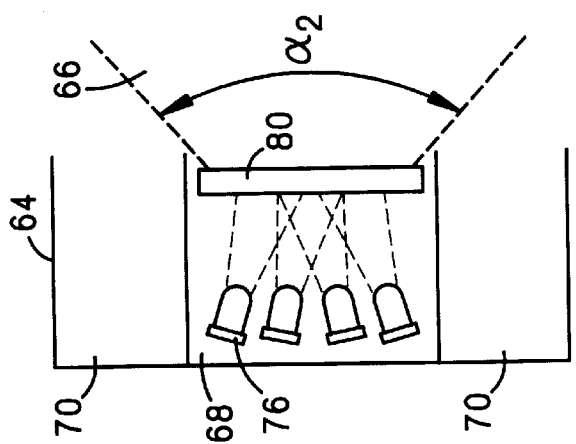
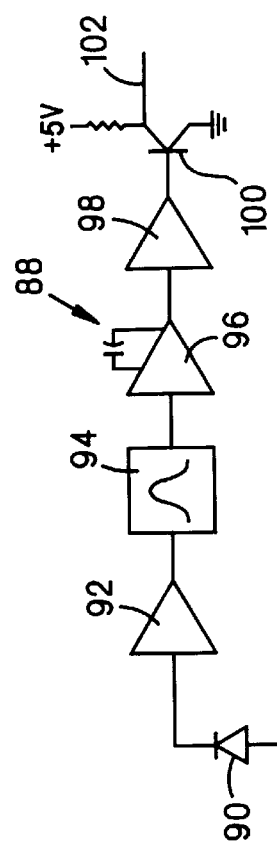
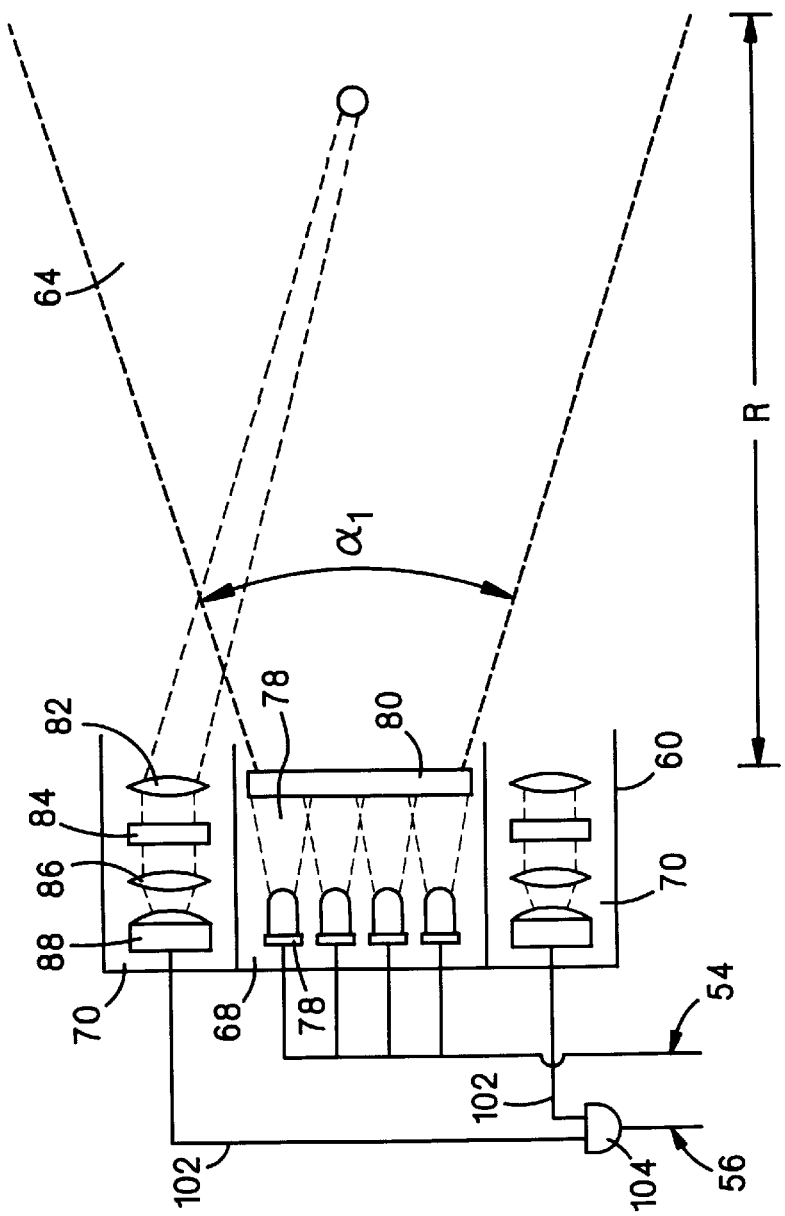
FIG. 8
FIG. 7
FIG. 6

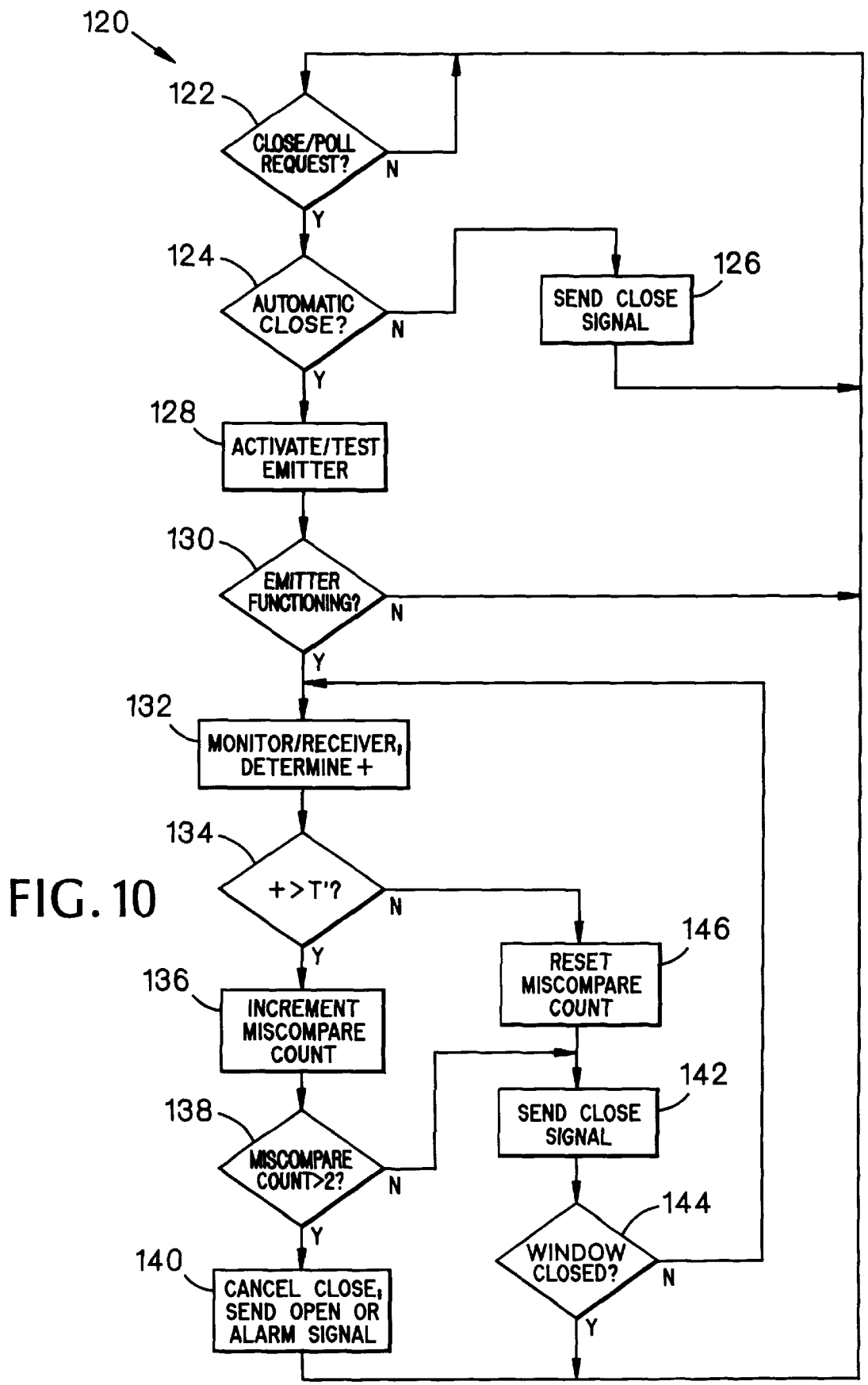

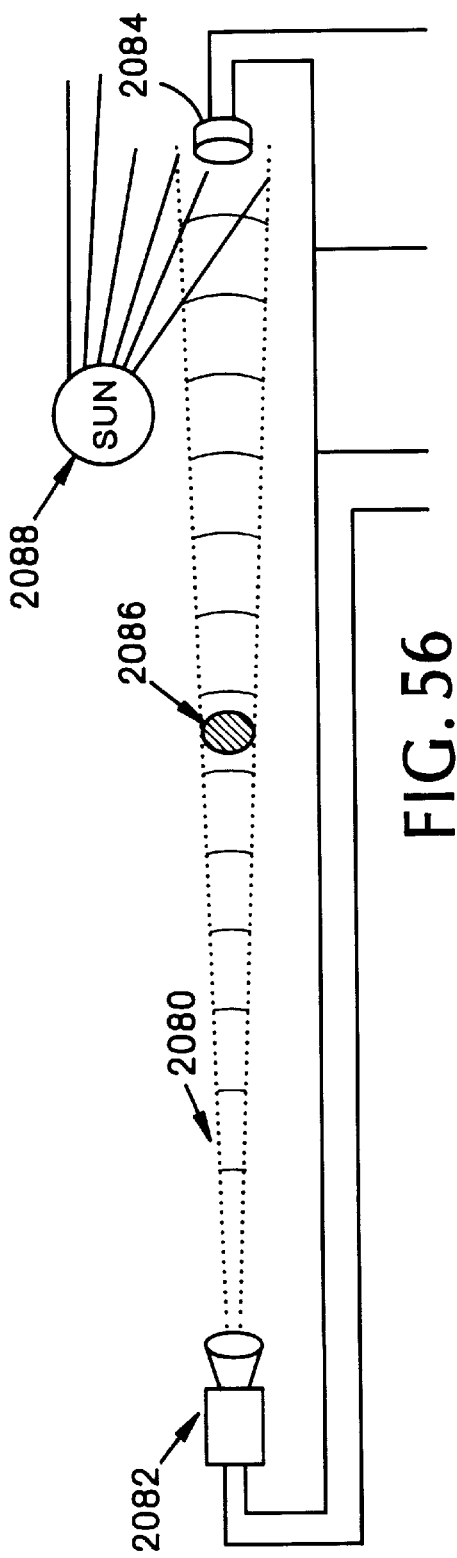
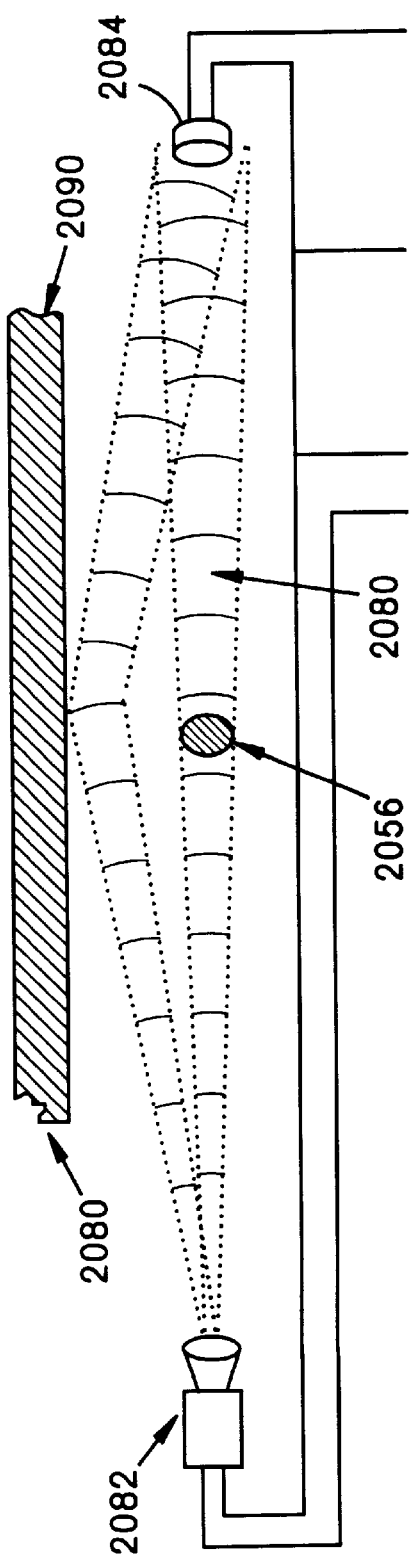

POWER DRIVEN VENTING OF A VEHICLE

CROSS REFERENCE TO RELATED APPLICATIONS

This application is a continuation in part of U.S. patent application Ser. No. 08/220,977, POWER DRIVEN VENTING OF A VEHICLE, which was filed Mar. 31, 1994, and is itself a continuation in part of U.S. patent application Ser. No. 08/210,240, POWER DRIVEN VENTING OF A VEHICLE, which was filed Mar. 17, 1994, and is itself a continuation in part of U.S. patent application Ser. No. 07/953,508, IMPROVED OBSTRUCTION DETECTION SYSTEM FOR A VEHICLE WINDOW, and U.S. patent application Ser. No. 08/032,608, entitled LASER DEVICE FOR OBSTRUCTION DETECTION, which were filed, respectively, on Sep. 29, 1992, and Mar. 17, 1993. Each of these applications is now abandoned and incorporated by reference.

BACKGROUND OF THE INVENTION

The invention relates to power driven venting of a vehicle.

Early automobiles for example, included stationary windows that allowed an occupant of the automobile to view regions outside of the automobile. Over time, these stationary windows evolved into adjustable windows that could be opened to provide ventilation to the interior of the automobile. The adjustable windows, which were initially hand lifted, were followed first by manually cranked windows, and then by the power operated windows commonly found in automobiles today.

Eventually, it was discovered that the power operated windows could be automatically opened to provide ventilation when the interior of the automobile became too hot and automatically closed when rain was detected. This automatic venting system, which is described in U.S. Pat. No. 4,852,469 and incorporated by reference, then evolved into the automobile environment management system described in U.S. Pat. No. 5,054,686 and also incorporated by reference.

SUMMARY OF THE INVENTION

In general, in one aspect, the invention features an obstruction detection technique for use in closing a power driven vent, such as a window, that is located in an opening. The vent includes a first closing edge that moves as the vent is closed and the opening includes a second closing edge that is contacted by the first closing edge when the vent is in a fully closed position. A detector is configured to detect an obstruction at points all along the second closing edge without requiring contact between the obstruction and the vent. When the detector detects such an obstruction, the detector delivers a detection signal to a controller. The controller receives the detection signal and delivers a corresponding alarm signal that is used, for example, to open the window. The technique ensures that powered vents such as windows or sunroofs can be automatically closed without risk of injury to children, pets, or other occupants of a vehicle in which the vents are installed.

Embodiments of the invention may include the following features. The detector may include an optical detector, an infrared detector, an ultrasound detector, or similar devices. The detector may deliver the detection signal in response to an increase in energy received at the detector, and there may also be an emitter that emits energy so that the detector delivers the detection signal in response to an increase or a decrease in a reflected portion of the energy produced by the emitter and received by the detector.

The detection signal may have a characteristic which represents the intensity of the energy received. For example, the detector may produce pulses having durations related to the intensity of the energy received by the detector and deliver the detection signal when the duration of one pulse exceeds a predetermined value, or when the durations of a predetermined number of consecutive pulses exceed the predetermined value. The predetermined value may be related to the duration of a pulse when no obstruction is present or the average duration of pulses produced when no obstruction is present and the vent moves between an opened position and a closed position. The predetermined value may include a correction factor that accounts for variations in the duration of pulses produced when no obstruction is present, and may vary based on the position of the vent. The predetermined value, or some other value indicative of an obstruction free opening, may be stored during an initialization procedure.

The detector and emitter may be included in an integral unit, which may be a compact unit in which the detector and the emitter share a common lens. The emitter may include a light emitting diode or a laser device. The emitter may also includes a lens that emits a fan shaped energy curtain.

There may also be a second detector configured to detect an obstruction at any point along the second closing edge without requiring contact between the obstruction and the vent and to deliver a second detection signal when an obstruction is detected. The first and second detectors may be arranged so that they are not caused to deliver the first and second detection signals as a result of energy received at the same time. There may also be a first emitter positioned to emit a first energy signal toward the first detector, and a second emitter positioned to emit a second energy signal toward the second detector, with the first and second emitters producing the first and second energy signals in an alternating manner, and the controller being connected to the second detector and to deliver the alarm signal in response to the first or second detection signals. The detectors may be configured so that, when the first emitter is emitting the first energy signal, the first detector delivers the first detection signal in response to a decrease in energy received at the first detector, and the second detector delivers the second detection signal in response to a decrease in energy received at the second detector, and when the second emitter is emitting the second energy signal, the first detector delivers the first detection signal in response to an increase in energy received at the first detector, and the second detector delivers the second detection signal in response to an increase in energy received at the second detector. The first detector may be screened from the second emitter and the second detector may be screened from the first emitter.

Automatic closing or opening of the vent may be initiated by a rain sensor, a temperature sensor, a motion sensor, or a light sensor. Closing of the vent may also be initiated by a manual switch.

In another aspect, generally, the invention features a technique for controlling power driven windows of an automobile. There are driver control switches accessible at the driver's position, separate passenger control switches accessible at a passenger position, and microprocessor control circuitry for responding to switching of the driver and passenger control switches for controlling the power driven windows. The microprocessor control circuitry is programmable in response to the driver control switches and separately programmable in response to the passenger control switches.

Embodiments of the invention may include one or more of the following features. The microprocessor control circuitry may respond to switching of the driver control switches when a conflict arises between the driver control switches and the passenger control switches. There may be passenger control switches located at two additional passenger positions and a lockout switch at the driver's position that, when active, causes the microprocessor control circuitry to ignore switching of the additional passenger control switches in response to the lockout switch. This feature could be used, for example, to disable window controls for the rear window of an automobile when children are present in the back seat.

The driver control switches need not be directly connected to the vent driving circuits, and the microprocessor controller may be located remotely from the driver control switches. The driver control switches may be connected to the microprocessor controller by 20 gauge or finer wire.

The technique provides failsafe operation in that it is designed so that a failure in the obstruction detection apparatus will prevent automatic vent closure. This ensures that a system failure will not result in injury. However, the apparatus also includes a manual switch that can override the obstruction detection features. Thus, in the event of a failure of the obstruction detection system, the vents can still be closed through the manual override.

In another aspect, generally, the invention features automatically opening a power driven vent, such as the sunroof or one or more windows, to an opening level specified by a user of the vehicle in response to the opening of a door of the vehicle to reduce air pressure build up when closing the door. Because the pressure build up can result in a back pressure on the door that increases the force necessary to close the door, the open vent, which reduces or eliminates the pressure build up, substantially reduces the force necessary to close the door. The opening level can be specified by pressing a switch at least one time, with each press of the switch changing the opening level by an incremental amount. This feature may also include automatically closing the vent after the doors are closed, and may further include detecting obstructions while automatically closing the vent without requiring contact between the obstruction and the vent. When an obstruction is detected, the vent is reopened, typically to the opening level. This feature may also include checking the obstruction detection system to verify that it is functioning properly before opening the vent, and only opening the vent if the obstruction detection system is functioning properly. In addition, the obstruction detection system can be checked prior to closing the vent, with the vent only being closed if the obstruction detection system is functioning properly. In this case, the obstruction detection system can be checked a predetermined number of times before giving up on closing the vent.

In another aspect, generally, the invention features monitoring the position of a power driven vent by a generating a count of current ripples in a circuit that moves the vent. This count can then be compared against a measure of the number of current ripples generated as the vent moves from a first known position to a second known position (e.g., from fully closed to fully open). The count of current ripples can be incremented as the vent is, for example, opening, and decremented as the vent is, for example, closing.

In another aspect, generally, the invention features a sensor for detecting an obstruction in an opening. The sensor includes an emitter operable to emit energy, a detector operable to detect energy emitted by the emitter and to deliver a detection signal in response to an increase in detected emitter energy, and control circuitry connected to the emitter and detector. The control circuitry is operable to control the emitter and the detector and, in response to the detection signal, to produce an output signal indicative of the detection of an obstruction. The emitter, detector and control circuitry are held in a housing.

Embodiments of the invention may include one or more of the following features. The emitter may be operable to emit energy as a fan-shaped beam, and may include a lens that is shaped to produce the fan shaped beam. The emitter may also include one or more light emitting diodes that may be spaced from the lens. The emitter and the detector may also share a common lens, where vertical sections of the common lens in a first dimension have upper surfaces that conform to circular arcs and vertical sections of the common lens in a second dimension have curved upper surfaces that do not conform to circular arcs. Typically, the common lens has a flat lower surface. The common lens may be made from an epoxy resin, and the detector may include a planoconvex lens formed from the epoxy resin. The planar side of this lens may be in contact with the common lens. The detector may also include a photo IC and a filter, with the filter positioned between the photo IC and a convex side of the plano-convex lens.

The control circuitry is operable to activate the emitter in response to an input signal. The control circuitry may also be operable to change a state of the output signal from a first state to a second state in response to an input signal, to change the state of the output signal from the second state to the first state when no obstruction is detected, and to maintain the state of the output signal in the second state when an obstruction is detected. The control circuitry may be operable to deliver the output signal along only a single wire and to receive an input signal along only a single wire.

The housing may be sized and configured for positioning in an opening of an automobile. In particular, the housing may be sized and configured for positioning in a window opening or door opening of an automobile. The sensor may include an external interface that includes only an input wire, an output wire, a power wire and a ground wire.

In another aspect, the invention features a method of indicating the presence of an obstruction in an opening by producing an output signal, changing the state of the output signal from a first state to a second state in response to an input signal, activating, in response to the input signal, an emitter operable to emit energy, detecting energy emitted by the emitter, delivering a detection signal in response to an increase in detected emitter energy, and controlling the state of the output signal to indicate the detection of an obstruction in response to the presence of absence of the detection signal. The method may also include changing the state of the output signal from the second state to the first state when no detection signal is delivered within a predetermined time period. Typically, the first and second states are the only possible states for the output signal, the output signal is produced on only one wire, and the input signal is received on a single wire.

In another aspect, the invention features a sensor for detecting an object in an opening of a structure, where the sensor includes a housing, an emitter held by the housing and configured to provide radiation across an area defined by the opening, a receiver held by the housing and positioned to receiver radiation reflected by an object present in the opening, an input connection and an output connection accessible from outside the housing, and a controller held by the housing. The controller is connected to the emitter, the receiver, the input connection and the output connection, and has circuitry that responds to a signal at the input connection by analyzing signals from the receiver and providing a signal at the output connection indicative of whether an object is present in the opening.

Other advantages and features will become apparent from the following description and from the claims.

BRIEF DESCRIPTION OF THE DRAWINGS

FIG. 4 is a side view of energy curtains produced by an obstruction detection system of the automatic window system of FIG. 3.

FIG. 5 is a top view of the energy curtains of FIG. 4.

FIG. 6 is a schematic of a front emitter/receiver unit of the system of FIG. 3.

FIG. 7 is a block diagram of a photo IC of a receiver of the emitter/receiver unit of FIG. 6.

FIG. 8 is a schematic of a rear emitter/receiver unit of the system of FIG. 3.

FIG. 10 is a flow chart of an obstruction detection procedure of the system of FIG. 3.

FIG. 56 is a schematic view showing ambient light from the sun interfering with reception at the receiver.

FIG. 57 is a view similar to FIG. 56 wherein the reflected radiation from the transmitter is interfering with the operation of the receiver.

DESCRIPTION OF THE PREFERRED EMBODIMENTS

Figure 1:
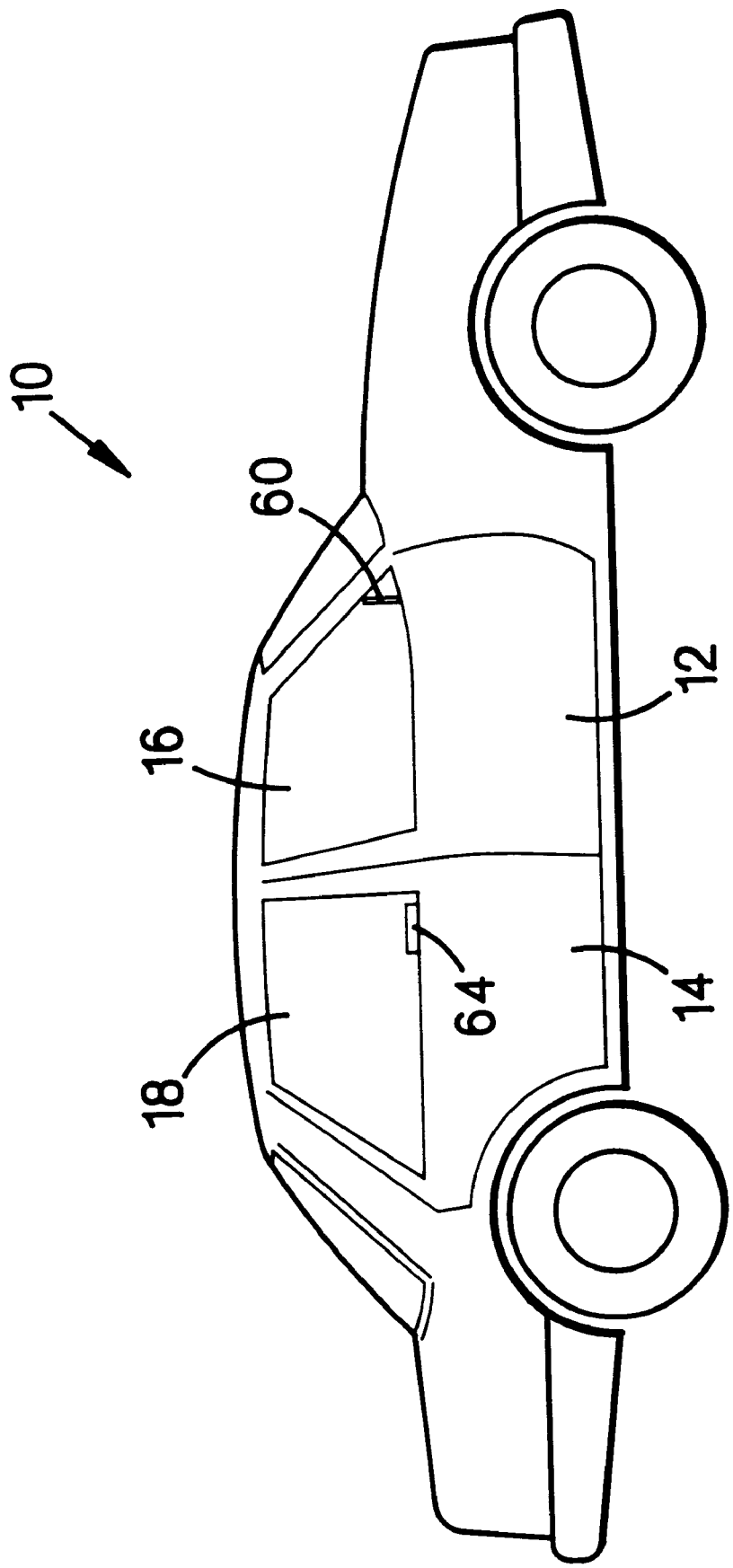
FIG. 1 is a side view of an automobile with closed doors.
Figure 2:
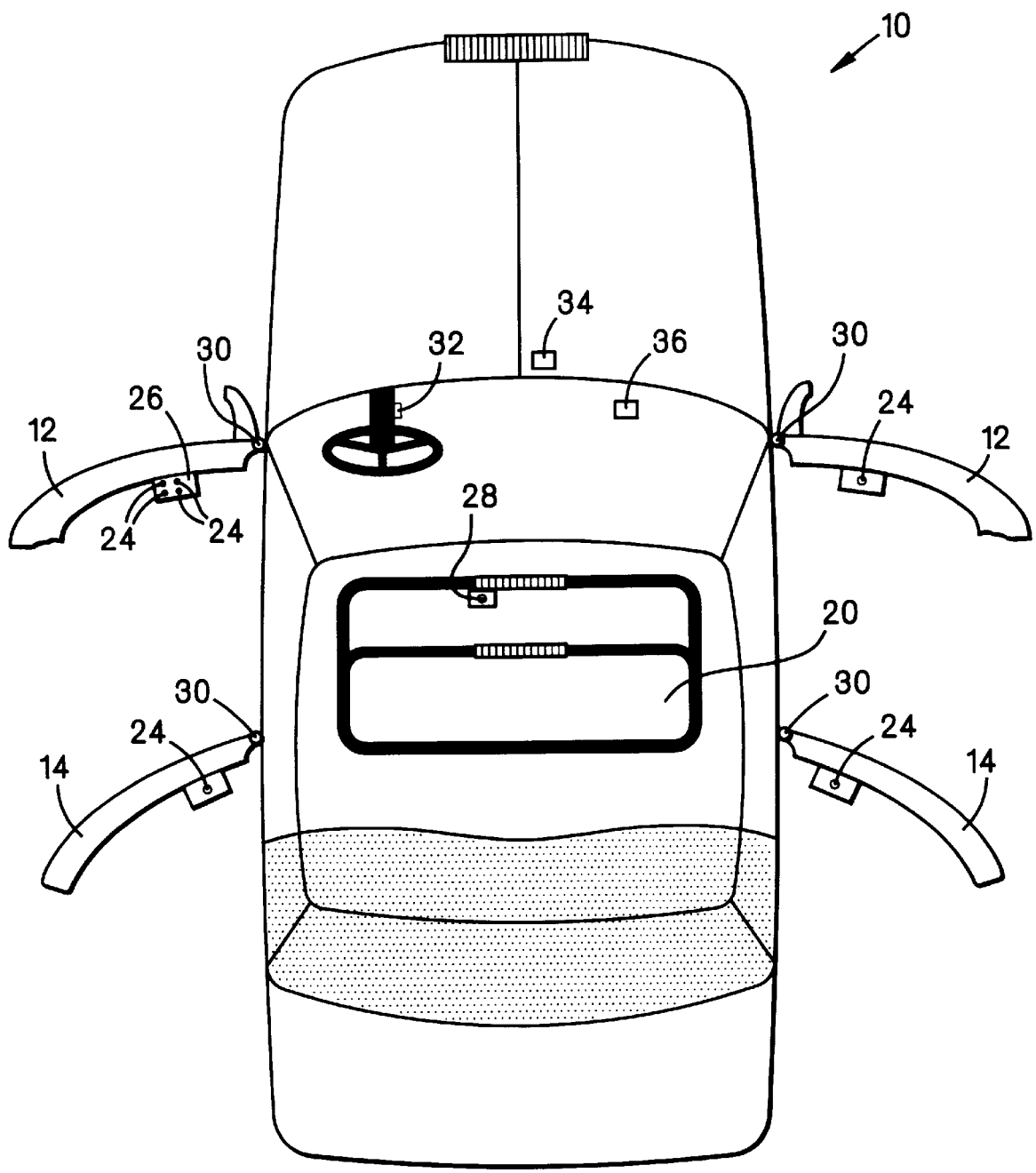
FIG. 2 is a top view of the automobile of FIG. 1 with open doors.

Referring to FIGS. 1 and 2, an automobile 10 often includes a front door 12 and a rear door 14 on each side, with front door 12 having a power operated front window 16, and rear door 14 having a power operated rear window 18. Automobile 10 can also include a power operated sunroof 20.

Each power operated window 16, 18 is moved between closed and fully opened positions by an electric motor 22 (see FIG. 3) positioned within door 12, 14, and is operated by a window switch 24 positioned on door 12, 14. Typically, the driver's side front door 12 includes a control panel 26 that includes four window switches 24 and allows the driver of automobile 10 to operate all windows 16, 18. Similarly, sunroof 20 is opened and closed by a motor 22 and operated by a sunroof switch 28 that is typically positioned near sunroof 20.

Sensors 30 (FIG. 2) indicate whether doors 12, 14 are closed (FIG. 1) or open (FIG. 2). Similarly, the position of an ignition switch 32 provides a general indication as to whether automobile 10 is occupied (i.e., when ignition switch 32 is on, automobile 10 is probably occupied, and when ignition switch 32 is off, automobile 10 is probably unoccupied) and specifically whether a key has been inserted and in which rotary position it is located.

Figures 1, 68:
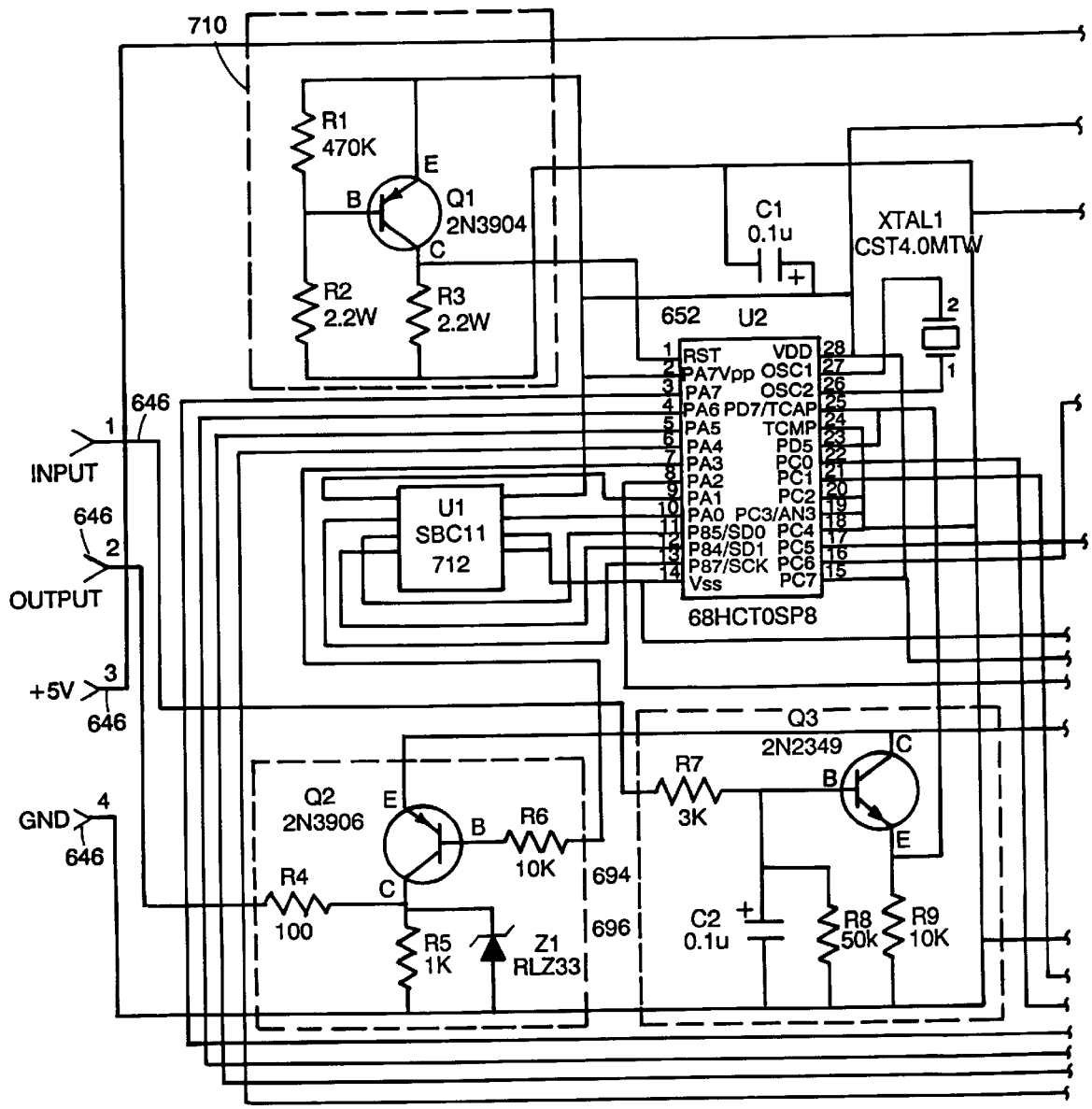
FIG. 68 is a circuit diagram for the sensor of FIG. 64.
Figures 2, 68:
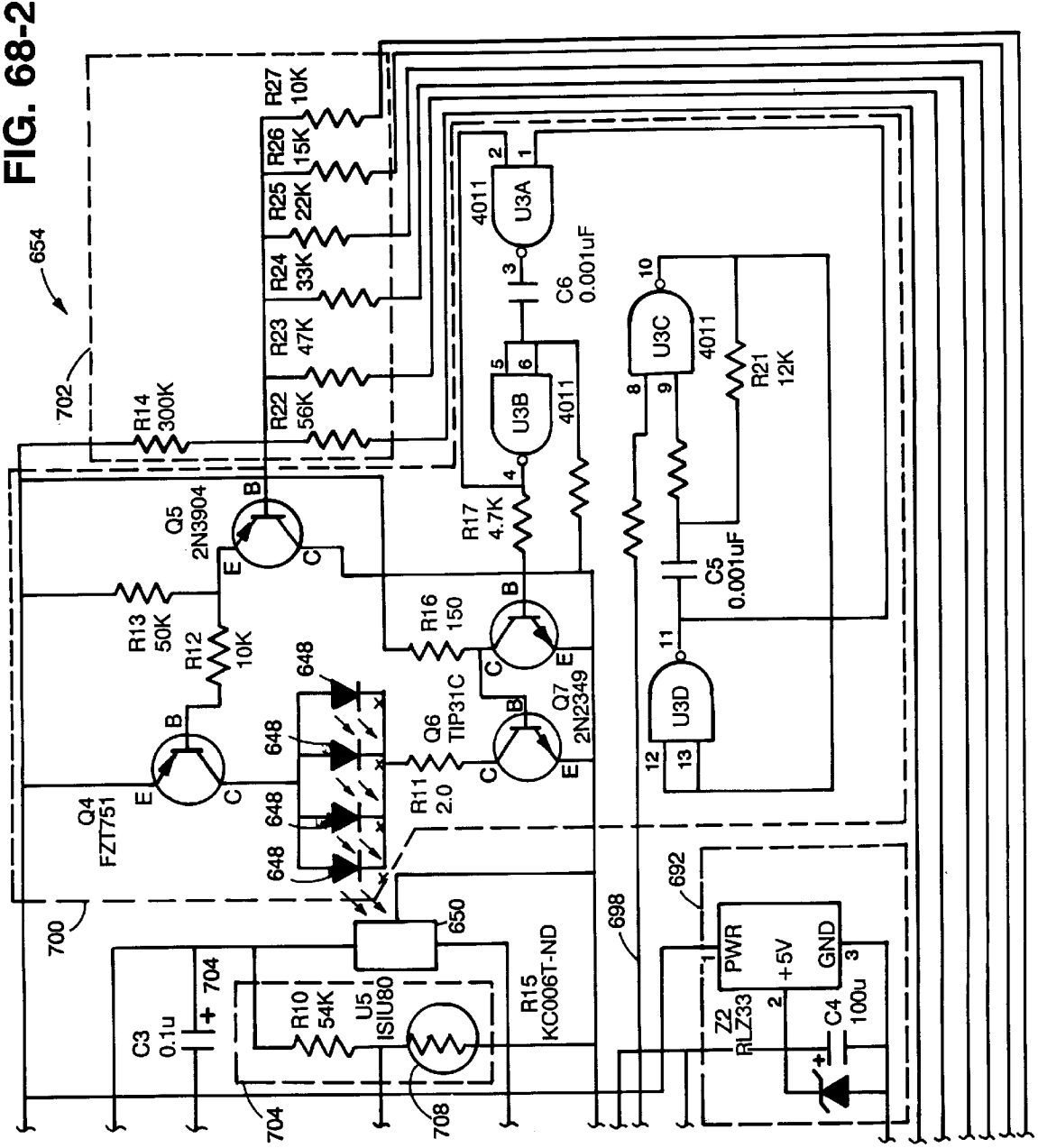
Figures 3, 68:
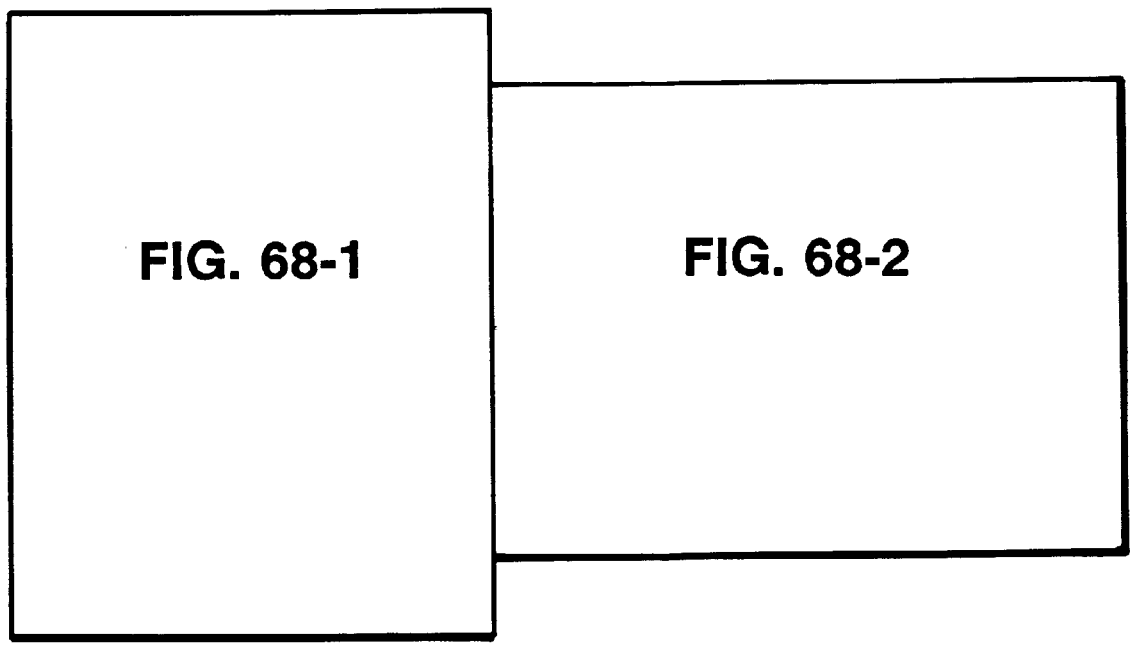
FIG. 3 is a block diagram of an automatic window system.

Referring also to FIG. 3, a rain sensor 34 positioned on the exterior of automobile 10 detects the presence of rain, and a temperature sensor 36 positioned within automobile 10 monitors the interior temperature of automobile 10. As discussed below, a light sensor 38, a motion detector 40, and a dangerous gas detector 42 can also be installed in automobile 10.

Automatic window system 44 includes a controller 46 that uses the signals from the sensors described above to control motors 22. For example, controller 46 responds to an indication from rain sensor 34 that rain is beginning to fall by automatically controlling motors 22 to close windows 16, 18 and sunroof 20.

Controller 46 responds to temperature sensor 36 by causing motors 22 to open or close windows 16, 18 and/or sunroof 20. In response to an indication from temperature sensor 36 that the temperature within automobile 10 has exceeded a first threshold value (typically 95° F.), and absent an indication of rain from rain sensor 34, controller 46 causes motors 22 to open windows 16, 18 and/or sunroof 20. Similarly, in response to an indication from temperature sensor 36 that the temperature within automobile 10 has fallen below a second threshold value (typically 55° F.), controller 46 causes motors 22 to close windows 16, 18 and sunroof 20. Temperature sensor 36 can be implemented using a single sensor that measures the temperature and compares it to the two threshold values, or using two sensors, each of which compares the temperature against one of the threshold values.

In addition to controlling the environment within automobile 10, system 44 can be configured to provide features such as night closure, intruder detection, and gas detection. When system 44 includes a light sensor 38, windows 16, 18 are automatically closed at night to prevent insects and other nocturnal pests from entering automobile 10. A motion detector 40 can provide intruder detection by, when automobile 10 is unoccupied (as indicated by the position of ignition switch 32), causing system 44 to automatically close windows 16, 18 and sunroof 20 upon detection of movement. Similarly, a dangerous gas detector 42 can cause system 44 to automatically open windows 16, 18 and/or sunroof 20 upon detection of unacceptable levels of noxious gases such as carbon monoxide.

System 44 also provides convenience features such as express open and express close, which allow occupants of automobile 10 to fully open or close windows 16, 18 with a single touch of a window switch 24. In addition, system 44 allows the driver to express open or express close any or all of windows 16, 18 with a single touch at control panel 26. Child guard features that allow the driver to disable the switches 24 positioned on rear doors 14 are also provided.

Other features of system 44 provide both security and convenience. For example, system 44 can be configured to automatically close windows 16, 18 and sunroof 20 when ignition switch 32 is turned to the off position, which indicates that the driver and other occupants are exiting automobile 10. This feature, which eliminates any inconvenience associated with closing windows 16, 18 and sunroof 20, is known as security close because it ensures that automobile 10 will not be mistakenly left unattended with the windows open. As a complement to security closing, system 44 could also include a memory function that, when ignition switch 32 is turned on, automatically opens windows 16, 18 and sunroof 20 to the positions they were in just before ignition switch 32 was turned off.

Another feature, referred to as anti air bind, eases closing of doors 12, 14, and thereby reduces the chance that a door will be mistakenly left ajar. As automobiles have become increasingly air tight, it has been discovered that a significant amount of air pressure is produced within an automobile while a door is closing. This pressure, referred to as air bind, requires that considerable force be applied to the door to ensure proper closure. System 44 eliminates air bind by partially opening rear windows 18 upon receiving a signal from a sensor 30 that a door 12, 14 is open. The open rear windows 18 drastically reduce the pressure built up within automobile 10 and thereby eliminate the air bind problem. Once system 44 determines, through sensors 30, that all doors 12, 14 are closed, system 44 automatically closes windows 18. In addition to easing closure of doors 12, 14, the anti-air bind feature also reduces the risk that a window will be broken by a door that is closed too hard, and reduces discomfort to occupants of automobile 10 caused by the increase in pressure within automobile 10.

System 44 can also be configured to interact with an alarm system 48 or an air conditioning system 50. When system 44 interacts with air conditioning system 50, controller 46 opens windows 16, 18 to allow particularly hot air to be vented from automobile 10. Once controller 46 determines that the temperature within automobile 10 has fallen below a specified value, controller 46 closes windows 16, 18.

Because system 44 automatically opens and closes windows 16, 18 and sunroof 20, and often does so without human interaction, system 44 must eliminate any risk that a window 16, 18 or sunroof 20 will be accidentally closed in a way that pinches or otherwise injures a child, pet, or other occupant of automobile 10. To eliminate this risk, system 44 includes an obstruction detection system 52 that prevents system 44 from accidentally closing a window 16, 18 or sunroof 20 when an obstruction such as a child's arm is present within the path travelled by the window 16, 18 or sunroof 20, and does so without requiring the obstruction to contact the moving window 16, 18 or sunroof 20. Typically, obstruction detection system 52 produces an energy curtain in the region traversed by a closing window 16, 18 or sunroof 20, and detects interference with the energy curtain.

Obstruction detection system 52 allows system 44 to interact with an alarm system 48, or to itself act as an alarm system. In this configuration, when activated, system 44 periodically polls detectors associated with each window 16, 18 (typically once every half second) to determine whether obstructions are present. If an obstruction is present, this indicates that somebody is reaching into an open or broken window 16, 18, and system 44 responds by signalling alarm system 48 or by sounding an alarm (when acting as an alarm system). Typically, alarm features are activated/deactivated using a remote control. The alarm remote control, or a separate unit, could also be used to remotely open and/or close windows 16, 18. When system 44 acts as an alarm system, system 44 could also include a mercury switch other means for detecting movement of automobile 10.

As shown in FIG. 3, controller 46 receives control signals from occupants of automobile 10, and particularly from the driver, through signals received from ignition switch 32, window switches 24, sunroof switch 28, and door sensors 30. Controller 46 also responds to signals from rain sensor 34, temperature sensor 36, light sensor 38, motion sensor 40, and dangerous gas detector 42. In addition, controller 46 interacts with obstruction detection system 52 by sending driving signals 54 to system 52 and responding to detection signals 56 produced by system 52. Driving signals 54 cause system 52 to produce energy curtains in windows 16, 18 or sunroof 20, and are typically only produced when controller 46 is preparing to close, or closing, a window 16, 18 or sunroof 20 (or when system 44 is acting as, or interacting with, an alarm system 48, and is activated). Controller 46 configures driving signals 54 to only produce an energy curtain in a particular window 16, 18 that is being closed (or monitored for alarm purposes). Controller 46 also monitors electrical characteristics of motors 22 and uses information about the electrical characteristics in controlling motors 22.

Window switches 24 and sunroof switch 28, in addition to signalling that windows 16, 18 and sunroof 20 should be opened or closed, provide configuration signals to controller 46. For example, the driver can disable security closing by pressing a window switch 24 within a short time interval (typically five seconds) after turning off ignition switch 32. After this time interval has expired, or after the driver has enabled security closing by pressing a switch 24, the driver can configure the extent to which windows 16, 18 are opened upon detection of a signal from temperature sensor 36 by pressing switches 24 multiple times. Each press of a switch 24 sets the corresponding window 16, 18 to open by an incremental amount. For example, if the increment were one inch, pressing the switch 24 corresponding to the passenger side window 16 would cause that window to be opened three inches when temperature sensor 36 detects excessive heat. The increment can be selected so that, for example, one press corresponds to slightly open and five presses corresponds to fully open. Rather than separately configuring each window, the driver can simultaneously configure all windows by pressing the switch 24 corresponding to the left rear window. To enable/disable the anti air bind features, the driver simultaneously presses the switches 24 corresponding to the right and left rear windows. The extent to which windows 18 are opened during anti-air bind operations can be controlled through the switches 24 in doors 14, where pressing a switch 24 to the open position will increase the extent to which the corresponding window 18 opens by one inch and pressing the switch 24 to the close position will decrease the extent by the same amount.

When switches 24, 28 are used for system configuration, controller 46 provides feedback to the driver through a feedback unit 58. Feedback may be provided through audible tones that reflect the number of times that the driver has pressed switches 24, 28. Feedback could also be provided through an LED or LCD display, or through other means. Though use of switches 24, 28 for configuration reduces the number of switches required and eases installation, a separate set of configuration controls could also be provided.

Because system 44 relies on many preexisting sensors and controls, system 44 can be easily installed in an existing automobile 10. For example, in many systems, controller 46, obstruction detection system 52, feedback unit 58 (which is typically a buzzer), rain sensor 34, and temperature sensor 36 are the only new components. Moreover, because many functions of controller 46 are implemented in software, controller 46 can be easily customized or upgraded as new features become available.

Referring to FIG. 4, obstruction detection system 52 includes front emitter/receiver units 60 positioned to produce energy curtains 62 in regions traversed by front windows 16, and rear emitter/receiver units 64 positioned to produce energy curtains 66 in regions traversed by rear windows 18. Emitter/receiver units 60, 64 include emitters 68 (see FIG. 6) that produce energy curtains 62, 66 and receivers 70 (see FIG. 6) that detect any portion of energy curtains 62, 66 that is reflected back to emitter/receiver units 60, 64. When obstructions are placed within energy curtains 62, 66, the reflected portions of energy curtains 62, 66 increase. Thus, receivers 70 detect obstructions by detecting increases in the reflected portions of energy curtains 62, 66.

Front emitter/receiver unit 60 is vertically positioned at the lower front corner of window 16. This positioning ensures that energy curtain 62 covers the region ABCD in which an obstruction could be caught between window 16 and a window frame portion 72 of door 12 as window 16 closes. This positioning also minimizes the vertical angle $\alpha_1$ of energy curtain 62 needed to cover region ABCD, which, could be, for example, about 38°. Because the area covered by energy curtain 62 is directly related to the vertical angle $\alpha_1$, and the intensity of energy curtain 62 is inversely related to the area covered by energy curtain 62, minimizing the vertical angle $\alpha_1$ maximizes the intensity of the energy curtain 62 that can be produced by a particular emitter 68. Because the sensitivity of front emitter/receiver unit 60 is directly related to the intensity of energy curtain 62, the positioning of front emitter/receiver unit 60 maximizes the ability of front emitter/receiver unit 60 to detect obstructions. The position of front emitter/receiver unit 60 is also aesthetically pleasing and allows for efficient installation.

Rear emitter/receiver unit 64 is horizontally positioned at the lower front corner of window 18. This positioning ensures that energy curtain 66 covers the region EFGHI in which an obstruction could be caught between window 18 and a window frame portion 74 of door 14 as window 18 closes. As with front emitter/receiver unit 60, the positioning of rear emitter/receiver unit 64 minimizes the vertical angle $\alpha_2$ of energy curtain 66, which may vary from about 50° to 60° depending on the configuration of a particular window 18. This positioning maximizes the intensity of energy curtain 66 and thereby maximizes the ability of rear emitter/receiver unit 64 to detect obstructions.

Referring to FIG. 5, emitter/receiver units 60, 64 are positioned so that horizontal angles $\beta_1$ and $\beta_2$ of energy curtains 62, 66 are roughly centered, respectively, in window frame portion 72 of door 12 and window frame portion 74 of door 14. This positioning ensures that, even if an emitter/receiver unit 60, 64 is misaligned due to vibrations or other adverse operating conditions present in automobile 10, energy curtains 62, 66 will detect obstructions in the planes defined by windows 16, 18. These same alignment concerns are addressed by combining emitters 68 and receivers 70 in emitter/receiver units 60, 64 to eliminate any installation difficulties that would be associated with aligning separately packaged emitters 68 and receivers 70, and to eliminate maintenance and operational difficulties that could result from to misalignment stemming from vibrations or other adverse operating conditions.

Referring to FIG. 6, front emitter/receiver unit 60 includes an emitter 68 and two receivers 70. Emitter 68 includes four infrared light emitting diodes (LEDs) 76 that produce energy curtain 64 in response to driving signals 54 from controller 46. LEDs 76 may produce conical infrared beams 78 having angles of between 25° and 30° and wavelengths of 940 or 950 nanometers, and are arranged so that beams 78 are parallel and share a common vertical plane. Operating power for each LED 76 is about four to six milliwatts. A cylindrical lens 80 horizontally focusses and vertically diverges the conical beams 78 from LEDs 76 to produce energy curtain 64 having a vertical angle $\alpha_1$ of about 38° and a horizontal angle $\beta_1$ of about 5°–10°. Emitter 68 includes multiple LEDs 76 to increase vertical angle $\alpha_1$, and to increase the intensity of energy curtain 64 which, in turn, increases the range R at which front emitter/receiver unit 60 can detect obstructions.

Each receiver 70 includes a biconvex lens 82 that focusses incoming energy reflected by an obstruction 83 into a parallel beam directed at a band pass filter 84 that passes energy having wavelengths from about 930–950 nanometers. From band pass filter 84, the parallel beam is directed to a second biconvex lens 86 that focusses the beam on a photo IC 88 that produces a voltage signal which varies with the intensity of the beam.

Referring also to FIG. 7, photo IC 88 includes a photodiode 90 that produces a voltage in response to the beam and an amplifier 92 that amplifies that voltage. The output of amplifier 92 passes through a 38 kHz bandpass filter 94 before being applied to the input of an integrator 96 that, in combination with a comparator 98, acts as a Schmitt trigger. The output of comparator 98 is supplied to a drive transistor 100 that toggles the output voltage 102 of photo IC 88 between a high value of about five volts when less than a threshold amount of energy is being received to a low value of about zero volts when more than the threshold amount of energy is being received. Photo IC 88 is implemented using an IS1U60 OPIC sensor available from Sharp.

Because each receiver 70 has a conical field of view of about 12°, two receivers 70 are employed to provide a suitable field of view. The outputs 102 of receivers 70 are combined by a logical AND operator 104 to produce a detection signal 56. Because outputs 102 have a low value when energy is being detected, detection signal 56 has a high value when neither receiver 70 is detecting energy, and otherwise has a low value.

As illustrated in FIG. 8, except for the positioning of LEDs 76, rear emitter/receiver unit 64 is identical to front emitter/receiver unit 60. LEDs 76, though still sharing a vertical plane, are not arranged to produce parallel beams 78. Instead, LEDs 76 are arranged so that their beams 78 converge at lens 80 and then diverge from lens 80. This arrangement results in an energy curtain 66 having a wider vertical angle $\alpha_2$ than energy curtain 62 produced by front emitter/receiver unit 60.

Figure 9B:
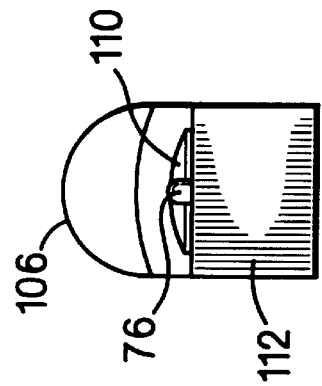
FIGS. 9A–9C are schematic views of a compact emitter/receiver unit for use in the system of FIG. 3.
Figure 9A:
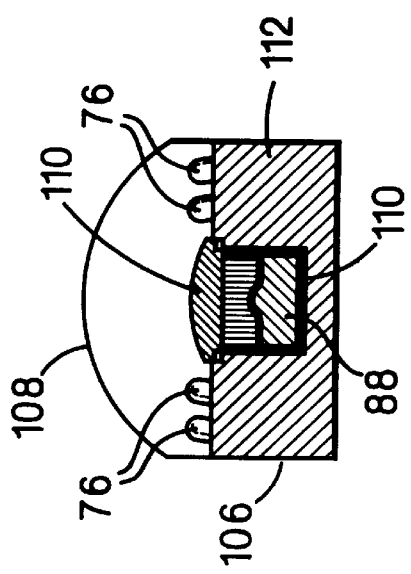
Figure 9C:
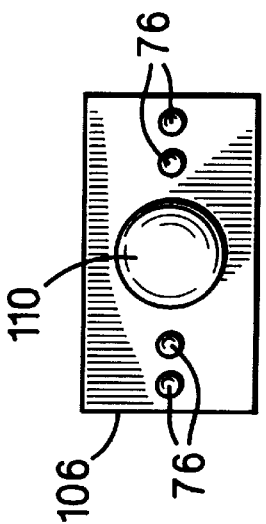

In an alternative approach, as illustrated in FIGS. 9A–9C, emitter/receiver units 60, 64 are implemented using a compact emitter/receiver unit 106 that is only 1.4 inches wide by 0.75 inches deep by 1.1 inches high. Like units 60, 64, unit 106 includes four LEDs 76 and a photo IC 88. Unit 106 also includes a common lens 108 used by LEDs 76 and photo IC 88, and a receiver lens 110 used by photo IC 88. To prevent beams 78 from LEDs 76 from directly striking photo IC 88, photo IC 88 is positioned in a recess 110 within a housing 112 of unit 106. Due to its compact size, unit 106 is extremely easy to install.

Referring to FIG. 10, controller 46 operates obstruction detection system 52 according to a procedure 120. Because obstruction detection system 52 is only active when a window is being closed, controller 46 does not activate obstruction detection system 52 until controller 46 generates or receives a close request (step 122). As discussed above, controller 46 generates automatic close requests in response to signals from, for example, rain sensor 34, and to implement features such as anti air bind. In addition, the driver or another occupant of automobile 10 can cause controller 46 to generate an automatic, express close request by merely touching a switch 24, or a manual close request by continually pressing a switch 24. Thus, as a next step, controller 46 determines whether the close request is an automatic close request or a manual close request (step 124). Typically, a close request from a switch 24 is deemed to be a manual request if switch 24 is pressed for more than three tenths of a second.

If the close request is a manual close request (step 124), controller 46 sends a close signal to motor 22 that controls the window associated with the pressed switch (step 126). The close signal causes motor 22 to close the window by an incremental amount. After sending the close signal, controller 46 determines whether there is still a close request (i.e., the driver is still pressing switch 24) (step 122), and, if so, repeats the process. The manual close request, which enables a window to be closed without attempting to detect obstructions, provides a useful fail safe in that it ensures that a window can be closed in the event of a failure in obstruction detection system 52.

Figure 11A:
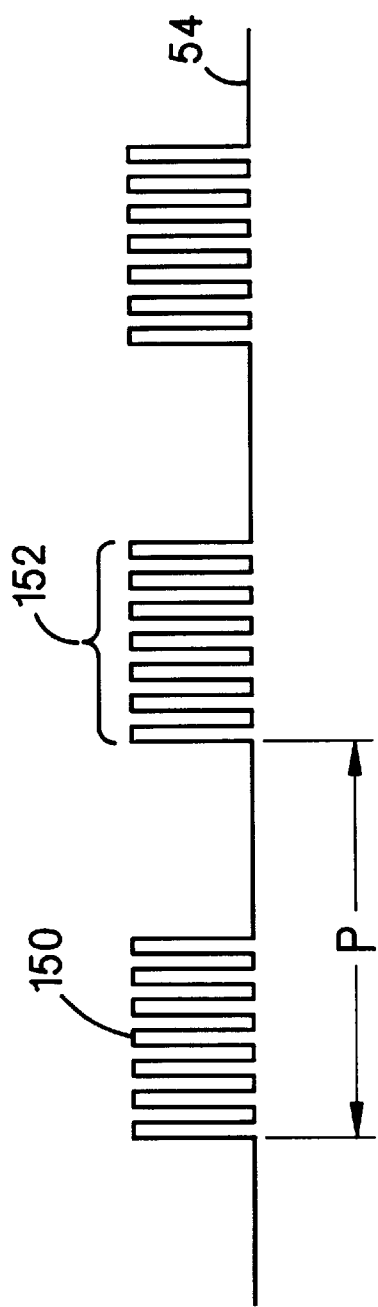
FIGS. 11A–11C are timing diagrams of signals related to the obstruction detection system of FIG. 3.

If the close request is an automatic close request (step 124), controller 46 activates the appropriate emitter 68 and determines whether emitter 68 is operating correctly (step 128). As illustrated in FIG. 11A, controller 46 activates emitter 68 by sending a driving signal 54 that includes a series of 38 kHz pulses 150 that are frequency modulated on a train of lower frequency pulses 152 having a period P and a duty cycle of about fifty percent. Period P for a front emitter/receiver unit 60 may range between 40 milliseconds and 60 milliseconds, and period P for a rear emitter/receiver unit 64 may range between 50 milliseconds and 100 milliseconds.

Figure 11B:
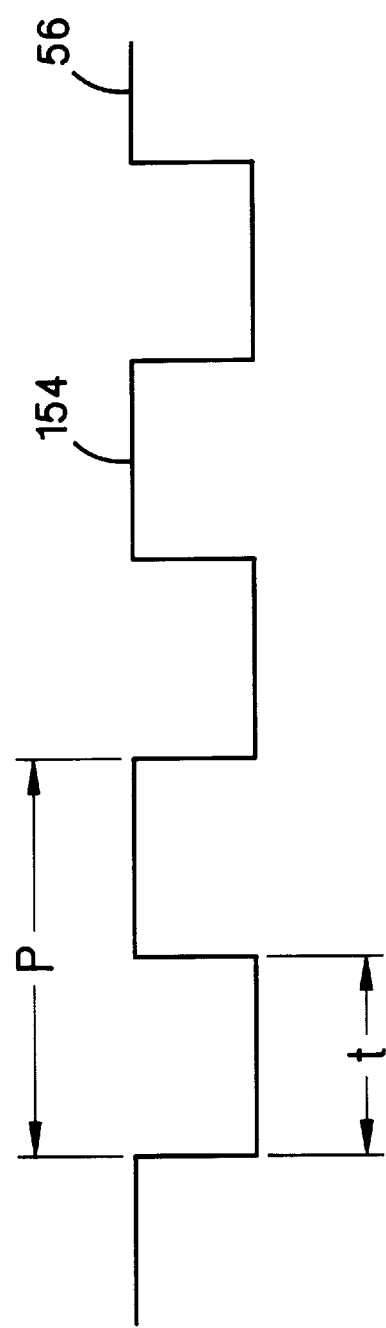
Figure 11C:

Controller 46 determines whether emitter 68 is operating correctly by monitoring the detection signal 56 produced by receivers 70. As illustrated in FIG. 11B, when emitter 68 is operating correctly, detection signal 56 includes a series of pulses 154 having a period P. Pulses 154, which correspond roughly to pulses 152 of driving signal 54 and have low voltage values when pulses 152 have high voltage valves, result from detection by photo IC 88 of a reflected portion of an energy curtain 62. When emitter 68 is not operating correctly, as illustrated in FIG. 11C, detection signal 56 does not include pulses and instead remains at a high voltage value. This condition occurs when emitter 68 is not producing an energy curtain 62, or when emitter 68 is blocked so that no portion of energy curtain 62 can be reflected to photo IC 88. If emitter 68 is not operating correctly (step 130), controller 46 performs no further action, and instead waits for a new close request (step 122). At this time, if desired, the driver or other occupant of automobile 10 could override controller 46 by manually pressing the window switch 24 corresponding to the window 16, 18 to be closed.

If emitter 68 is operating correctly (step 130), controller 46 monitors detection signal 56 and determines t, the length of a detection pulse (step 132). The length of a detection pulse is related to the intensity of energy incident on photo IC 88, and, because obstructions reflect energy toward photo IC 88, increases when an obstruction is present. Thus, controller 46 detects obstructions by comparing t to T', an initialization value related to the length of a detection pulse produced by photo IC 88 when a window 16 is free of obstructions (step 134).

T' is generated in an initialization procedure during installation of system 44. During this procedure, emitter 68 is activated and detection signal 56 is monitored while window 16 is closed under obstruction free conditions. T, the average value of t while window 16 is being closed, is determined from detection signal 56. T' is then generated as:

$$T' = T + 2\sqrt{T},$$

where the square root term allows some deviation in the value of an acceptable t and thereby accounts for deviations that could be caused by variations in temperature or system voltage. T' could be generated using other approaches. For example, T' could be varied with different window positions to more precisely account for reflections caused by window 16. In addition, to avoid the need for nonvolatile memory to store T', T' could be determined each time that system 44 is powered up (i.e., connected to the battery of automobile 10). Also, to optimize performance of system 44 under different operating conditions, T' could be generated in response to a command from the driver of automobile 10.

T' accounts for background noise and variations in system 44 that could affect system performance. Other background effects, such as sunlight, which, in an improperly designed system, could adversely affect operation, are handled by the filters 84, 94 included within receiver 70. Filter 84 ensures that only energy having a wavelength similar to that produced by an emitter 68 can be incident on photo IC 88. However, sunlight includes sufficient amounts of energy within the wavelength band passed by filter 84 to saturate photo IC 88 and prevent detection of reflections from energy curtain 62 (sunlight includes approximately ten to fifteen milliwatts in the wavelength band from 930 to 950 nanometers, while emitter 68 produces approximately sixteen to twenty four milliwatts in this band). To eliminate the effects of sunlight, receiver 70 also includes filter 94, which only passes energy that, like driving signal 54, is modulated at 38 kHz. Thus, sunlight could only affect operation of receiver 70 if the sunlight were somehow modulated at 38 kHz, a situation that is extremely unlikely to occur. Moreover, in the unlikely event that sunlight was able to saturate receiver 70, this would only prevent automatic closing of window 16, and would impose no risk that window 16 would be accidentally closed on an obstruction such as a child's hand.

If controller 46 determines that t is greater than T' (step 134), this indicates that an obstruction might be present in window 16, and controller 46 responds by incrementing a miscompare count (step 136). If the incremented miscompare count is greater than two (step 138), controller 46 determines that an obstruction is actually present, and responds by cancelling any outstanding close signals and sending a signal to motor 22 that causes motor 22 to fully open window 16 (step 140). Thereafter, controller 46 waits for additional close requests (step 122).

If the incremented miscompare count is not greater than two (step 138), controller 46 sends a close signal to the motor 22 corresponding to the window associated with the close request (step 142). The close signal causes motor 22 to close the window by an incremental amount. Typically, controller 46 operates at a speed at which consecutive close signals overlap so that, absent the detection of an obstruction, the close signals cause motor 22 to close window 16 in a smooth, continuous manner.

After sending the close signal (step 142), controller 46 determines whether window 16 is closed (step 144). Typically, controller 46 makes this determination by detecting changes in the electrical characteristics of motor 22. For example, physical resistance caused by the window reaching the closed position results in an increased load on motor 22 that is detectable by controller 46. (Monitoring the electrical characteristics of motor 22 could also be used as a backup to obstruction detection system 52 (e.g., an obstruction that contacts a moving window 16, 18 will cause changes in the electrical characteristics of motor 22.)) If the window is not closed, controller 46 repeats the automatic closing process by monitoring detection signal 56 and determining t (step 132). If the window is closed, controller 46 waits for additional close requests (step 122).

If controller 46 determines that t is less than or equal to T' (step 134), controller 46 responds by resetting the miscompare count (step 146). By doing so, controller 46 ensures that only three consecutive miscompares will be treated as an actual obstruction, and minimizes the occurrence of incorrect obstruction detections. Thereafter, controller 46 sends a close signal to motor 22 (step 142) and checks to see if window 16 is closed (step 144).

The previous discussion assumes that system 44 is not interacting with, or acting as, an activated alarm system 48. When system 44 is operating as such, a request to poll a window 16, 18 (or sunroof 20) would be treated as an automatic close request (step 124). Also, rather than sending an open signal, controller 46 would just send an alarm signal (step 140).

Figure 12A:
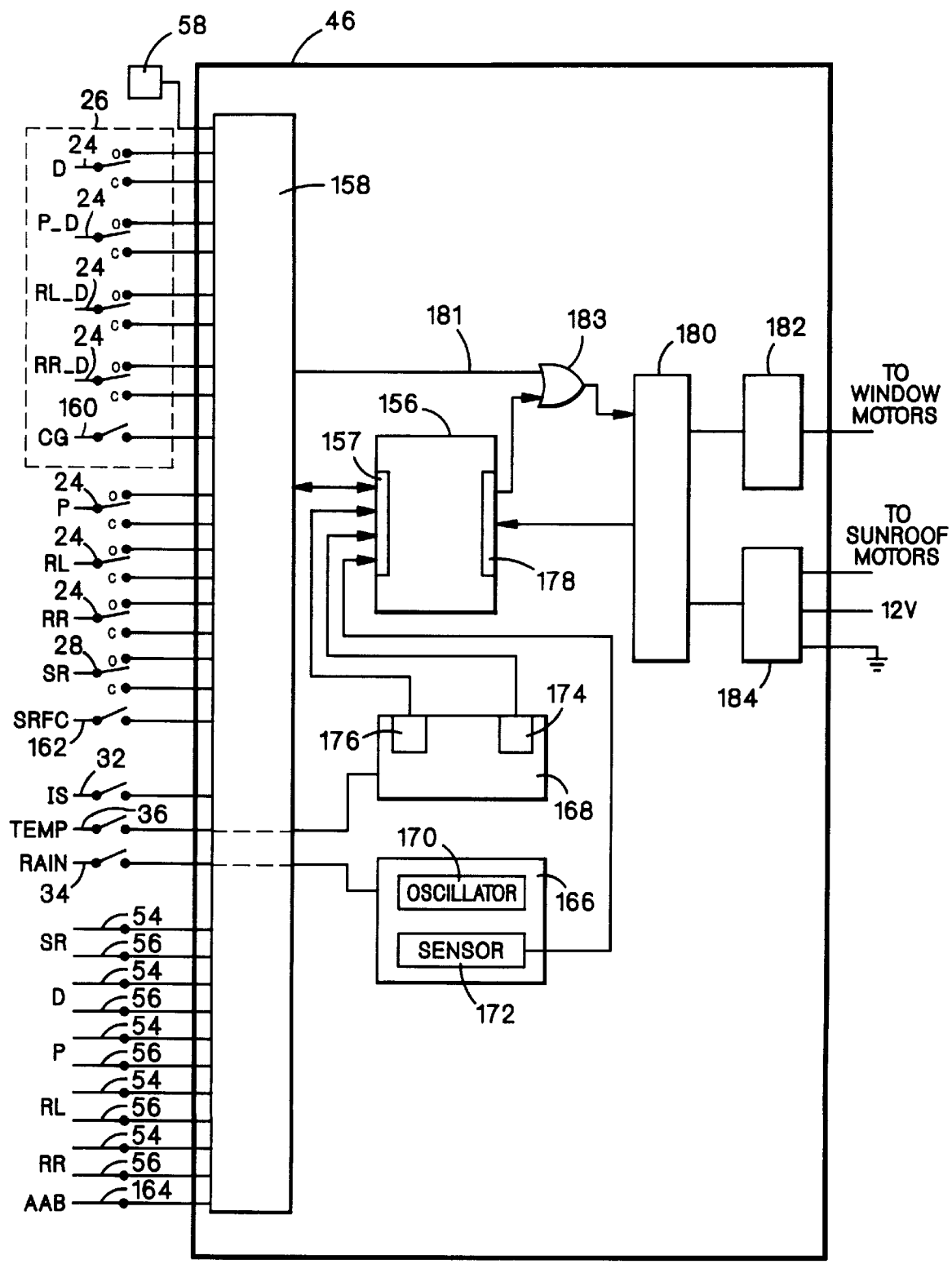
FIGS. 12A–12B are block diagrams of a controller of the system of FIG. 3.

Referring to FIG. 12A, controller 46 can be implemented using a processor 156 that communicates with other components of system 44 through ports 157 connected to an I/O interface 158. Specifically, I/O interface 158 communicates with driver (D) switch 24, passenger (P_D) switch 24, rear left (RL_D) switch 24, rear right (RR_D) switch 24, and child guard (CG) switch 160 of control panel 26; passenger (P) switch 24; rear left (RL) switch 24; rear right (RR) switch 24; sunroof (SR) switch 28; sunroof fully closed (SRFC) indicator 162; ignition (IS) switch 32; temperature sensor 36; rain sensor 34; sunroof (SR), driver (D), passenger (P), rear left (RL), and rear right (RR) driving signals 54 and detection signals 56; audible feedback unit 58; and anti air bind (AAB) switch 164, which has a high value when all doors 12, 14 are closed, and a low value when a door 12, 14 is open. Because switches 24, 28 operate in three modes (open, close, and inactive), I/O interface 158 communicates their status to processor 156 through pairs of bits of ports 157. I/O interface 158 communicates the status of each of the remaining sensors through single bits of ports 157.

Figure 12B:
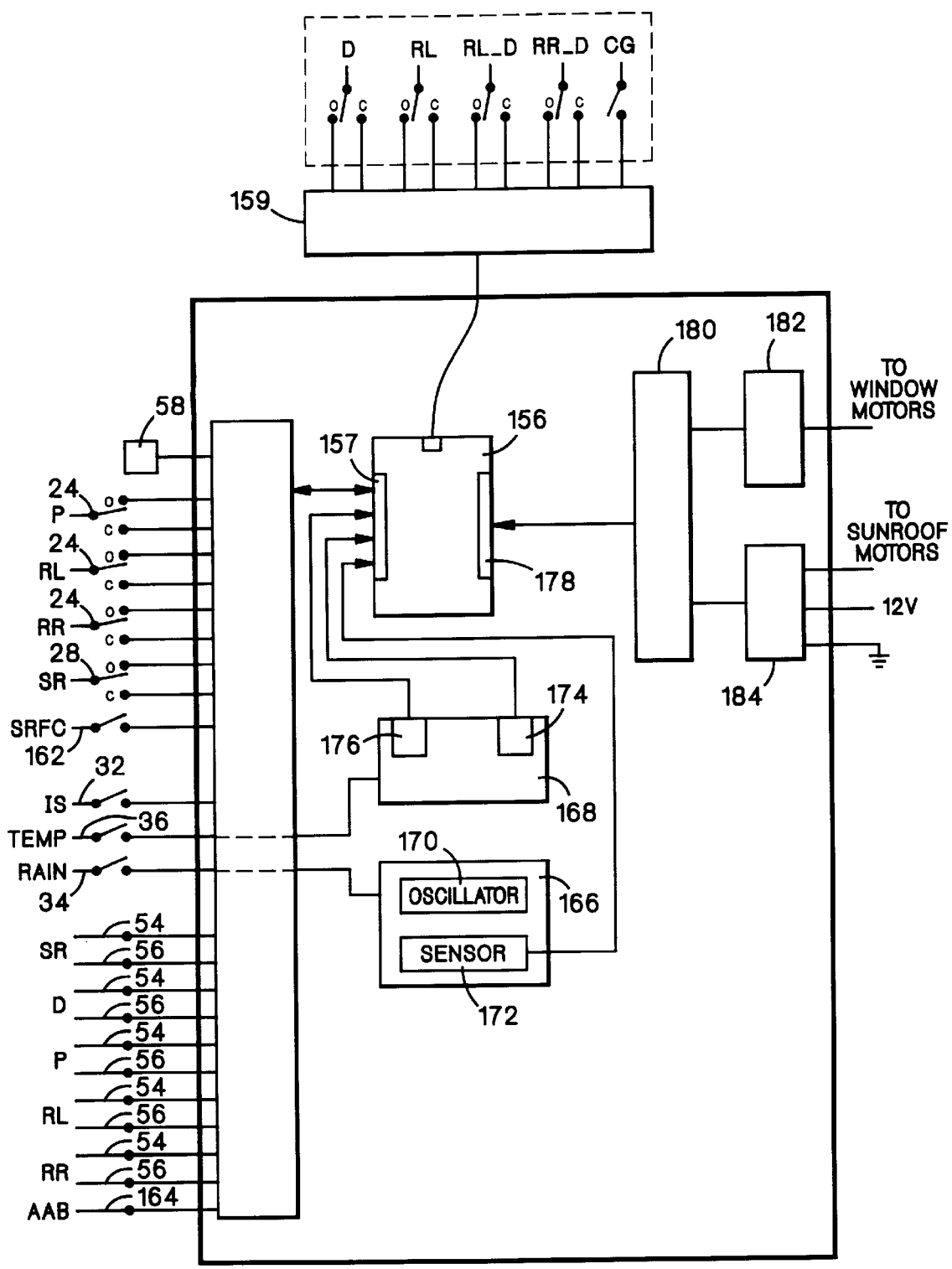

In an alternate approach, as illustrated in FIG. 12B, a multiplexer 159 combines signals from switches 24 (D, P_D, RL_D, and RR_D) and switch 160 (CG) on control panel 26 to a serial port 161 on processor 156 through a serial link 163. This approach reduces the nine wires required for the switches of control panel 26 to two wires (a data/address wire and a clock wire). In this approach, each switch 24, 160 is polled once about every 100 milliseconds. In the parking mode (see below), processor 156 changes serial port 161 to an idle mode, and ceases polling, after about five to ten minutes. To minimize noise effects on serial link 163, processor 156 is typically positioned near multiplexer 159.

Referring again to FIG. 12A, Controller 46 also includes a rain sensor interface 166 and a temperature sensor interface 168. Because rain sensor 34 is a capacitor having a value that changes in the presence of rain, interface 166 includes an oscillator 170 that drives rain sensor 34 and a sensor 172 that detects a change in the capacitance of rain sensor 34. Temperature sensor 36 is a resistor that varies with temperature, and interface 168 includes a heat detector 174 that compares the resistance of temperature sensor 36 to a resistance corresponding to 95° F. and produces a high valued output when the resistance of temperature sensor 36 indicates a temperature in excess of 95° F. Interface 168 also includes a cold detector 176 that compares the resistance of temperature sensor 36 to a resistance corresponding to 55° F. and produces a high valued output when the resistance of temperature sensor 36 indicates a temperature that is less than 55° F.

Processor 156 drives motors 22 through a port 178 that is connected to a set of relays 180. Relays 180 are also directly driven by switches 24, which are connected to relays 180 by lines 181 between I/O interface 158 and relays 180. For each relay 180, a logical OR gate 183 combines the signal from line 181 and the signal from processor 156. This ensures that switches 24 can control motors 22 even if processor 156 is inoperable.

Relays 180 connect to window motors 22 through an eight pin port 182. Each window 16, 18 is operated by a reversible motor 22 that operates in forward or reverse based on the polarity of the net voltage applied to its two terminals, so two relays 180 correspond to each window 16, 18. In another embodiment, in which each window 16, 18 is operated by two unidirectional motors 22, one for opening and one for closing, each of the two relays 180 would correspond to a particular motor 22. Relays 180 connect to sunroof motor 22, a twelve volt power supply (the battery of automobile 10), and electrical ground through a four pin port 184. Sunroof motor 22 is also reversible, and operates like window motors 22.

By providing a central control for motors 22, controller 46 produces substantial savings in wiring and power consumption. For example, instead of each switch 24 being connected to its corresponding motors 22 with high voltage, heavy gauge wire, switches 24 are connected to controller 46 using low voltage, light gauge wire. In addition, switches 24 are only required to handle low voltages and can therefore be implemented using less expensive and lighter materials.

Processor 156 is implemented using an Intel 83C552C processor. Specific pin connections for processor 156 include the following:

| Pin | Connection |
|-----|------------|
| 1 | motor circuit for driver's window (to monitor electrical characteristics) |
| 4 | feedback unit 58 |
| 5 | emitters 68 (driving signal) |
| 7 | control switch (determines whether pin 67 monitors the motor circuit for the right left or right rear window 18) |
| 8 | control switch (determines whether pin 68 monitors the motor circuit for the passenger window 16 or the sunroof 20) |
| 11 | indicates whether windows are being manually or automatically controlled |
| 12 | passenger window control switch 24 (open) |
| 13 | passenger window control switch 24 (close) |
| 15 | processor reset |
| 16 | rear left window control switch 24 (open) |
| 17 | rear right window control switch 24 (close) |
| 18 | rear left window control switch 24 (close) |
| 19 | rear right window control switch 24 (open) |
| 21 | rear right receiver 70 |
| 22 | serial clock (for multiplexer) |
| 23 | serial address/data (for multiplexer) |
| 25 | sunroof receiver (one) |
| 26 | sunroof closed indicator |
| 27 | anti air bind enable/disable |
| 28 | emitter 68 enable/disable |
| 30 | sunroof open relay 180 |
| 31 | sunroof close relay 180 |
| 39 | driver open relay 180 |
| 40 | driver close relay 180 |
| 41 | passenger open relay 180 |
| 42 | passenger close relay 180 |
| 43 | rear left open relay 180 |
| 44 | rear left close relay 180 |
| 45 | rear right open relay 180 |
| 46 | rear right close relay 180 |
| 50 | sunroof switch 28 (open) |
| 51 | sunroof switch 28 (close) |
| 52 | temperature sensor 36 (hot) |
| 56 | rain sensor 34 or temperature sensor 36 (cold) |
| 57 | ignition switch 32 |
| 62 | sunroof receiver (two) |
| 63 | temperature sensor (for emitter/receiver calibration) |
| 64 | rear left receiver 70 |
| 65 | passenger receiver 70 |
| 66 | driver receiver 70 |
| 67 | motor circuit for rear left or rear right windows (to monitor electrical characteristics) |
| 68 | motor circuit for passenger's window or sunroof (to monitor electrical characteristics) |

Assembly language software for implementing the features of system 44 is included as Appendix A. This software has been run in an actual implementation of system 44 after being compiled using a Maclink version 1.02 compiler.

Essentially, processor 156 operates in one of three modes: a parking mode in which processor 156 automatically opens and closes windows 16, 18 and sunroof 20 in response to rain, heat, motion, and light; a driving mode in which processor 156 provides one touch, express opening and closing of windows 16, 18 and sunroof 20; and an anti air bind mode in which processor 156 automatically cracks open rear windows 18 in response to an open door 12, 14. When processor 156 enters parking mode (in response to ignition switch 32 moving to the off position), processor 156 provides security closing of all windows 16, 18 and sunroof 20.

Figure 13:
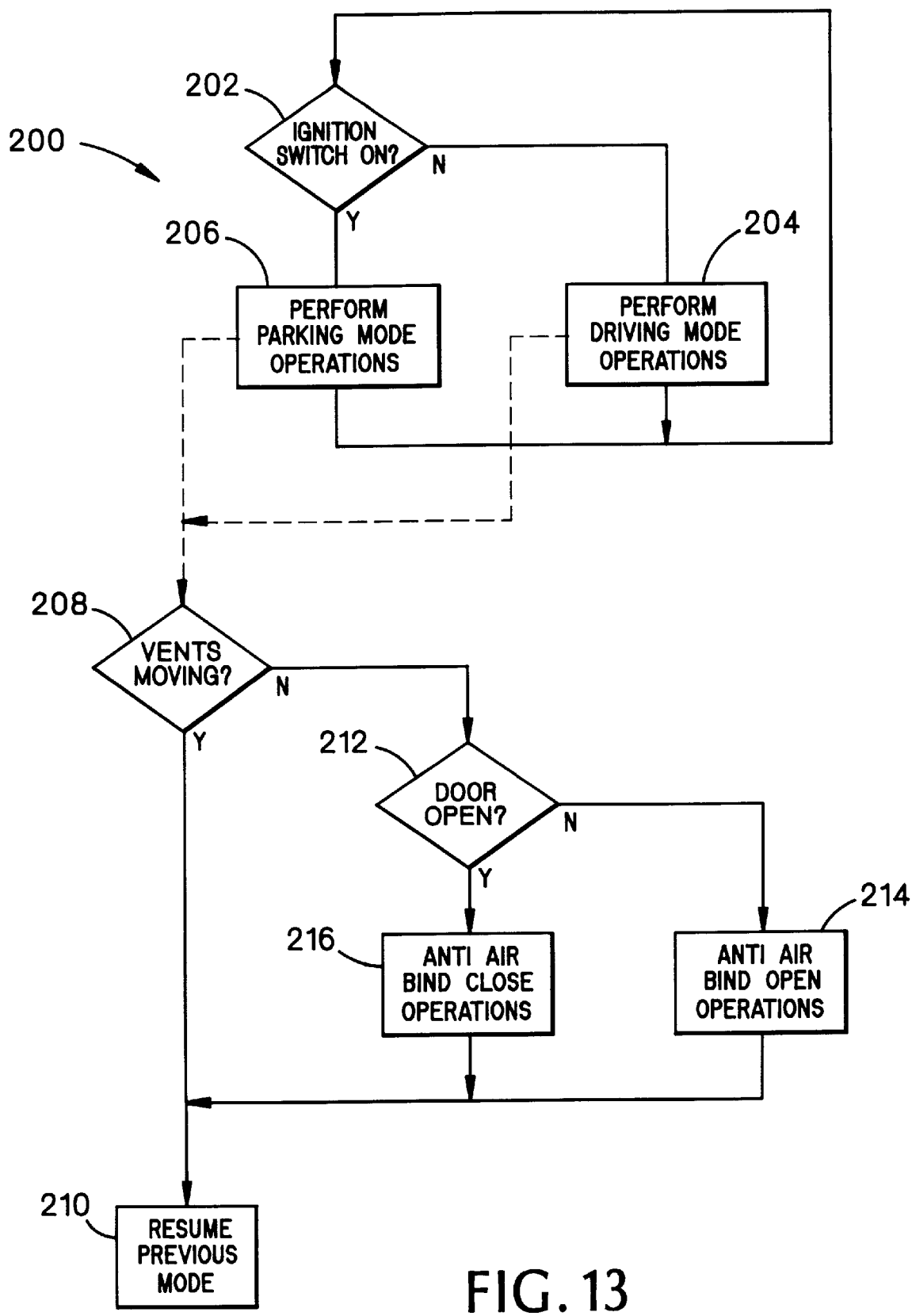
FIG. 13 is a flow chart of a procedure implemented by the controller of FIG. 12.

Referring to FIG. 13, processor 156 determines its operational mode according to a procedure 200. Processor 156 first determines whether ignition switch 32 is on (step 202).

If ignition switch 32 is on, processor 156 performs driving mode operations (step 204). Otherwise, processor 156 performs parking mode operations (step 206). Upon completing either driving or parking mode operations, processor 156 again checks the status of ignition switch 32 (step 202), and repeats the process.

Processor 156 also includes a timer interrupt that occurs at an average rate of about once every six tenths of a second. When the timer interrupt occurs, processor 156 determines whether any motor 22 is activated (i.e., whether a vent is moving) (step 208). If a vent is moving, processor 156 resumes operations in the mode (parking or driving) in which it was operating prior to the interrupt (step 210). If no vent is moving, processor 156 checks the status of doors 12, 14 (step 212). If a door is open, processor 156 performs anti-air bind open operations (step 214). If no door is open, processor 156 performs anti-air bind close operations (step 216). After completing anti-air bind operations (steps 214, 216), processor 156 resumes operations in its previous mode (step 210).

Figure 14A:
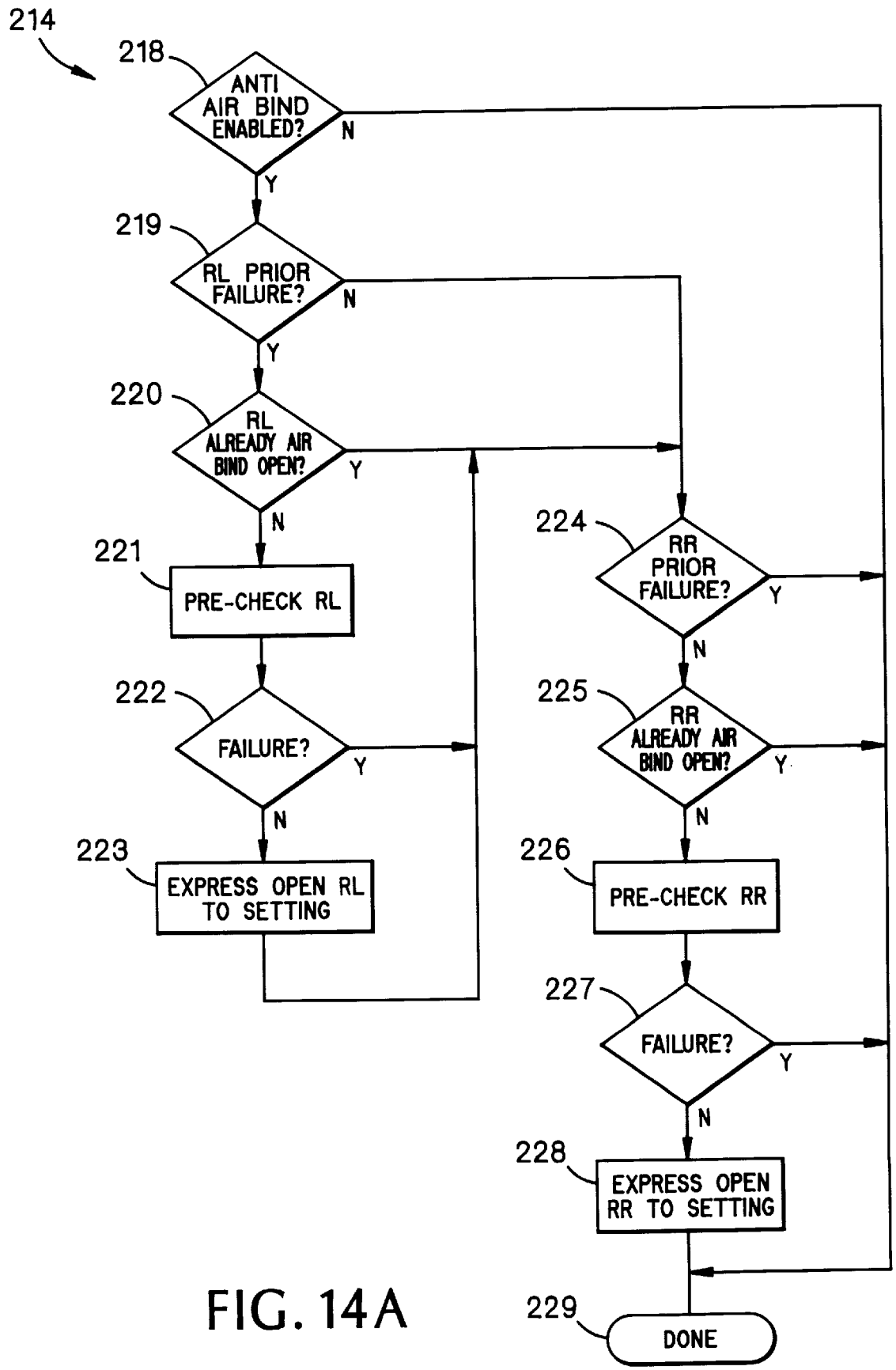
FIGS. 14A–14C are flow charts of anti air bind procedures implemented by the controller of FIG. 12.

Referring to FIG. 14A, in anti air bind opening procedure 214, processor 156 first determines whether the anti air bind feature is enabled (step 218). As previously discussed, the anti air bind feature is enabled/disabled while processor 156 is operating in the parking mode by simultaneously pressing the two window switches 24 on the driver's console 26 that correspond to the rear left and rear right windows 18.

If the anti air bind feature is enabled (step 218), processor 156 next determines whether processor 156 failed in a prior attempt at opening rear left window 18 for anti air bind purposes (step 219), and whether processor 156 has already opened rear left window 18 for anti air bind purposes (step 220). If there has been no previous failure (step 219), and rear left window 18 is not already open to the anti air bind level (step 220), processor 156 performs a pre-check of the obstruction detection system 52 for rear left window 18 (step 221). If the pre-check is successful, as indicated by a pre-check flag being set to "pass" (step 222), processor 156 express opens rear left window 18 to the anti air bind level (step 223), which, as previously discussed, is selected by pressing the window switch 24 on rear left door 14. Processor 156 opens rear left window 18 to the anti-air bind level by activating motor 22 for a sufficient time for rear left window 18 to reach that level. Because processor 156 knows the speed at which motor 22 operates, processor 156 can determine the position of window 18 from the duration in which motor 22 is activated.

If the pre-check fails (step 222), this indicates either that the obstruction detection system 52 corresponding to rear left window 52 is not operating correctly or that an obstruction is present. Because such a failure would prevent processor 156 from closing rear left window 18 once all doors 14, 16 are closed, processor 156 does not open rear left window 18 and instead determines whether it failed in a prior attempt at opening rear right window 18 for anti air bind purposes (step 224).

Processor 156 also determines whether it failed in a prior attempt at opening rear right window 18 for anti air bind purposes (step 224) after opening rear left window 18 (step 223), and upon determining that it failed in a prior attempt at opening rear left window 18 (step 219) or that rear left window 18 is already open (step 220). If there has been no previous failure (step 224), and rear right window 18 is not already open to the anti air bind level (step 225), processor 156 performs a pre-check of the obstruction detection system 52 for rear right window 18 (step 226). If the pre-check is successful (step 227), processor 156 express opens rear right window 18 to the anti air bind level (step 228).

If the pre-check is unsuccessful (step 227), processor 156 exits anti air bind open procedure 214 (step 229). Processor 156 also exits anti air bind open procedure 214 after opening rear right window 18 (step 228), or upon determining that the anti air bind feature is not enabled (step 218), that there has been a prior failure in opening rear right window 18 (step 224), or that rear right window 18 is already open (step 225).

Though processor 156 opens both rear windows 18 to the preset anti air bind level when performing anti air bind operations, processor 156 could also be configured in other ways. For example, processor 156 could be configured to only open one rear window 18, to open one or both front windows 16, or to open sunroof 20. In addition, processor 156 could be configured to only open rear windows 18 for anti air bind purposes when a rear window 18 is not already open (or when no window 16, 18 is already open).

Figure 14B:
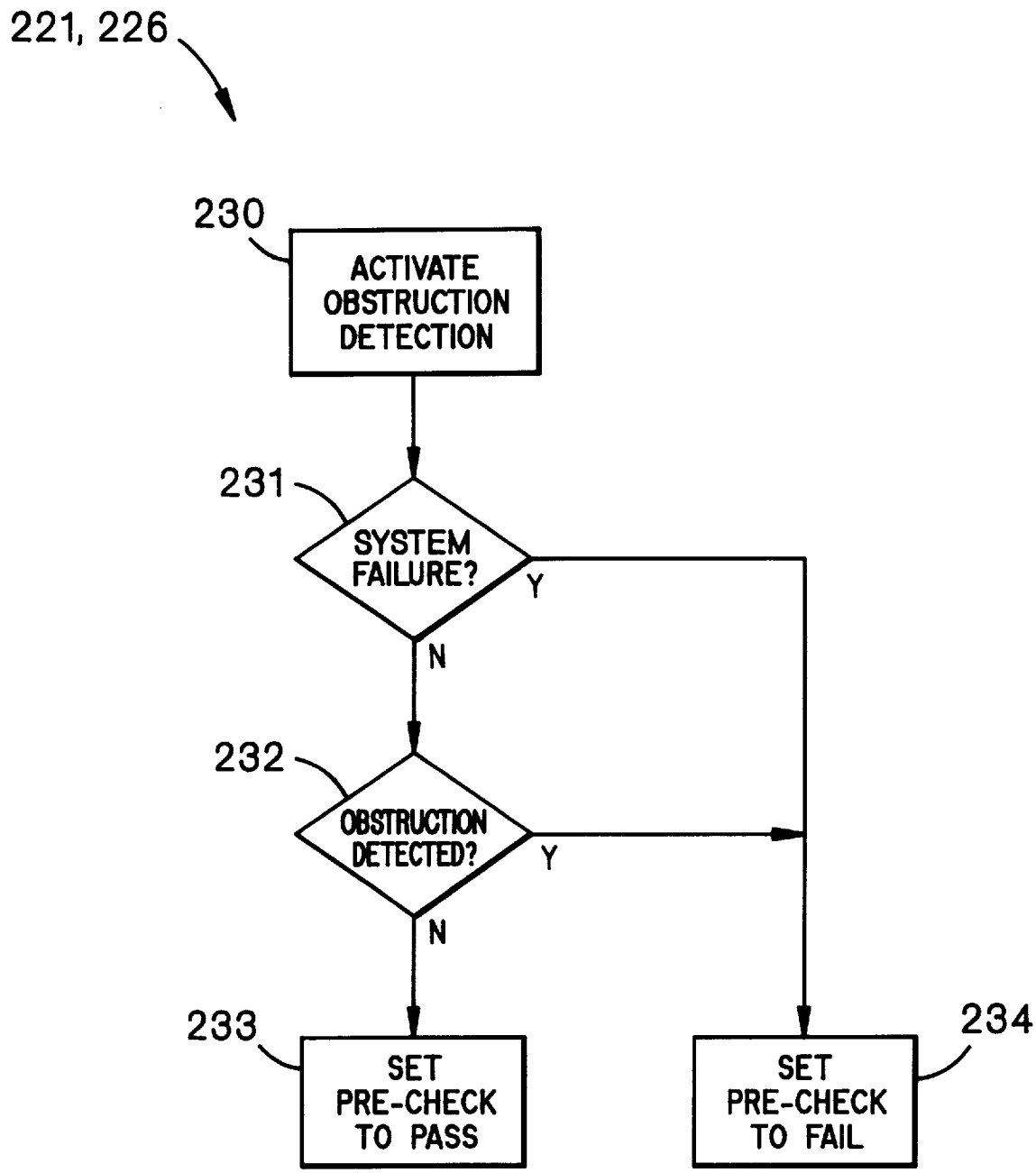

Referring to FIG. 14B, processor 156 performs pre-check procedures 221, 226 by first activating the obstruction detection system 52 corresponding to the designated window 18 (step 230). If the obstruction detection system 52 indicates neither a system failure (step 231) nor the presence of an obstruction (step 232), then processor 156 sets the pre-check flag to "pass" (step 233). Otherwise, processor 156 sets the pre-check flag to "fail" (step 234).

Figure 14C:
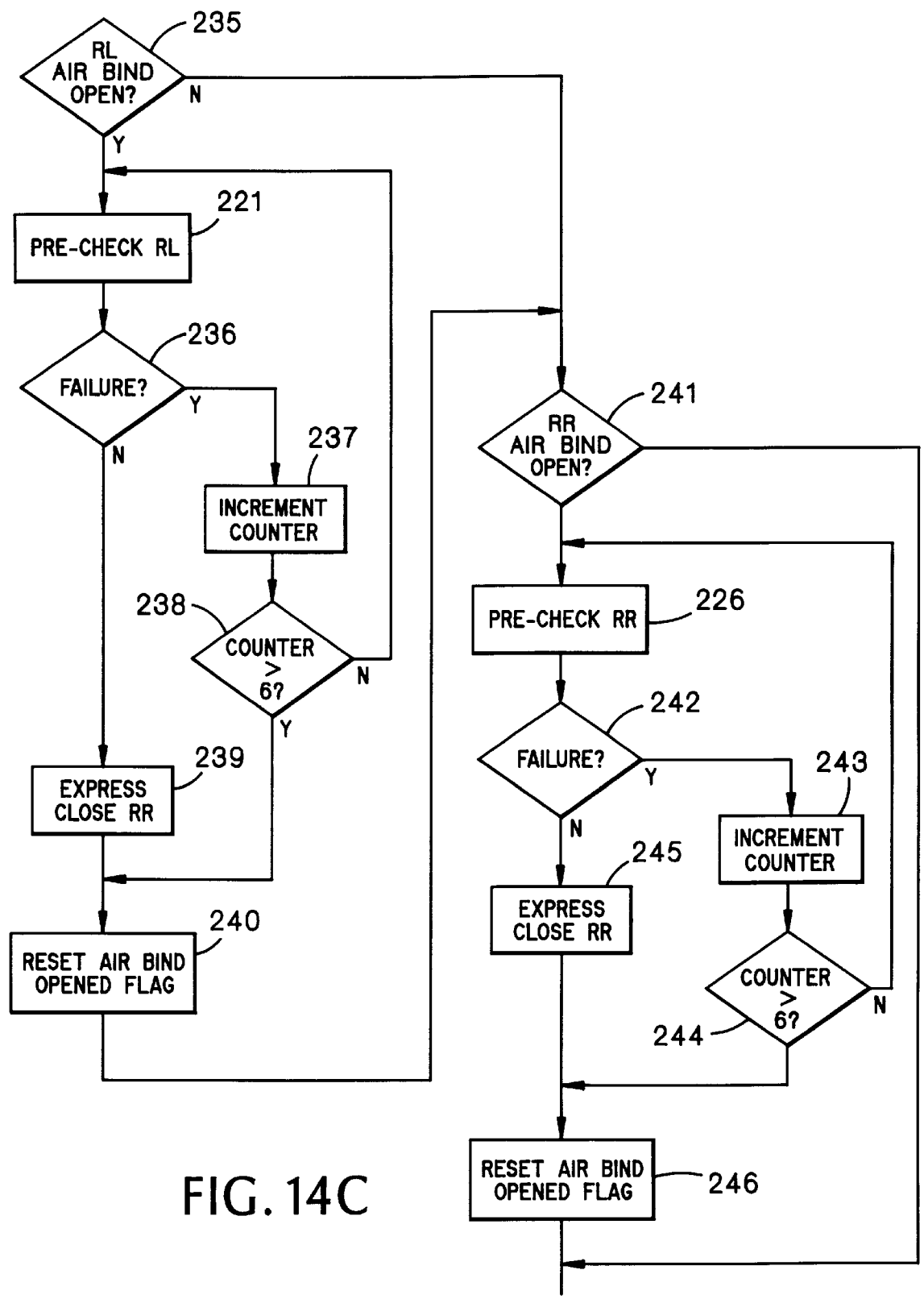

Referring to FIG. 14C, in anti air bind close procedure 216, processor 156 first determines whether rear left window 18 has been opened by processor 156 during anti air bind open procedure 214 (step 235), and, if so, pre-checks the obstruction detection system 52 corresponding to rear left window 18 (step 221). If the pre-check indicates a failure (step 236), processor 156 increments a failure count (step 237), and, if the failure count is less than or equal to six (step 238), reperforms the pre-check operation (step 221). These six iterations of the pre-check operation, if performed, take a total of about five to ten seconds.

If the pre-check indicates a pass (step 236), processor 156 express closes rear left window 18 (step 239). While express closing rear left window 18, processor 156 monitors obstruction detection system 52, and, if an obstruction is detected, express opens rear left window 18. However, when an obstruction is detected, processor 156 only express opens rear left window 18 to the anti air bind level. After closing rear left window 18 (step 239), or if the failure count is greater than six (step 238), processor 156 resets a flag that indicates that rear left window 18 was opened during anti air bind open procedure 214 (step 240).

After resetting the flag (step 240), or upon determining the rear left window 18 was not opened during anti air bind procedure 214 (step 235), processor 156 determines whether rear right window 18 was opened during anti air bind procedure 214 (step 241), and, if so, pre-checks the obstruction detection system 52 corresponding to rear right window 18 (step 226). If the pre-check indicates a failure (step 242), processor 156 increments a failure count (step 243), and, if the failure count is less than or equal to six (step 244), repeats the pre-check operation (step 226). If the pre-check indicates a pass (step 242), processor 156 express closes rear right window 18 (step 245). After closing rear right window 18, or upon determining that the failure count is greater than six (step 244), processor 156 resets a flag that indicates that rear right window 18 was opened during anti air bind open procedure 214 (step 246).

Figure 15:
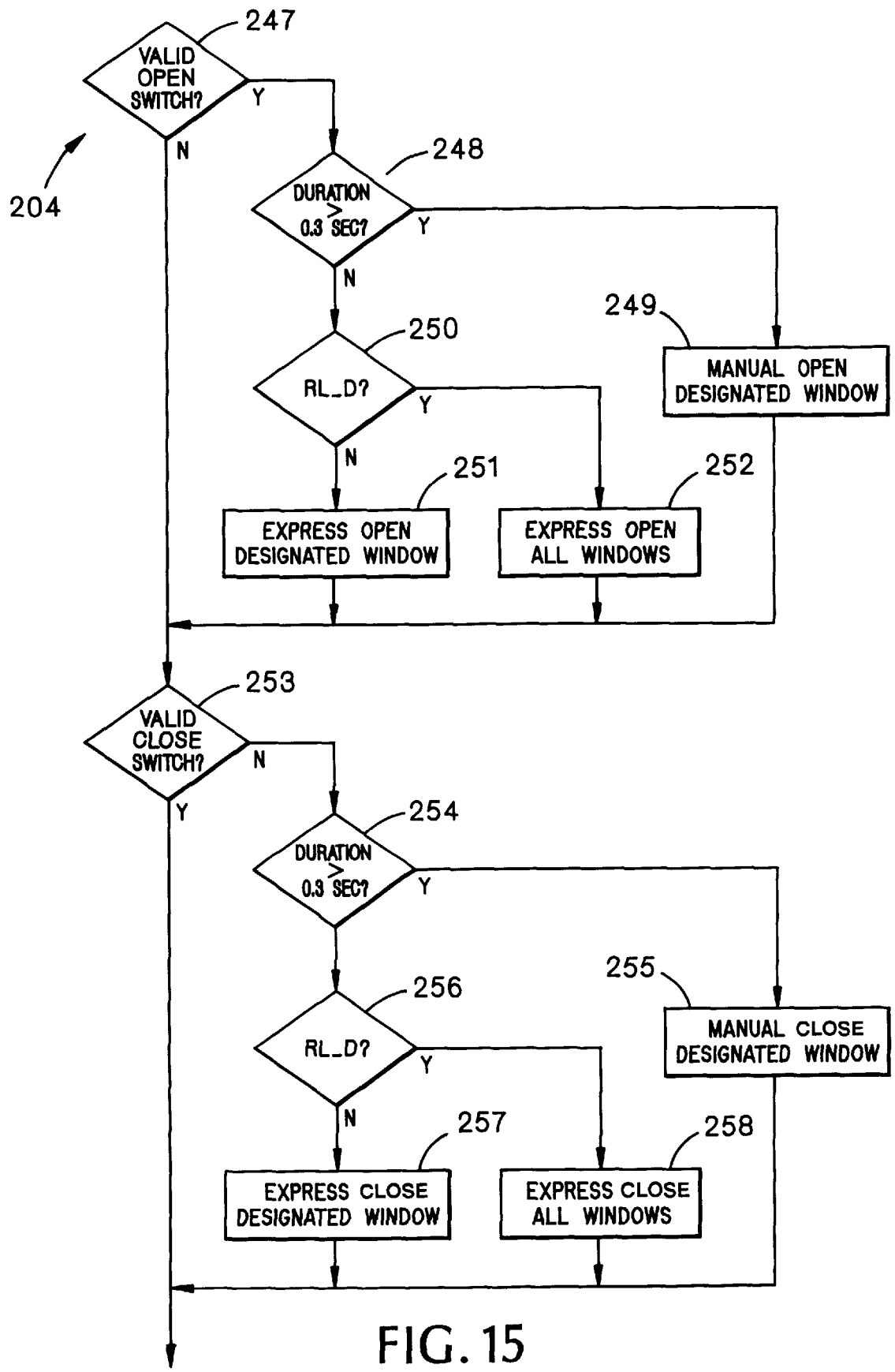
FIGS. 15 is a flow chart of a driving mode procedure implemented by the controller of FIG. 12.

Referring to FIG. 15, when processor 156 performs driving mode operations (step 204), processor 156 first checks to see if a valid open switch has been pressed (step 247). When child guard (CG) switch 160 is active, valid open switches include certain (D, P_D, RL_D, RR_D, and P) window switches 24 and sunroof (SR) switch 28. When child guard (CG) switch 160 is inactive, valid open switches also include the RR and RL window switches 24 (child guard (CG) switch 160 disables RR and RL window switches 24).

If a valid open switch has been pressed (step 247), processor 156 monitors the switch until the switch is either released or pressed for longer than three tenths of a second (step 248). Because as discussed above, switches 24 are directly connected to relays 180 by lines 181, when a switch 24 is pressed, the relay 180 associated with the switch 24 is immediately activated. To prevent any movement of the window associated with switch 24 while testing for express or manual closing, processor 156 activates the other relay 180 associated with the switch 24. Each relay 180 applies twelve volts to a terminal of a motor 22 when active and otherwise connects the terminal of the motor 22 to electrical ground. By activating the second relay 180, processor 156 ensures that the net voltage applied to motor 22 will be zero volts. If the switch is pressed for longer than three tenths of a second, processor 156 manually opens the window associated with the pressed switch (step 249) by activating the corresponding motor 22 until the window reaches the fully open position or the switch is released.

If the switch is pressed for less than three tenths of a second (step 248), and the pressed switch is not the RL_D window switch 24 (step 250), processor 156 express opens the window associated with the pressed switch (step 251) by activating the corresponding motor 22 until the window reaches the fully open position or the switch is pressed again.

If the switch is pressed for less than three tenths of a second (step 248), and the pressed switch is the RL_D window switch 24 (step 250), processor 156 express opens all of the windows (step 252) by sequentially activating the motors 22 until all of the windows reach the fully open position or another switch is pressed. Processor sequentially activates motors 22 to avoid an excessive drain on the battery of automobile 10 that could be caused by simultaneously activating all motors 22.

After responding to any pressed valid open switches, processor 156 checks for pressed valid close switches (step 253). The valid close switches correspond exactly to the valid open switches discussed above. If a valid close switch has been pressed, processor 156 monitors the switch until the switch is either released or pressed for longer than three tenths of a second (step 254). If the switch is pressed for longer than three tenths of a second, processor 156 manually closes the window associated with the pressed switch (step 255) by generating a manual close request and responding according to procedure 120.

If the switch is pressed for less than three tenths of a second (step 254), and the pressed switch is not the RL_D window switch 24 (step 256), processor 156 express closes the window associated with the pressed switch (step 257) by generating an express close request and responding according to procedure 120. Though not illustrated in the discussion of procedure 120, the express close operation, like the express open operation, can be halted by pressing the switch again.

If the switch is pressed for less than three tenths of a second (step 254), and the pressed switch is the RL_D window switch 24 (step 256), processor 156 express closes all of the windows (step 258) by sequentially generating automatic close requests and responding according to procedure 120.

Figure 16A:
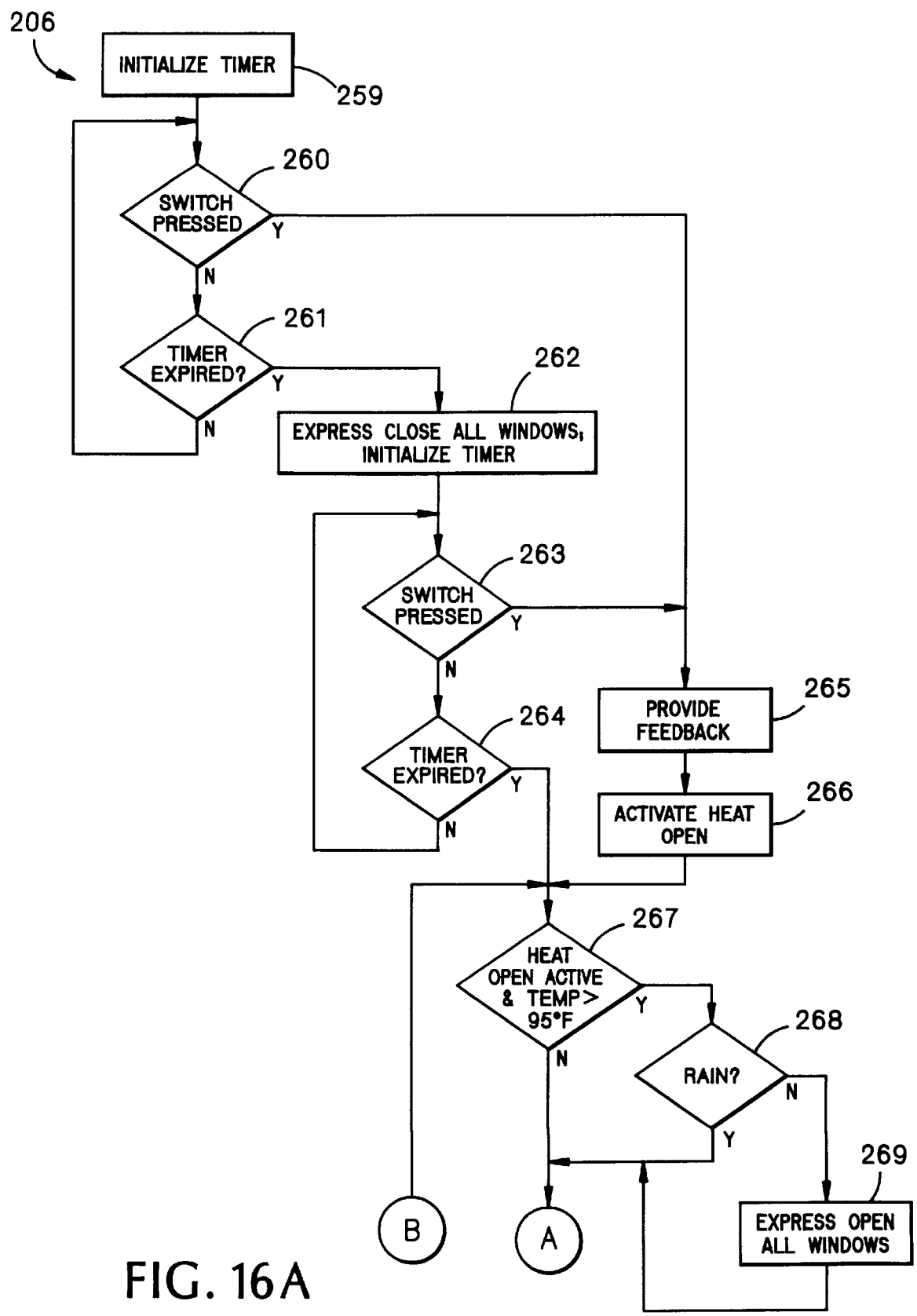
FIGS. 16A–16B are flow charts of a parking mode procedure implemented by the controller of FIG. 12.
Figure 16B:
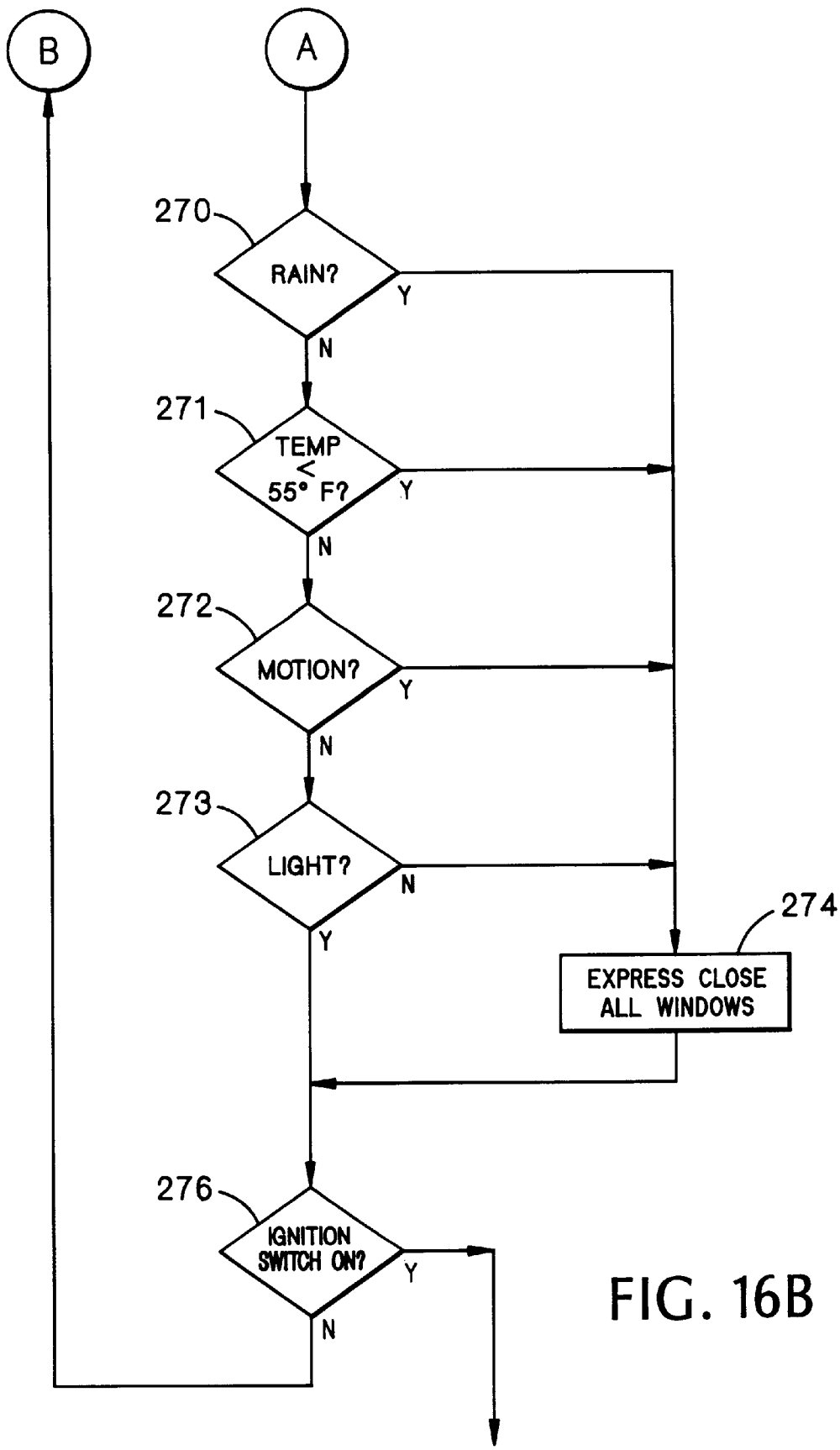

Referring to FIGS. 16A–16B, when processor 156 performs parking mode operations (step 206), processor 156 first initializes a timer to thirty seconds (step 259). Processor 156 then waits either for a switch 24 to be pressed to deactivate security closing (step 260) or for the timer to expire (step 261). If the timer expires before a switch 24 is pressed, processor 156 performs the security close feature by express closing all windows, and reinitializes the timer to thirty seconds (step 262). During security close, the timer interrupt for the anti air bind feature is disabled, and the driver of automobile 10 can stop the closing operation by pressing the switch 24 corresponding to the rear left window 18. As discussed above, processor 156 express closes all windows by generating sequential automatic close requests.

After reinitializing the timer (step 262), processor 156 waits either for a switch 24 to be pressed to activate the heat open feature (step 263) or for the timer to expire (step 264). If the timer expires before a switch is pressed, processor 156 proceeds to further operations. If a switch is pressed before the timer expires (steps 260, 263), processor 156 provides feedback in the form of an audible tone at feedback unit 58 (step 265) and activates the heat open feature (step 266).

Next, if the heat open feature is activated and the temperature in automobile 10 is greater than 95° F. (step 267), and it is not raining (step 268), processor 156 sequentially express opens all windows 24 to positions previously designated by the driver of automobile 10 (step 269). (As discussed above, the driver can designate the extent to which windows 24 open by pressing window switches 24 on console 26 multiple times.)

Finally, if it is raining (step 270), if the temperature is less than 55° F. (step 271), if motion is detected (step 272), or if it is dark (step 273), processor 156 express closes all windows by sequentially generating automatic close requests for each window and responding according to procedure 120 (step 274). Thereafter, if ignition switch remains off (step 276), processor 156 repeats the process by checking for a temperature in excess of 95° F. (step 258). Typically, occupant controlled opening and closing of windows 16, 18 is disabled when processor 156 is in the parking mode. However, if desired, these features could be easily implemented therein.

In addition to the failsafe features described above, such as the feedback loop in obstruction detection system 52 and the use of lines 181 to allow switches 24 to bypass processor 156, system 44 includes numerous other failsafe features. Processor 156 includes an interrupt driven timing routine that monitors the time involved in performing system operations and, when excessive time indicates that processor 156 has somehow malfunctioned, resets processor 156. For example, the timing routine knows the time required to open or close a window 16, 18 (typically about ten seconds), and would therefore reset processor 156 whenever processor 156 has caused a motor 22 to operate for more than the required time. By resetting processor 156, the timing routine reduces the risk that processor 156 will become stuck in an endless loop and that a motor 22 will be damaged by continuing to operate after a window is fully open or fully closed. In addition, processor 156 could perform dynamic diagnostic checks of system components such as rain sensor 34 or temperature sensor 36.

Figure 17:
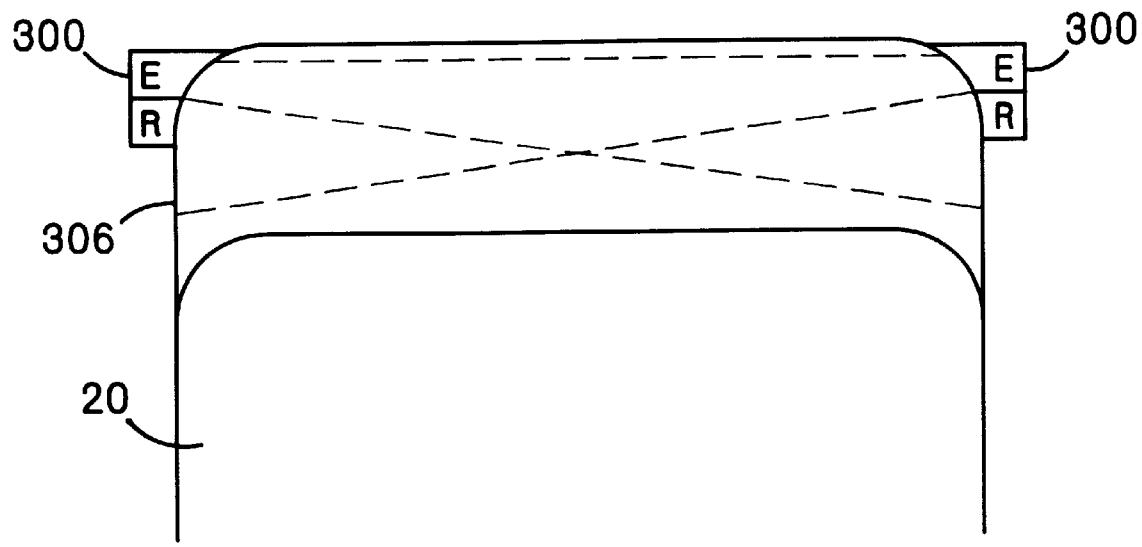
FIGS. 17 and 17A are top views of emitter/receiver placement for an obstruction detection system of the automatic window system of FIG. 3.
Figure 18:
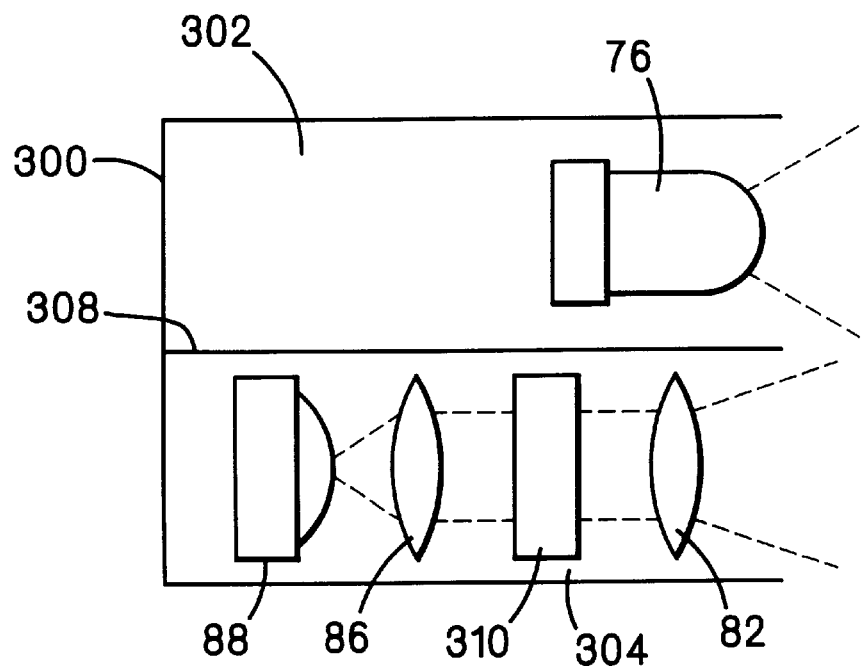
FIGS. 18 and 18A are schematics of sunroof emitter/receiver units of the system of FIG. 3.

Referring to FIGS. 17 and 18, obstruction detection for sunroof 20 is achieved with a dual emitter/dual receiver configuration. Two emitter/receiver units 300, each including an emitter 302 and a receiver 304, are positioned in the front corners of sunroof frame 306. Emitter/receiver units 300 are oriented so that an energy beam produced by the emitter 302 of one emitter/receiver unit 300 is incident on the receiver 304 of the other emitter/receiver unit 300. A barrier 308 is provided between emitter 302 and receiver 304 so that the energy beam from the emitter 302 of an emitter/receiver unit 300 is not directly incident on the receiver 304 of the same emitter/receiver unit 300.

Each emitter 302 includes an infrared LED 76 that produces a conical infrared beam having an angle of 25°–30° and a wavelength of 950 nanometers. A suitable LED 76 is model number GL538 from Sharp. The housing of emitter 302 limits the conical angle of the infrared beam produced by emitter 302 to about 10°.

Each receiver 304 includes a biconvex lens 82 that focusses incoming energy into a parallel beam directed at a high pass filter 310 that passes energy having wavelengths in excess of 750 nanometers. From high pass filter 310, the parallel beam is directed to a second biconvex lens 86 that focusses the beam on a photo IC 88 that produces a voltage signal which varies with the intensity of the beam. As discussed with respect to the window system, photo IC 88 produces a voltage having a high value of about five volts when less than a threshold amount of energy is being received to a low value of about zero volts when more than the threshold amount of energy is being received.

In operation, emitters 302 are driven by 38 kHz signals that are modulated by a series of 400 Hz pulses that are configured so that only one emitter 302 is driven at any time. Obstructions are detected when a beam from an emitter 302 of one of the emitter/receiver units 300 is interrupted and prevented from reaching the receiver 304 of the other emitter/receiver unit 300 so that the output of the receiver 304 remains high. Obstructions are also detected when a beam from an emitter 302 of one of the emitter/receiver units 300 is reflected back to the receiver 304 of the same emitter/receiver unit 300 so that the output of the receiver 304 changes to a low value.

Use of two receivers 304 and two emitters 302 operating in an alternating fashion eliminates any risk that sunlight will cause the system to fail to detect an obstruction. As discussed with respect to the window system, the 38 kHz band pass filter in photo IC 88 prevents sunlight from being detected by photo IC 88. However, sunlight can still saturate photo IC 88 and thereby prevent photo IC 88 from detecting the 38 kHz signal from the emitter 302. By using two receivers 304 positioned so that sunlight can only strike one of them at any given time, the dual emitter/dual receiver system eliminates the effects of sunlight.

An obstruction free condition, F, for sunroof 20 can be expressed as a logical equation:

$$F = E1 R1 \overline{R2} + E2 R2 \overline{R1}$$

where E1 and E2 are the emitters 302 in, respectively, the front left and front right corners and have values of logical one while emitting a 38 kHz modulated signal, and R1 and R2 are the receivers 304 in, respectively, the front right and front left corners of sunroof frame 306 and have values of logical one while receiving a 38 kHz modulated signal. According to this equation, sunroof 20 is obstruction free when the front left emitter 302 (E1) is emitting, the front right receiver 304 (R1) is receiving, and the front left receiver 304 (R2) is not receiving, or when the front right emitter 302 (E2) is emitting, the front left receiver 304 (R2) is receiving, and the front right receiver 304 (R1) is not receiving. This equation works even when a receiver 304 is saturated by sunlight and unable to receive a signal from an emitter 304. For example, when the front left receiver 304 (R2) is saturated, R2 always has a value of logical zero and the equation reduces to:

$$F = E1 R1.$$

Thus, when a receiver 304 is saturated by sunlight, the sunroof obstruction detection system still functions.

Because it does not require a cylindrical lens 80, the sunroof obstruction detection system is substantially less expensive than the window obstruction detection system. However, due to the conical nature of the beams produced by emitters 302, the sunroof obstruction detection system is unsuited for use in a window. Moreover, due to difficulties associated with installing the window system in a way that would not result in false detections caused by the driver's head or the passenger's head, the window obstruction detection system would be difficult to use in a sunroof.

Figure 17A:
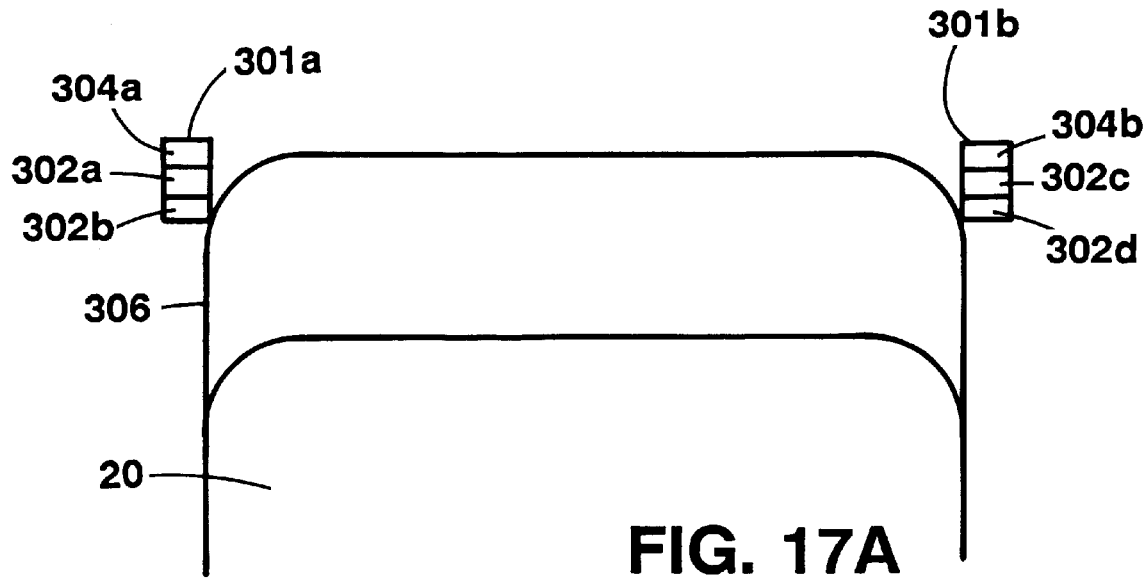
Figure 18A:
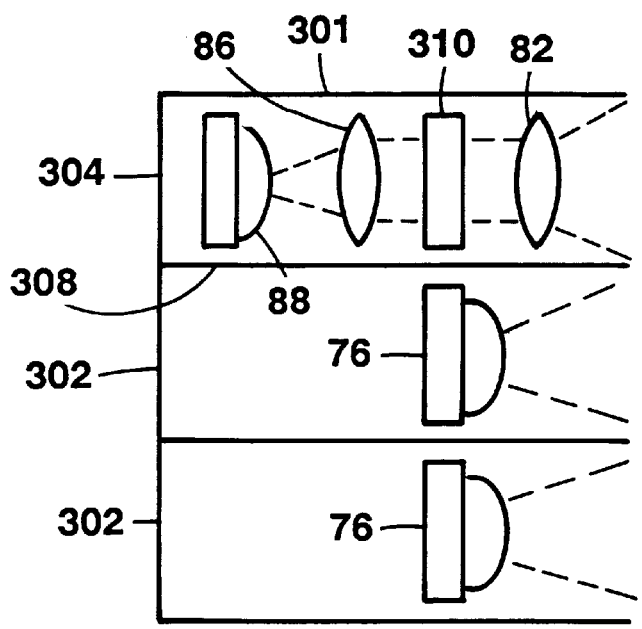

Referring to FIGS. 17A and 18A, obstruction detection for sunroof 20 may also be achieved with a quad emitter/dual receiver configuration. Two emitter/receiver units 301, each including two emitters 302 and a receiver 304, are positioned in the front corners of sunroof frame 306. Emitter/receiver units 301 are oriented so that energy beams produced by the emitters 302 of one emitter/receiver unit 301 are incident on the receiver 304 of the other emitter/receiver unit 301. A barrier 308 is provided between emitters 302 and receiver 304 so that the energy beams from the emitters 302 of an emitter/receiver unit 301 are not directly incident on the receiver 304 of the same emitter/receiver unit 301.

With this arrangement, the emitters and receivers are alternately operated as follows. First, an emitter 302*a* of a first unit 301*a* and a receiver 304*b* of a second unit 301*b* are activated, an obstructions that prevent or reduce transmission of the beam from emitter 302*a* are detected. Next, emitter 302*a* is deactivated and emitter 302*b* of unit 301*a* is activated to detect obstructions that prevent or reduce transmission of the beam from that emitter. Next, emitter 302*b* and receiver 304*b* are deactivated, a receiver 304*a* of unit 301*a* is activated, and an emitter 302*c* of unit 302*b* is activated to detect obstructions that prevent or reduce transmission of a beam from that detector. Next, emitter 302*c* is deactivated and an emitter 302*d* of unit 302*b* is activated to detect obstructions that prevent or reduce transmission of a beam from that detector. Thereafter, emitter 302*d* is deactivated and emitters 302*a* and 302*b* are simultaneously activated to detect obstructions that reflect the beams produced by those emitters. Finally, emitters 302*a* and 302*b* and receiver 304*a* are deactivated, receiver 304*b* is activated, and emitters 302*c* and 302*d* are simultaneously activated to detect obstructions that reflect the beams produced by those emitters.

Figure 19:
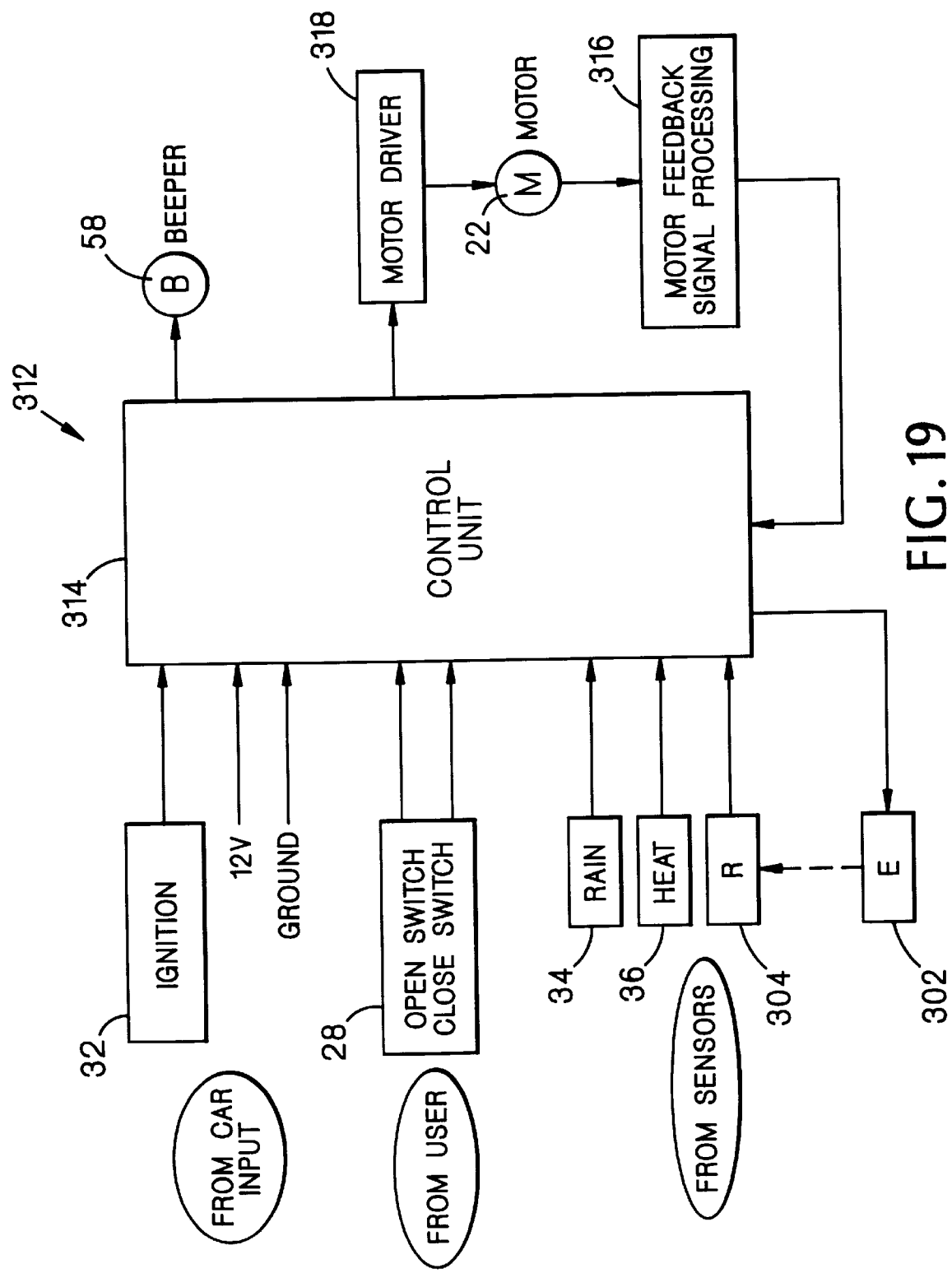
FIG. 19 is a block diagram of a sunroof control system.

While, as discussed above, control of sunroof 20 can be integrated into system 44, control of sunroof 20 can also be implemented using a separate system 312, as illustrated in FIG. 19. System 312 includes a control unit 314 that receives input from ignition switch 32, sunroof switch 28, rain sensor 34, temperature sensor 36, receivers 304, and a motor feedback signal processing unit 316. In response to these inputs, control unit 312 operates emitters 302 and a motor driver 318 that drives the sunroof motor 22.

Control unit 314 is implemented using an Intel 8051 processor. The Intel 8051 processor includes four data ports, particular bits of which are connected as follows:

| | |
|---|---|
| P1.2 | ignition switch 32 |
| P1.3 | sunroof switch 28 (close) |
| P1.4 | sunroof switch 28 (open) |
| P1.5 | beeper 58 |
| P1.6 | motor driver 318 (open) |
| P1.7 | motor driver 318 (close) |
| P2.0 | emitter 302 (one) |
| P2.1 | emitter 302 (two) |
| P2.2 | sunroof 20 (closed indicator) |
| P2.3 | rain sensor 34 or temperature sensor 36 (cold) |
| P2.4 | temperature sensor 36 (hot) |
| P2.6 | receiver 304 (one) |
| P2.7 | receiver 304 (two) |
| P3.2 | motor feedback signal processing unit 316 |

Assembly language software for implementing the features of system 312 is included as Appendix B. This software has been run in an actual implementation of system 312 after being compiled using a Maclink version 1.02 compiler.

Figure 20:
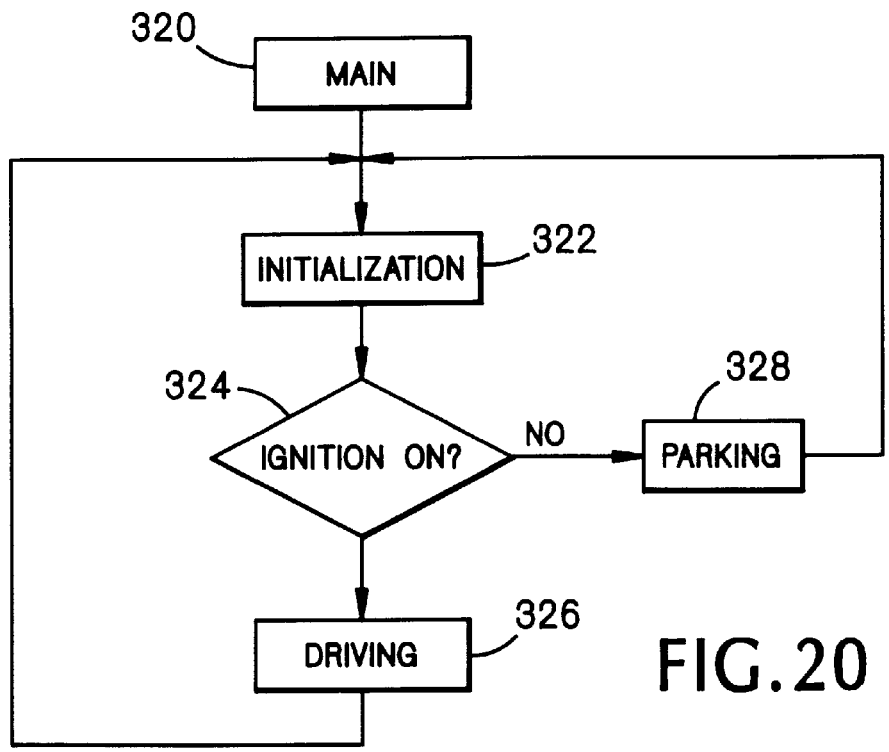
FIGS. 20–29 are flow charts of procedures implemented by a control unit of the sunroof control system of FIG. 19.

As illustrated in FIG. 20, control unit 314 implements a main procedure 320. After initialization (step 322), if ignition switch 32 is on (step 324), control unit 314 performs a driving procedure (step 326), and, if ignition switch 32 is off (step 324), control unit 314 performs a parking procedure (step 328).

Figure 21:
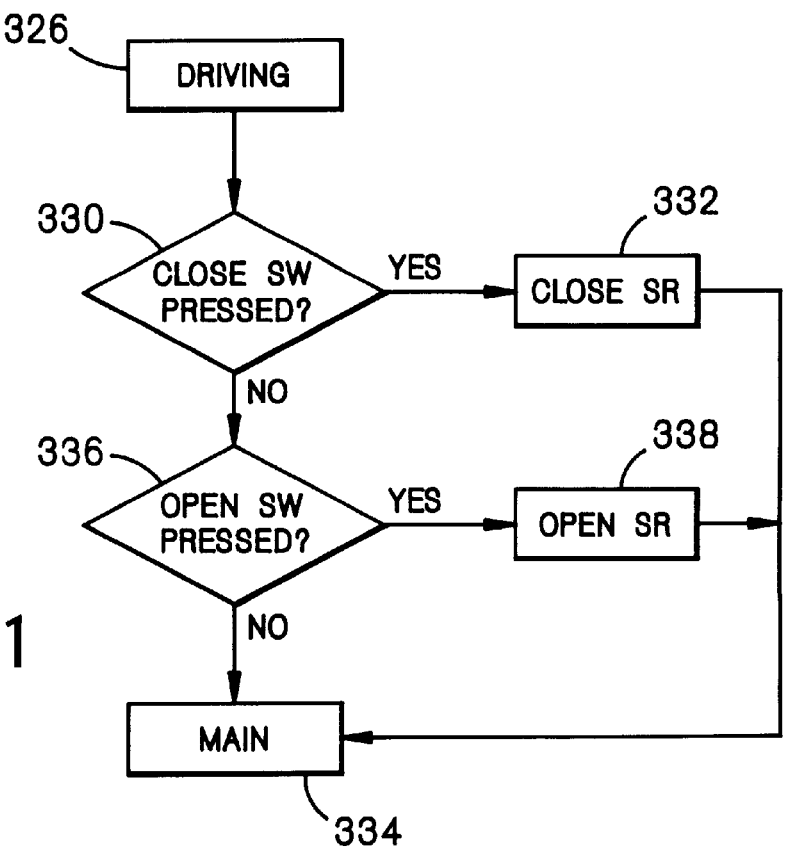

Operations in driving procedure 326 (FIG. 21) are based on the position of sunroof switch 28, which can be in a close position, an open position, or an inactive position. If switch 28 is in the close position (step 330), control unit performs a procedure to close sunroof 20 (step 332) and returns to the main procedure (step 334). If switch 28 is in the open position (step 332), control unit performs a procedure to open sunroof 20 (step 336) and returns to the main procedure (step 334). If switch 28 is in the inactive position, control unit 314 returns to the main procedure (step 334).

Sunroof 20 can be in an opened position, a closed position, or a vented position. When sunroof 20 is in the closed position, setting switch 28 to the open position will cause sunroof 20 to move to the opened position, and setting switch 28 to the close position will cause sunroof 20 to move to the vented position. When sunroof 20 is in the opened position, setting switch 28 to the close position will cause sunroof 20 to move to the closed position. Finally, when sunroof 20 is in the vented position, setting switch 28 to the open position will cause sunroof 20 to move to the closed position.

Figure 22:
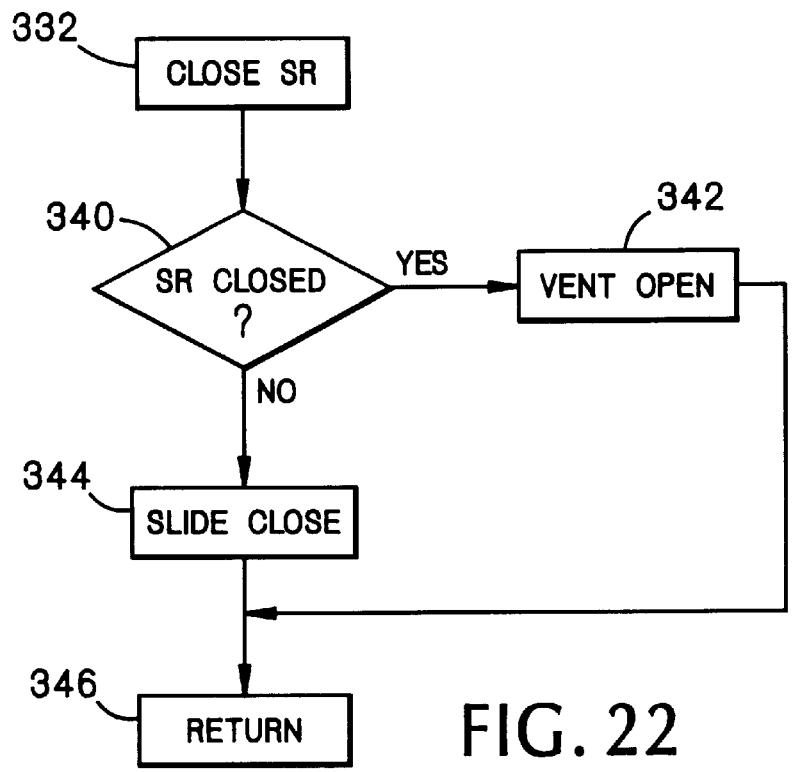

In close sunroof procedure 332 (FIG. 22), if sunroof 28 is in the closed position (step 340), control unit 314 performs a vent open procedure (step 342). If sunroof 28 is not in the closed position (step 340), control unit 314 performs a slide close procedure (step 344). After performing the vent open procedure (step 342) or the slide close procedure (step 344), control unit 314 returns to the previous procedure (step 346).

Figure 23:
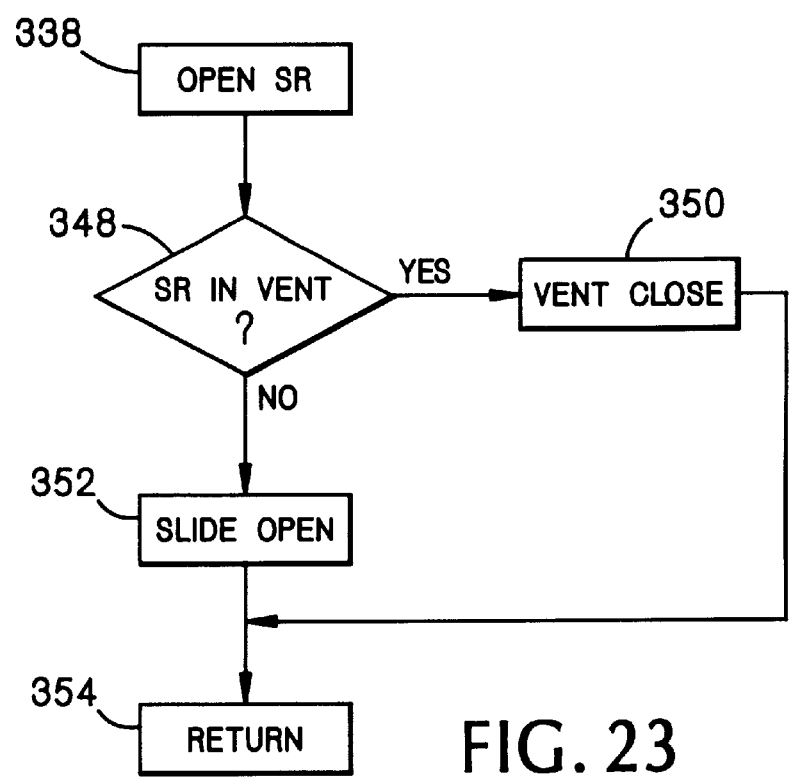

In open sunroof procedure 338 (FIG. 23), if sunroof 28 is in the vented position (step 348), control unit 314 performs a vent close procedure (step 350). If sunroof 28 is not in the vented position (step 348), control unit 314 performs a slide open procedure (step 352). After performing the vent close procedure (step 350) or the slide open procedure (step 352), control unit 314 returns to the previous procedure (step 354).

Figure 24:
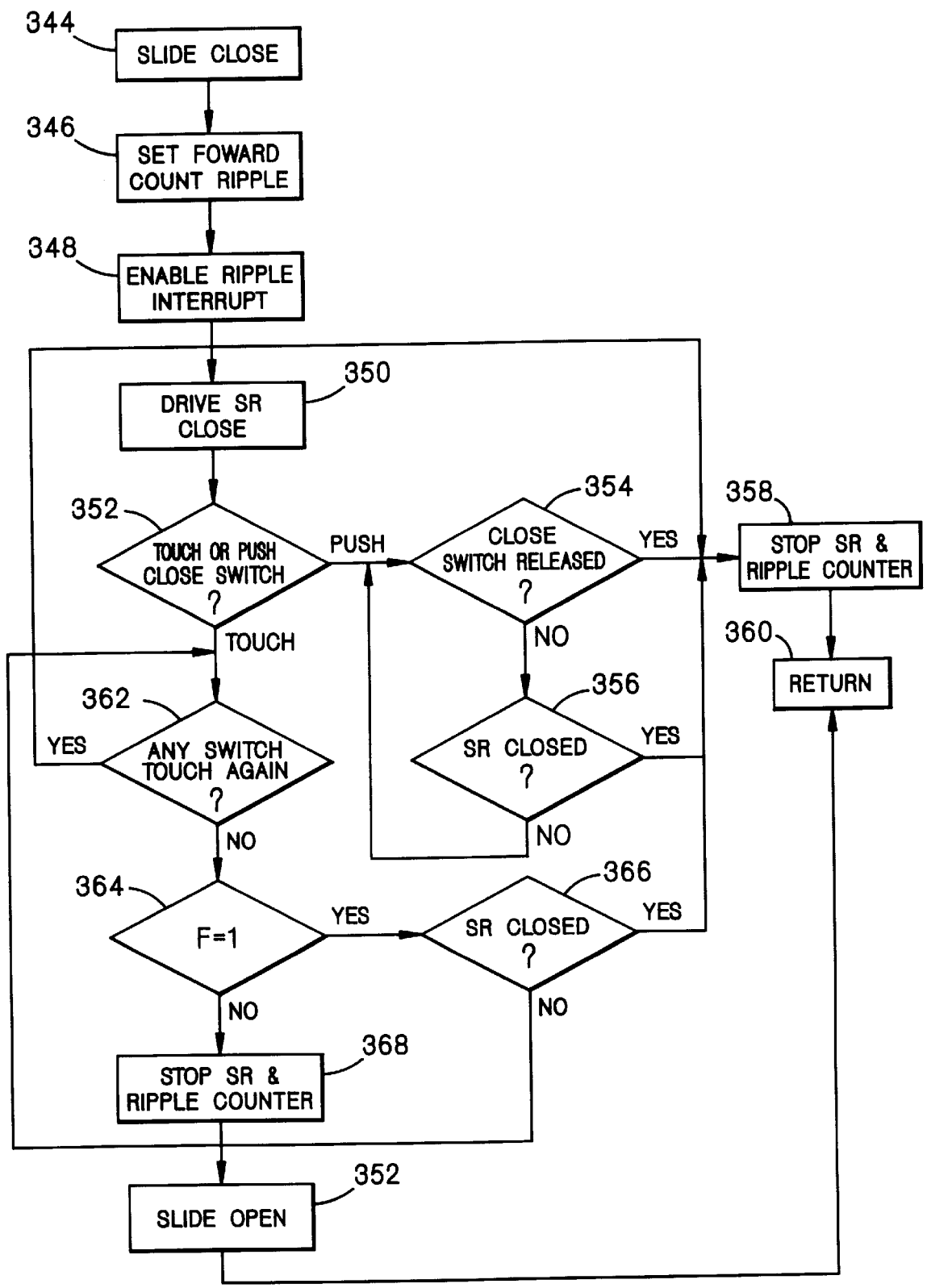
Figure 28:
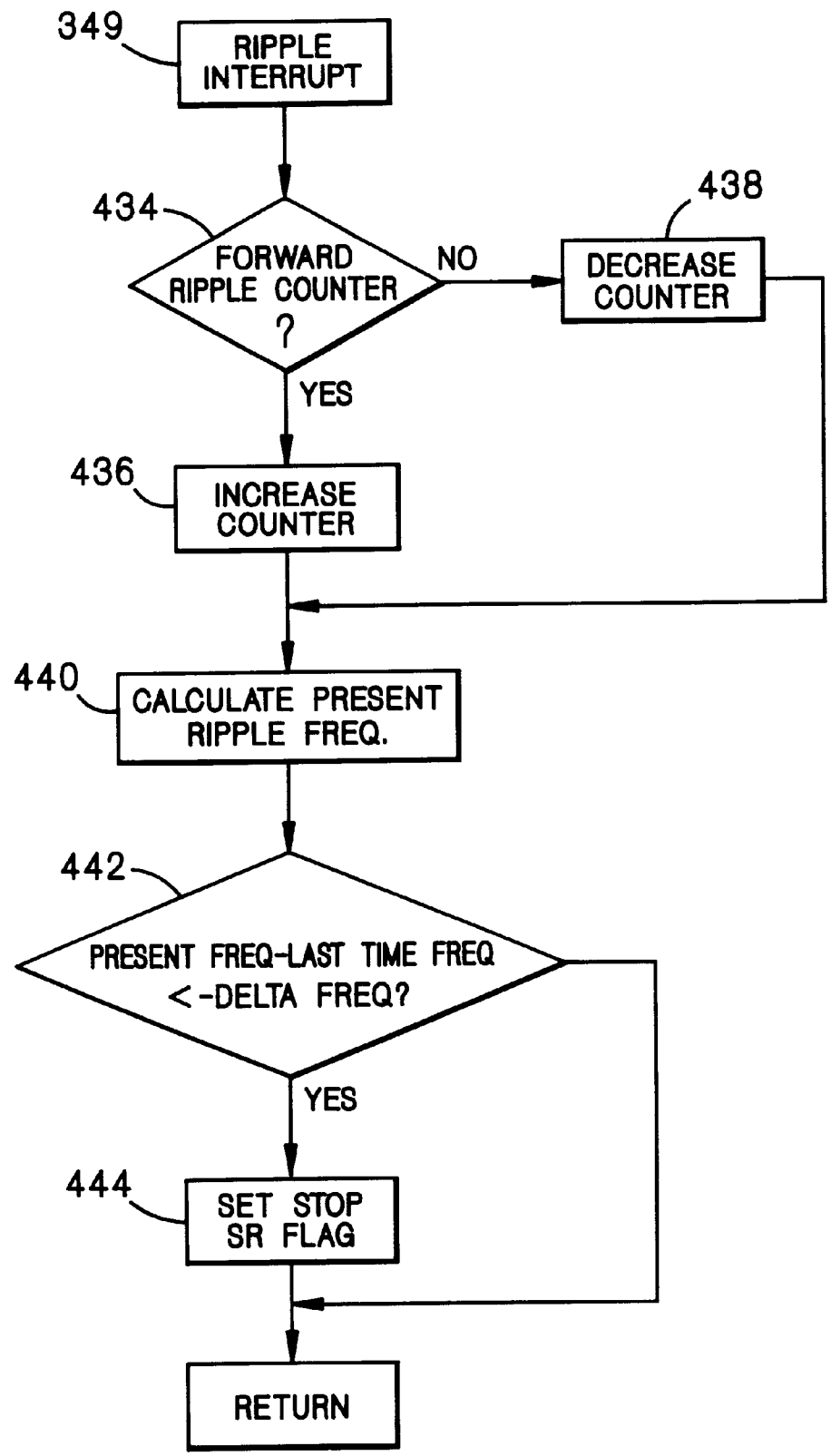
Figure 29:
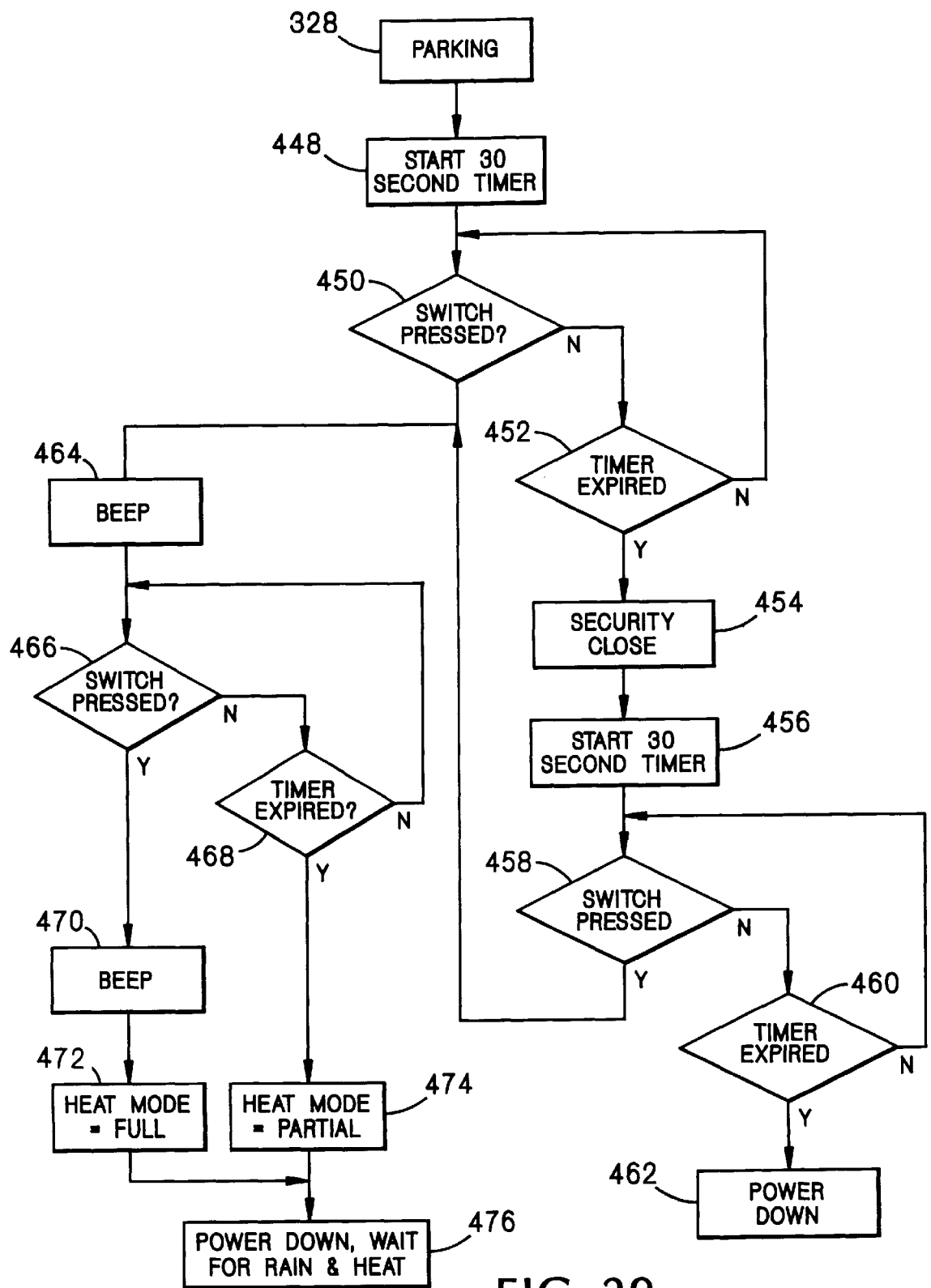

In slide close procedure 344 (FIG. 24), control unit 314 sets a ripple counter to an increment mode (step 346). Control unit 314 uses the ripple counter, which counts current ripples in motor 22 and is supplied by motor feedback signal processing unit 316, to detect that sunroof 20 has reached a fully open or fully vented position. Control unit 314 also enables (step 348) a ripple interrupt procedure 349 (FIG. 28) that control unit 314 uses to increment or decrement the ripple counter each time a ripple occurs, and to pressure detect an obstruction in the path of sunroof 20.

After enabling ripple interrupt 349 (step 348) control unit 314 signals motor driver 318 to activate motor 22 to close sunroof 20 (step 350) and determines whether switch 28 was touched or pushed (step 352). If switch 28 was pushed, this indicates that manual closing was selected, and control unit 314 allows motor driver 318 to continue to close sunroof 20 until switch 28 is released (step 354) or sunroof 20 reaches the fully closed position (step 356). When either of these conditions occur, control unit 314 signals motor driver 318 to deactivate motor 22 and stops the ripple counter (step 358) before returning to the previous procedure (step 360).

If switch 28 was touched, this indicates that express closing was selected, and control unit 314 allows motor driver 318 to continue to close sunroof 20 until switch 28 is touched again (step 362), an obstruction is detected (F=0) (step 364) or sunroof 20 reaches the fully closed position (step 366). When switch 28 is touched again (step 362) or sunroof 20 becomes fully closed (step 366), control unit 314 signals motor drivers 318 to deactivate motor 22 and stops the ripple counter (step 358) before returning to the previous procedure (step 360). When an obstruction is detected (step 364), control unit 314, after signaling motor driver 318 to deactivate motor 22 and stopping the ripple counter (step 368), performs the slide open procedure (step 352).

Figure 25:
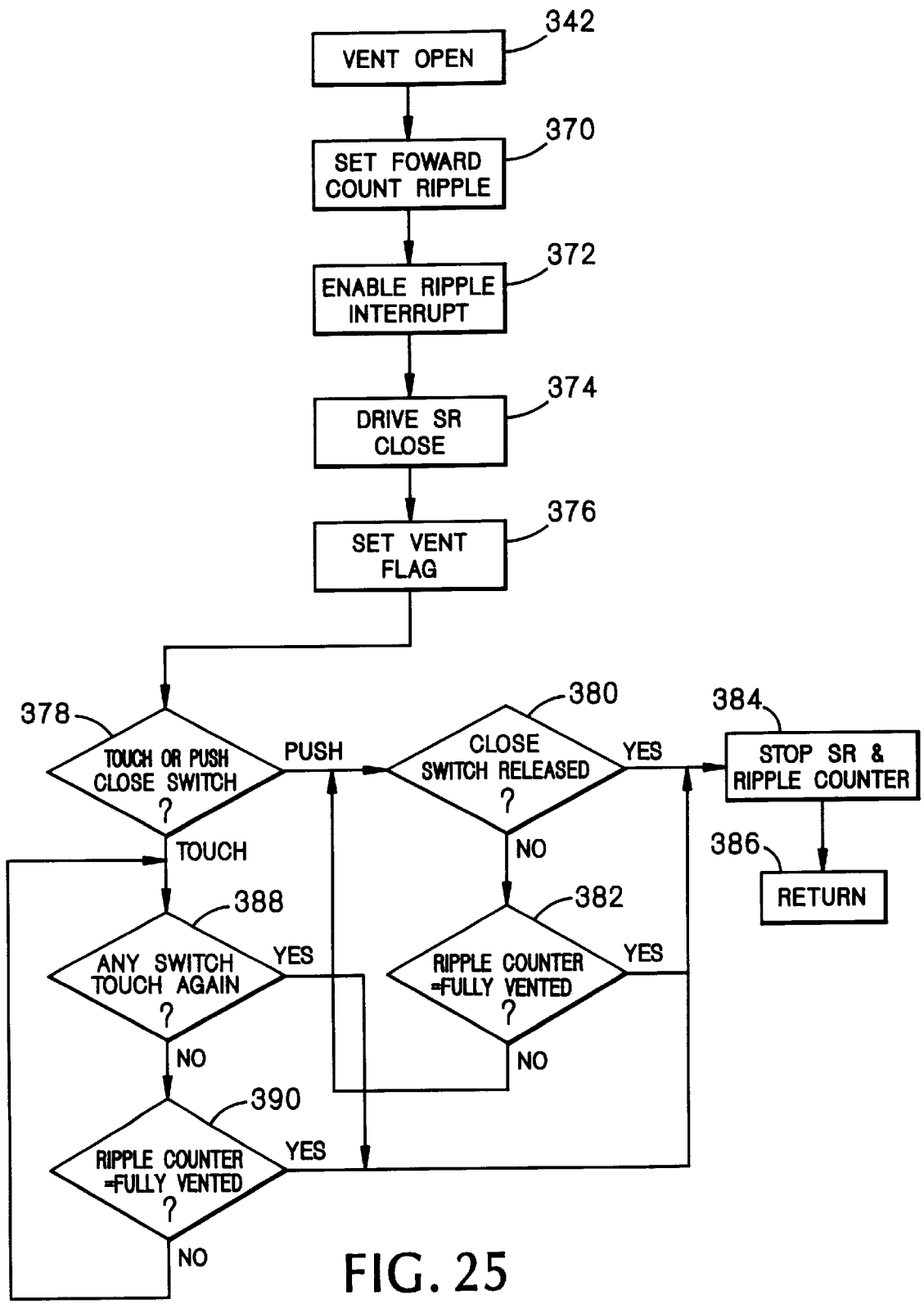

In vent open procedure 342 (FIG. 25), control unit 314 sets the ripple counter to an increment mode (step 370), enables ripple interrupt 349 (step 372), signals motor driver 318 to activate motor 22 to drive sunroof 20 in the close direction (step 374), and sets an internal vent flag that indicates that sunroof 20 is in the vented position and is automatically reset when sunroof 20 reaches the fully closed position (step 376). Next, control unit 314 determines whether switch 28 was touched or pushed (step 378). If switch 28 was pushed, this indicates that manual closing was selected, and control unit 314 continues to close sunroof 20 until switch 28 is released (step 380) or the ripple counter indicates that sunroof 20 is in the fully vented position (step 382). When either of these conditions occur, control unit 314 signals motor driver 318 to deactivate motor 22 and stops the ripple counter (step 384) before returning to the previous procedure (step 386).

If switch 28 was touched, this indicates that express venting was selected, and control unit 314 allows motor driver 318 to continue to vent sunroof 20 until switch 28 is touched again (step 388) or the ripple counter indicates that sunroof 20 is in the fully vented position (step 390). When either of these conditions occur, control unit 314 signals motor driver 318 to deactivate motor 22 and stops the ripple counter (step 384) before returning to the previous procedure (step 386).

Figure 26:
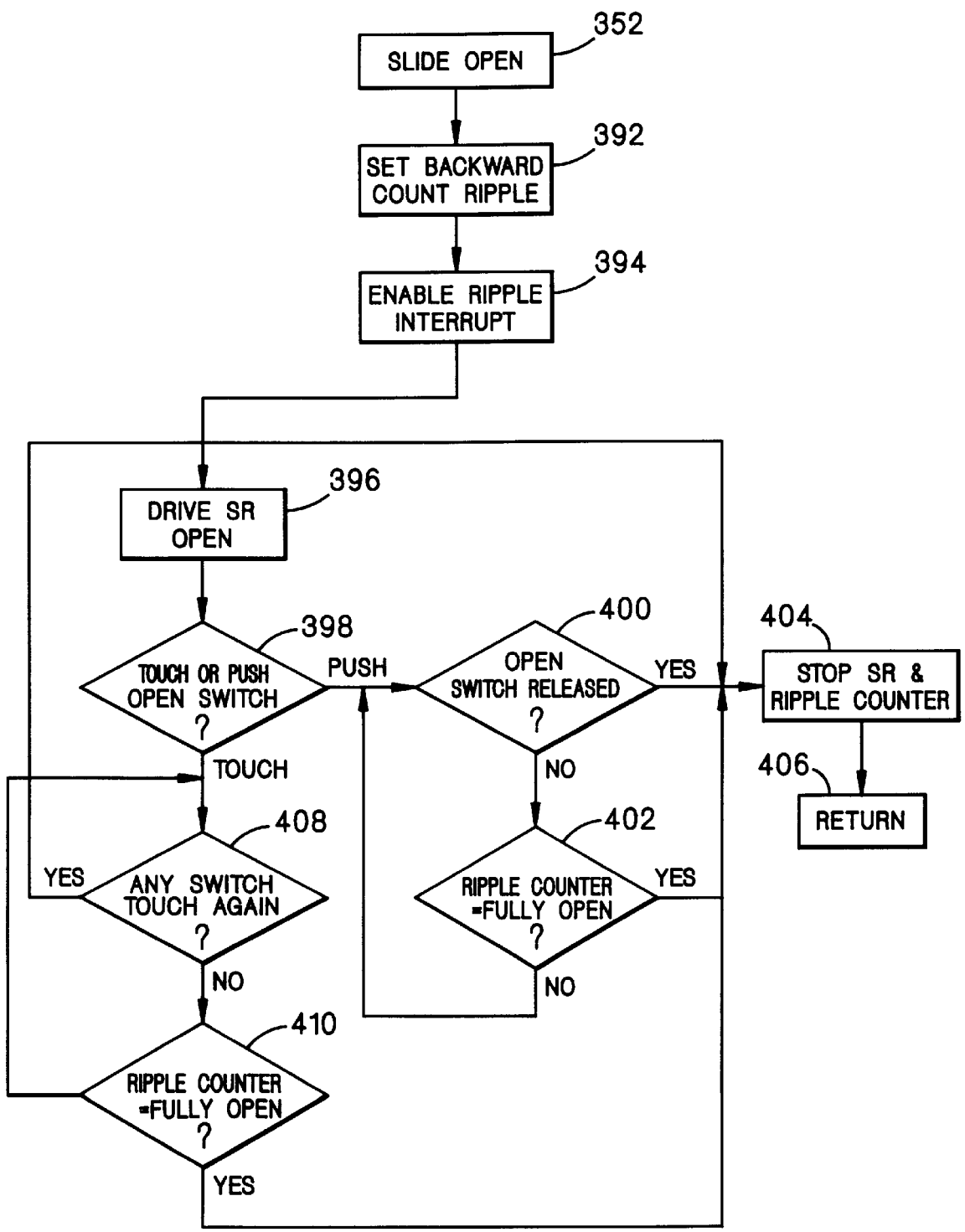

In slide open procedure 352 (FIG. 26), control unit 314 sets the ripple counter to a decrement mode (step 392), enables ripple interrupt 349 (step 394), and signals motor driver 318 to activate motor 22 to drive sunroof 20 in the open direction (step 396). Next, control unit 314 determines whether switch 28 was touched or pushed (step 398). If switch 28 was pushed, this indicates that manual closing was selected, and control unit 314 continues to close sunroof 20 until switch 28 is released (step 400) or the ripple counter indicates that sunroof 20 is in the fully open position (step 402). When either of these conditions occur, control unit 314 signals motor driver 318 to deactivate motor 22 and stops the ripple counter (step 404) before returning to the previous procedure (step 406).

If switch 28 was touched, this indicates that express opening was selected, and control unit 314 allows motor driver 318 to continue to open sunroof 20 until switch 28 is touched again (step 408) or the ripple counter indicates that sunroof 20 is in the fully opened position (step 410). When either of these conditions occur, control unit 314 signals motor driver 318 to deactivate motor 22 and stops the ripple counter (step 404) before returning to the previous procedure (step 406).

Figure 27:
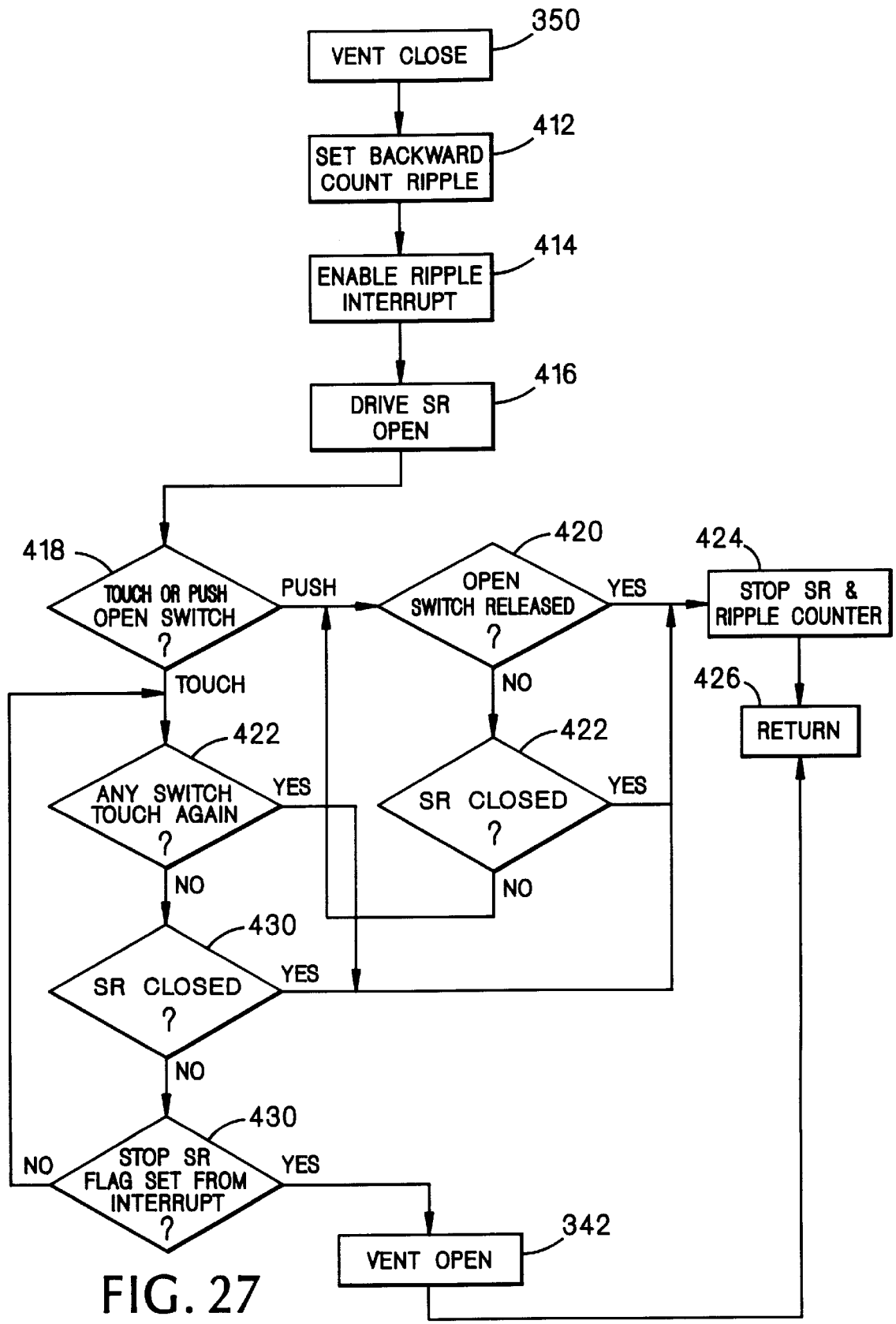

In vent close procedure 350 (FIG. 27), control unit 314 sets the ripple counter to the decrement mode (step 412), enables ripple interrupt 349 (step 414), and signals motor driver 318 to activate motor 22 to drive sunroof 20 in the open direction (which closes sunroof 20 from the vented position) (step 416). Next, control unit 314 determines whether switch 28 was touched or pushed (step 418). If switch 28 was pushed, this indicates that manual closing was selected, and control unit 314 allows motor driver 318 to continue to close sunroof 20 until switch 28 is released (step 420) or sunroof 20 reaches the fully closed position (step 422). When either of these conditions occur, control unit 314 signals motor driver 318 to deactivate motor 22 and stops the ripple counter (step 424) before returning to the previous procedure (step 426).

If switch 28 was touched, this indicates that express closing was selected, and control unit 314 continues to close sunroof 20 until switch 28 is touched again (step 428), sunroof 20 reaches the fully closed position (step 430), or ripple interrupt 349 sets a stop flag after pressure detecting an obstruction (step 432). When switch 28 is touched again (step 428) or sunroof 20 becomes fully closed (step 430), control unit 314 signals motor driver 318 to deactivate motor 22 and stops the ripple counter (step 424) before returning to the previous procedure (step 426). When ripple interrupt 349 sets the stop flag (step 432), which indicates that an obstruction is present in the path of sunroof 20, control unit 314 responds by performing the vent open procedure (step 342).

Ripple interrupt 349 (FIG. 28), when enabled, is called by control unit 314 each time that a ripple is detected by motor feedback signal processing unit 316. Depending on whether the ripple counter is in an increment or decrement mode (step 434), control unit 314 increments (step 436) or decrements (step 438) the ripple counter. Next, control unit 314 calculates the present ripple frequency (step 440) based on the time that has expired since ripple interrupt 349 was last called. If the present ripple frequency is smaller than the ripple frequency from when ripple interrupt 349 was previously called by more than a predetermined threshold amount (step 442), this indicates that motor 22 is facing increased resistance as would be caused by an obstruction in the path of sunroof 20, and control unit 314 responds by setting the stop flag (step 444) and returning to the previous procedure (step 446).

In parking procedure 328, control unit 314 starts a thirty second timer (step 448) and waits for an occupant of automobile 10 to press button 28 to deactivate security closing (step 450) or for the timer to expire (step 452). If the timer expires, control unit 314 performs a security close of sunroof 20 (step 454), starts another thirty second timer (step 456), and waits for an occupant of automobile 10 to press button 28 to activate heat opening and rain closing (step 458) or for the timer to expire (step 460). If the timer expires, control unit 314 powers down (step 462) and waits to be reactivated by ignition switch 32 turning on.

If an occupant of automobile 10 presses switch 28 to deactivate security closing (step 450) or to activate to activate heat opening and rain closing (step 458), control unit 314 responds by causing beeper 58 to beep once (step 464). Control unit 314 then waits for an occupant of automobile 10 to press switch 28 to indicate that sunroof 20 should be fully opened during heat opening (step 466) or for the timer to expire (step 468). If switch 28 is pressed, control unit 314 causes beeper 58 to beep once (step 470) and sets the mode for heat opening to fully open (step 472). If the timer expires, control unit 314 set the mode for heat opening to partially open (step 474). Thereafter, control unit 314 powers down and waits to be reactivated by a signal from rain sensor 34 or temperature sensor 36, or by ignition switch 32 turning on.

Figure 30:
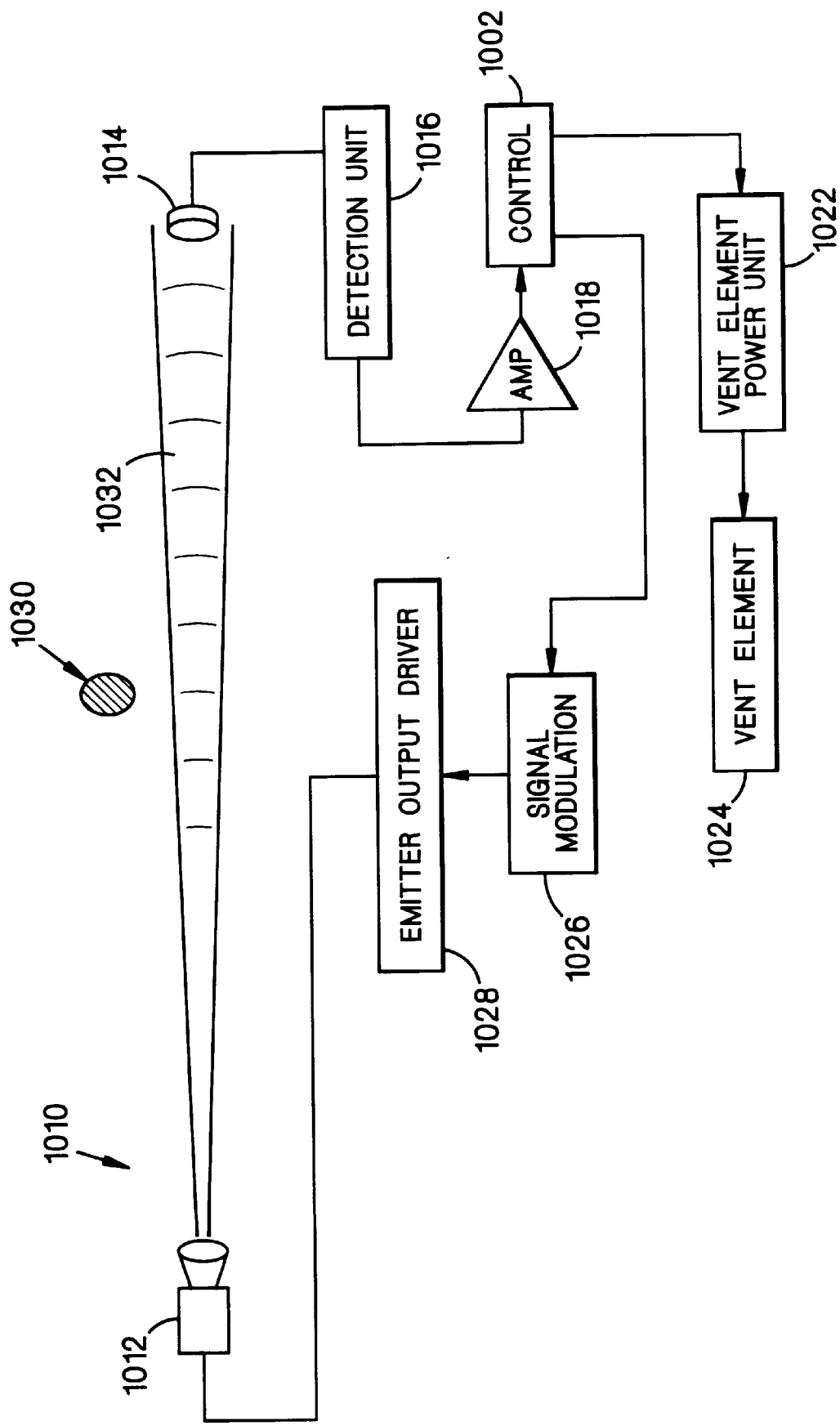
FIG. 30 shows a block diagram of an obstruction detection system.

With reference to FIG. 30, an alternative system 1010 includes an electromagnetic energy signal transmitter 1012, a laser signal receiver 1014, a signal detection unit 1016, a signal amplifier 1018, a control unit 1020, a vent element power unit 1022, a vent element 1024, a signal modulation unit 1026, and a laser driver unit 1028. The electromagnetic energy signal transmitter 1012 is a low powered laser such as a laser diode operating in the visible light range. Alternatively, infrared diodes or other light diodes could be used. Low powered laser sources having a minimal impact on the human eye are preferred for safety reasons. The following descriptions including visible light lasers could alternatively include other electromagnetic energy signal sources producing, for example, ultraviolet light or infrared light.

In operation, obstructions 1030 entering the path 1032 of the laser beam cause interruptions in the laser beam signal received by the receiver 1014. These interruptions are detected by the detection unit 1016 which transmits a detection signal to the control unit 1020. The control unit 1020 commands the vent element power unit 1022 to respond accordingly. The vent element power unit 1022 may cause the vent element 1024 to stop moving, and subsequently to move in the reverse direction. The signal modulation unit 1026 is connected to the control unit 1020 to enhance operation through feedback control. The modulation unit 1026 preferably provides amplitude, frequency, or phase modulation of the signal, and the detection unit 1016 detects the modulated signals through the use of band pass filters or the like. The control unit may include a microprocessor controller which performs low frequency modulation detection, amplitude modulation detection, pulse code modulation detection, and provides feedback to the signal modulation unit.

Figure 31:
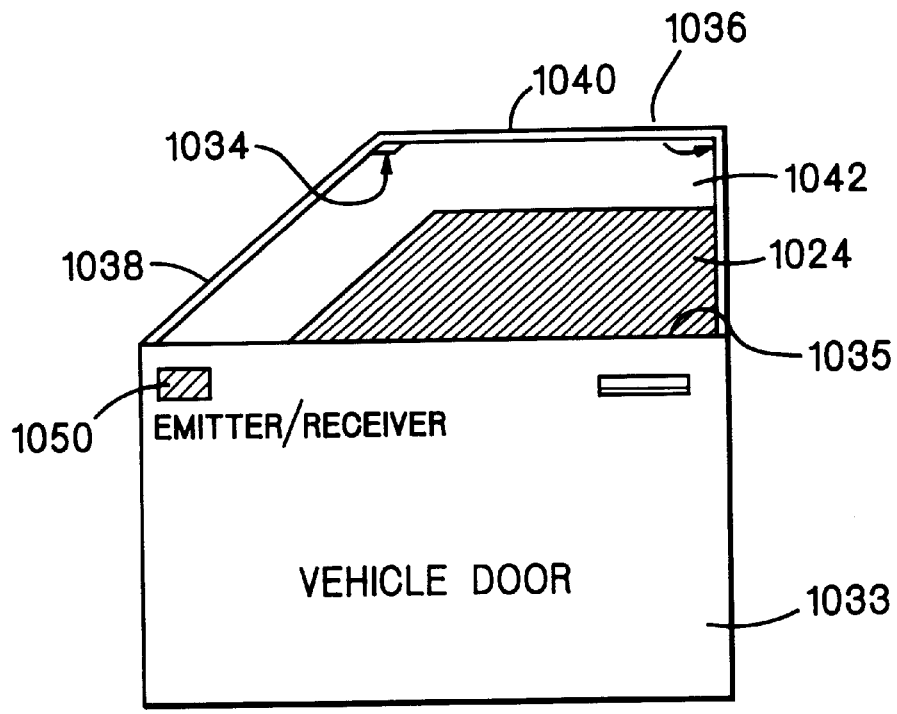
FIG. 31 shows an obstruction detection system for a window associated with a vehicle door.

As shown in FIG. 31, the vent element may be a window 1024 associated with a vehicle door 1033. The closing path 1042 is defined by the top edge 1035 of the door 1033 and the edges 1038, 1040, 1041 of the window frame. The transmitter 1012 and receiver 1014 are positioned together as a single transmitter/receiver unit 1050, and the mirrors 1034, 1036 are positioned to direct the laser energy beam along adjoining straight edges 1038, 1040.

Figure 32:
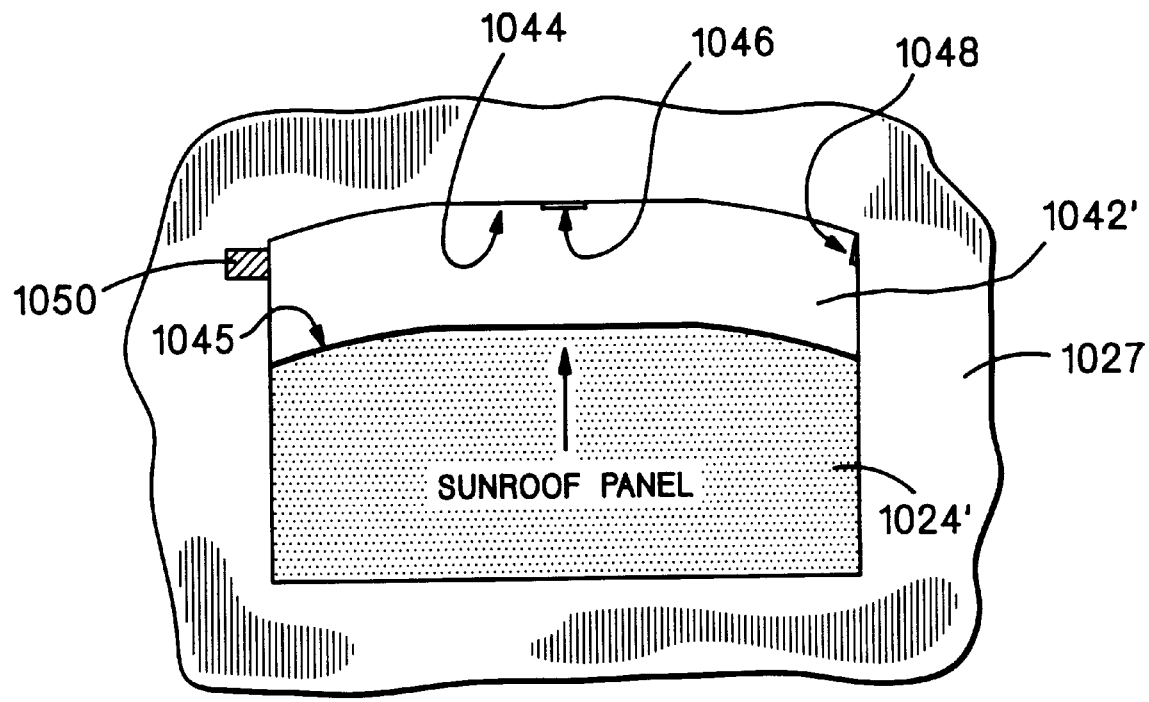
FIG. 32 shows obstruction detection system for a sun roof associated with a vehicle.

As shown in FIG. 32, the vent element may also be a sunroof 1024' within a vehicle roof 1027. The mirrors 1046, 1048 are positioned to direct the laser signal along curved edge 1044. The forward edge 1045 of the sunroof 1024', together with the sunroof opening define the closing path 1042'.

Figure 33:
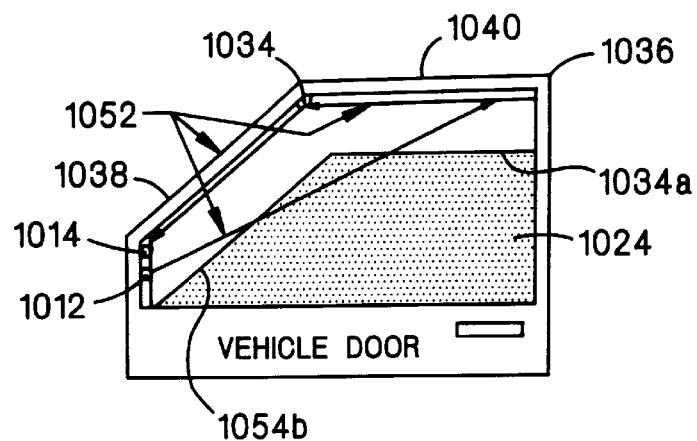
FIG. 33 shows the path of an energy signal produced by an obstruction detection system.

FIG. 33 shows the laser beam 1052 of the invention as it is transmitted from the transmitter 1012, reflected off of the mirrors 1036 and 1034 and returned to the receiver 1014. Alternatively the laser beam 1052 may be transmitted along edges 1038 and 1040, then returned doubled back along edge 1040 and finally along edge 1038.

In the case where the vent element is a transparent window, the laser energy beam 1052 will pass through the vent element without causing the detection unit to detect an obstruction. Thus the energy signal follows a path that is intersected by two or more edges 1054 of the vent element as the vent element traverses the closing path. In alternative approaches involving opaque vent elements, the laser beam must follow a path that does not intersect the vent element as it traverses the closing path. In this case, the path of the laser beam should be substantially parallel to the plane defined by the vent element. Preferably such a path is adjacent the interior surface of the vent element as opposed to the outside surface which is exposed to the external environment of the vehicle.

Temperature variations as well as prolonged vibration may cause misalignment of the energy beam. Two adjustments that can partially alleviate the effects of such misalignment are increasing the sensitivity of the receiver 1014 and permitting the energy beam 1052 to diverge as it travels from the transmitter 1012 to the receiver 1014. Preferably, the energy beam is diverged such that the cross sectional diameter of the energy beam is significantly greater at the receiver than the surface area of the receiving surface 1013 (shown in FIG. 35) of the receiver 1014. Firmly attaching all components to the vehicle also decreases misalignment problems.

Figure 34:
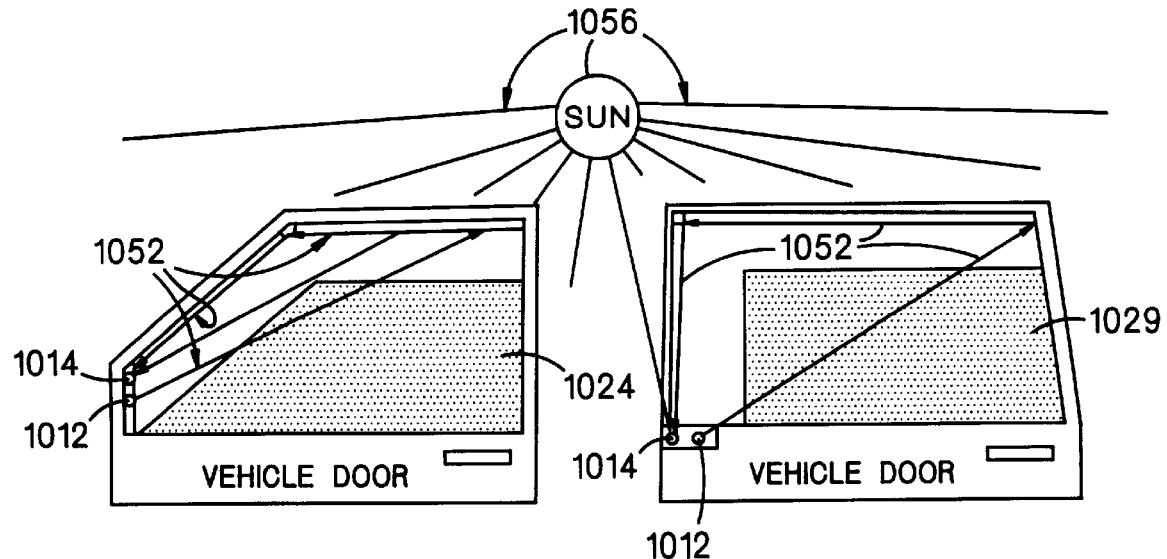
FIG. 34 shows an obstruction detection system in an environment that includes an ambient light source.

Ambient energy signals, such as sunlight 1056, may interfere with the obstruction detection system as shown in FIG. 34. If, for example, sunlight 1056 saturates the receiver 1014, then obstructions will not be detected unless a discrimination is made between the ambient signals 1056 and the energy signal 1052 from the transmitter 1012.

Figure 35:
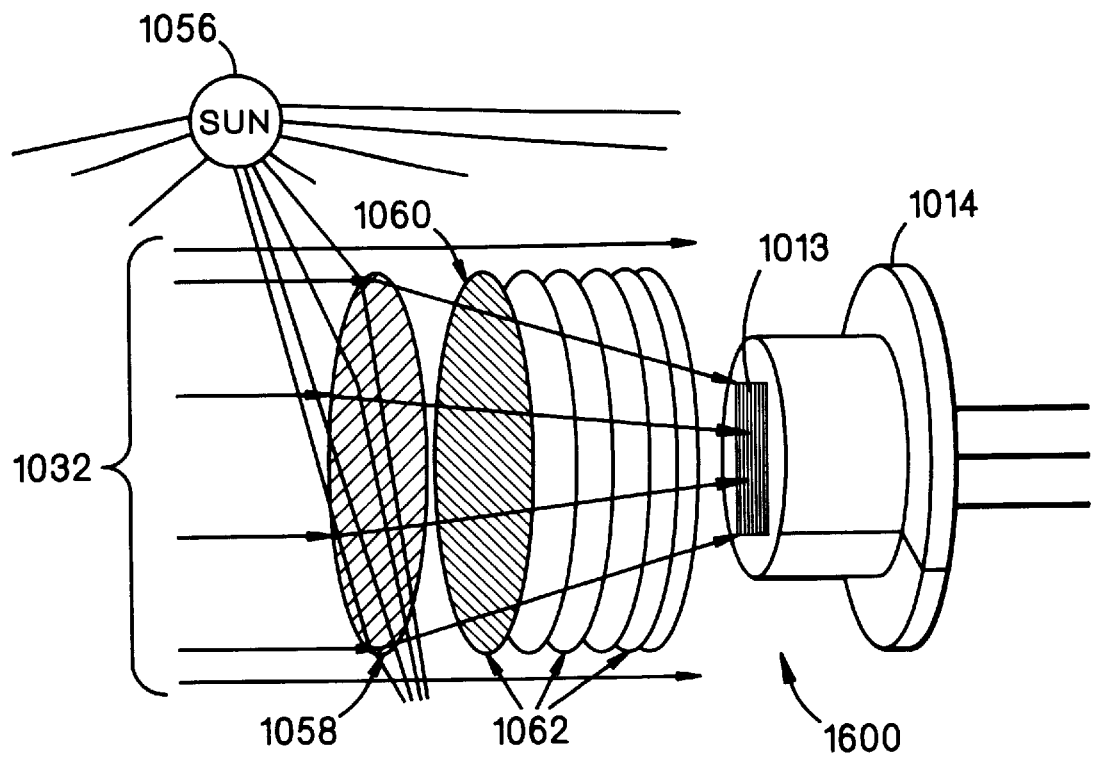
FIG. 35 shows a lens and filter system.

A discrimination unit 1600, such as a lens 1058, a polarizing filter 1060, and band pass filters 1062 are shown in FIG. 35. The lens 1058 focuses laser light 1032 which is substantially perpendicular to the lens, while diverting ambient light 1056 which is substantially parallel to the lens 1058 away from the focal point of the lens. The polarizing filter 1060 operates in cooperation with another polarizing filter 1064 (shown in FIG. 36) at the transmitter 1012 to further distinguish the transmitted energy beam from ambient signals. The filters 1062 maximize transmission of the laser signal and minimize transmission of ambient signals through absorption.

Figure 36:
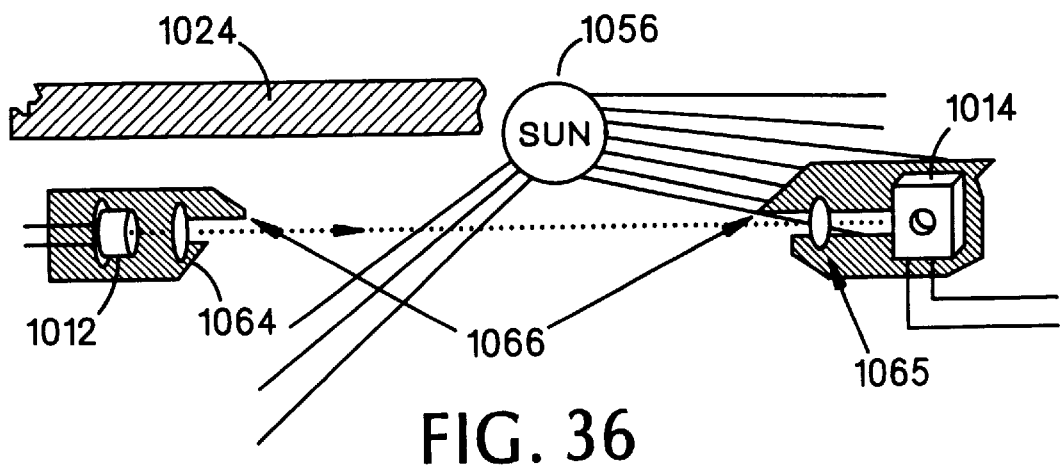
FIG. 36 shows a shade and filter system.

Transmission of the laser light is maximized by having its center wavelength correspond to the wavelength of the laser light. If, for example, the laser light operates at 670 nanometers, then the filters could be selected to provide transmission of only red light (approximately 620–700 nm). Certain of the lenses and filters may be combined in a single colored lens. As shown in FIG. 36, the system may also include a shade configuration 1066 for shading either the transmitter, the receiver, or both from ambient signals 1056. The lens 1065 unit includes a colored polarizing lens as well as the lens 1058 for focusing the beam to a focal point which coincides with the receiving surface 1013 of the receiver 1014.

Figure 37:
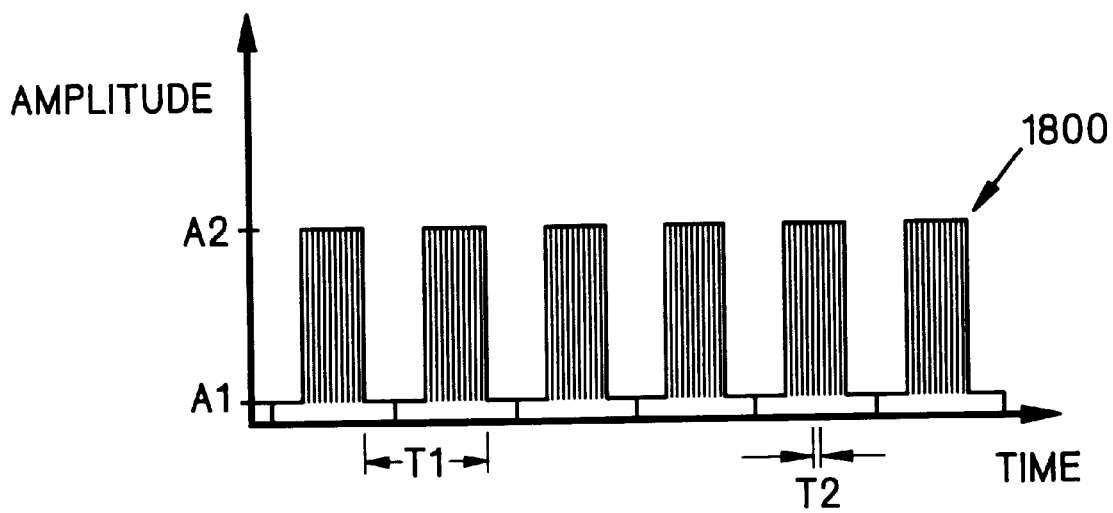
FIG. 37 shows a high frequency pulse modulated signal.
Figure 38:
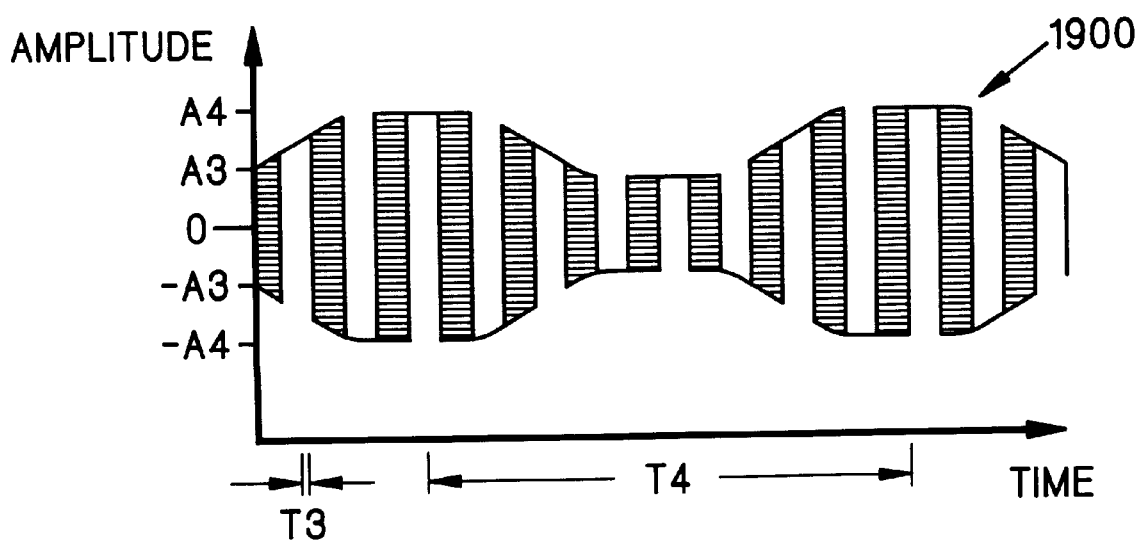
FIG. 38 shows a high frequency pulse/low frequency amplitude modulated signal.

As discussed in connection with FIG. 30, the system includes a signal modulation unit 1026 for modulating the amplitude, frequency, phase, or pulse of the energy signal transmitted from the transmitter. Moreover, the signal may undergo a combination of modulations, such as high frequency (100 khz)/low frequency (10 khz) pulse modulation as shown in FIG. 37, or high frequency pulse/low frequency amplitude modulation as shown in FIG. 38. With reference to FIG. 37, the signal 1800 undergoes a low frequency pulse modulation having a period T1 as well as a high frequency modulation having a period T2. The amplitude alternates between A1 and A2. The detection unit for detecting the signal 1800 should include two band pass frequency filters: one for each of the frequencies 1/T1 and 1/T2.

With reference to FIG. 38, the signal 1900 undergoes a high frequency modulation of period T4 as well as a low frequency modulation of period T4 which oscillates between an amplitude of +/−A3 and +/−A4. The detection unit for detecting the signal 1900 should include a 1/T3 frequency filter, a 1/T4 frequency filter as well as an amplitude filter to detect the periodic amplitude modulations.

Figure 39:
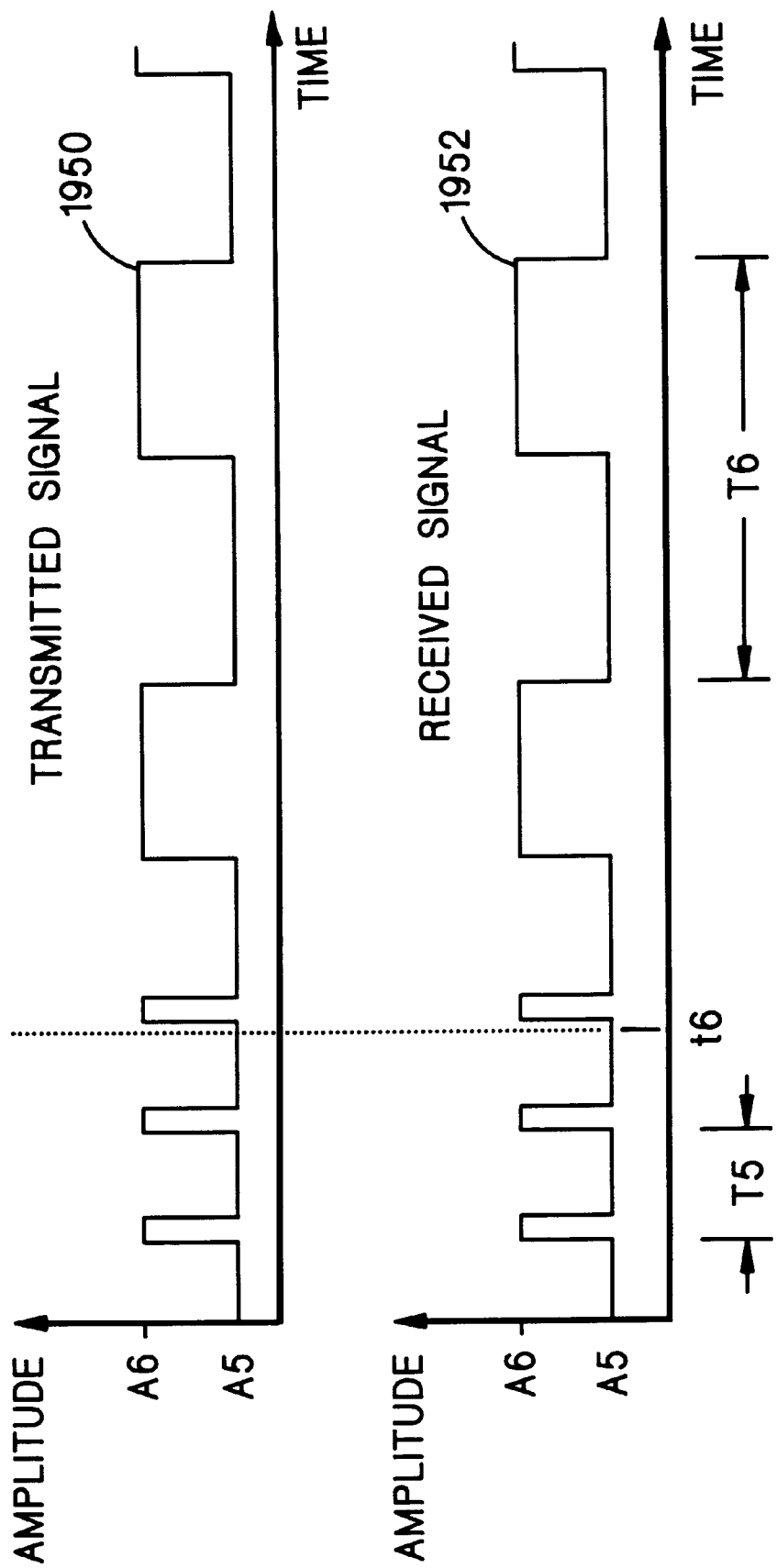
FIG. 39 shows a pulse synchronization timing diagram.

Pulse modulation may also be employed to discriminate between the transmitted signal and ambient signals. As shown in FIG. 39, the transmitter emits a predetermined series of pulses 1950 which the receiver will receive 1952 as long as there is no obstruction in the closing path. The detection unit is synchronized to detect whether the receiver has received the correct signal. The correct signal is defined as including three or more short pulses of period T5 followed by a series of longer pulses of period T6. Here, the system requires that a series of pulses at predetermined intervals be detected so as to distinguish the transmitted signal from ambient signals which flicker. A flickering ambient signal may result from the vehicle passing trees which are positioned between the vehicle and the sun. Returning to FIG. 39, at time $t_b$ the closing operation is commenced until an obstruction is detected by the detection unit. If and when an obstruction is detected, the system responds as described above.

Figure 40:
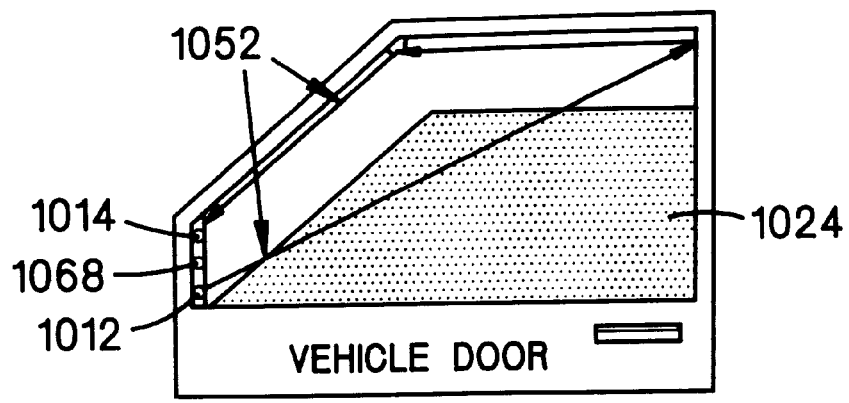
FIG. 40 shows an obstruction detection system including an ambient energy signal receiver.

As shown in FIG. 40, the signal discrimination may be accomplished by the use of another signal receiver 1068 for receiving only ambient signals. The signal detection unit 1016 would rely on the output of the ambient signal receiver 1068 as a reference. In operation, the analog output of the receiver 1014 is measured with respect to the positive output of the receiver 1068 instead of being measured with respect to ground. Alternatively, the control unit 1020 amy include a microprocessor for digitizing the respective outputs of the receivers 1014 and 1068. The output of the receiver 1068 could then be subtracted from the output of the receiver 1014 by the microprocessor.

Figure 41:
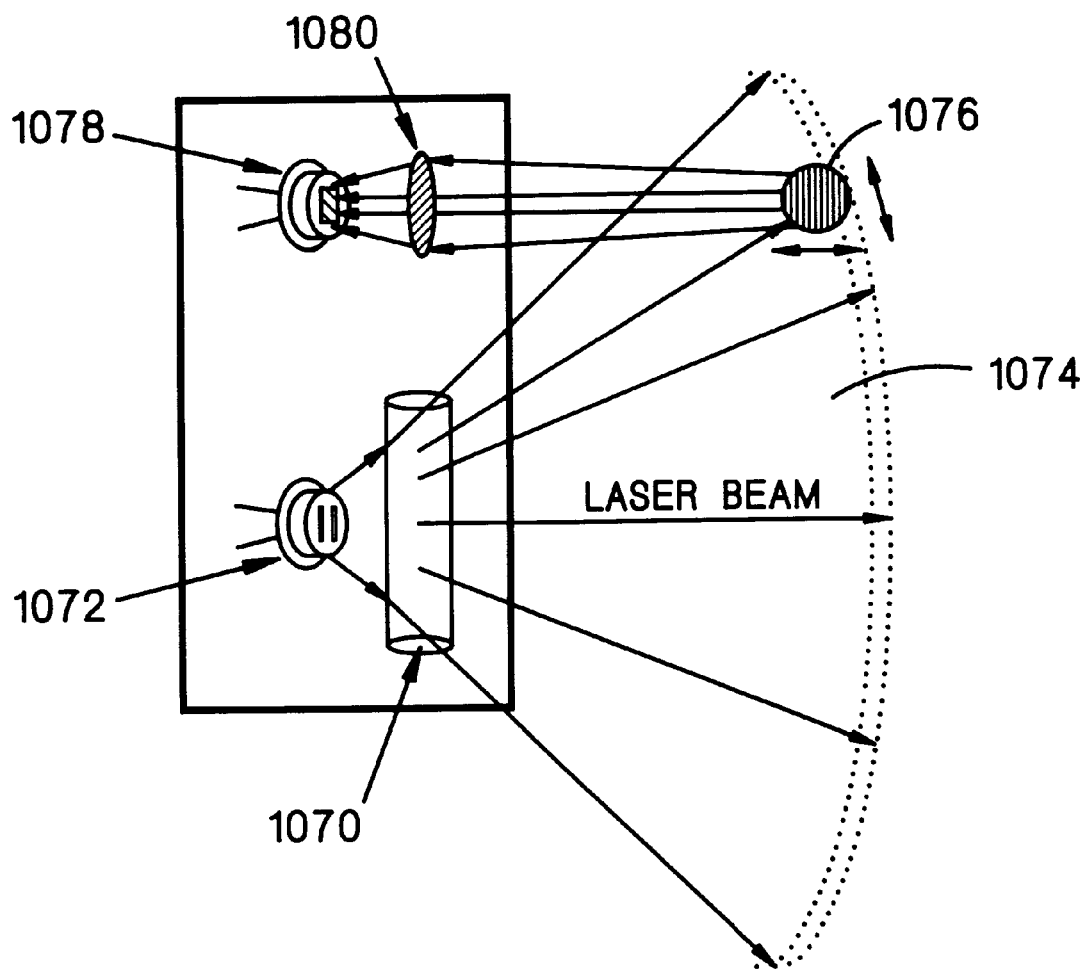
FIG. 41 shows a diverging unit.

The system may also include a cylindrical lens 1070 for diverging the laser energy signal as it is emitted from the transmitter 1072 as shown in FIG. 41. The laser energy signal is thus diverged into a substantially planar light beam 1074, any portion 1074' of which may reflect off of an obstruction 1076. This reflection of the signal 1074' is detected by the signal receiver 1078 through the filtering lens 1080. In this case, the detection of an unusually bright reflection corresponds to the detection of an obstruction and the system responds accordingly.

Figure 42:
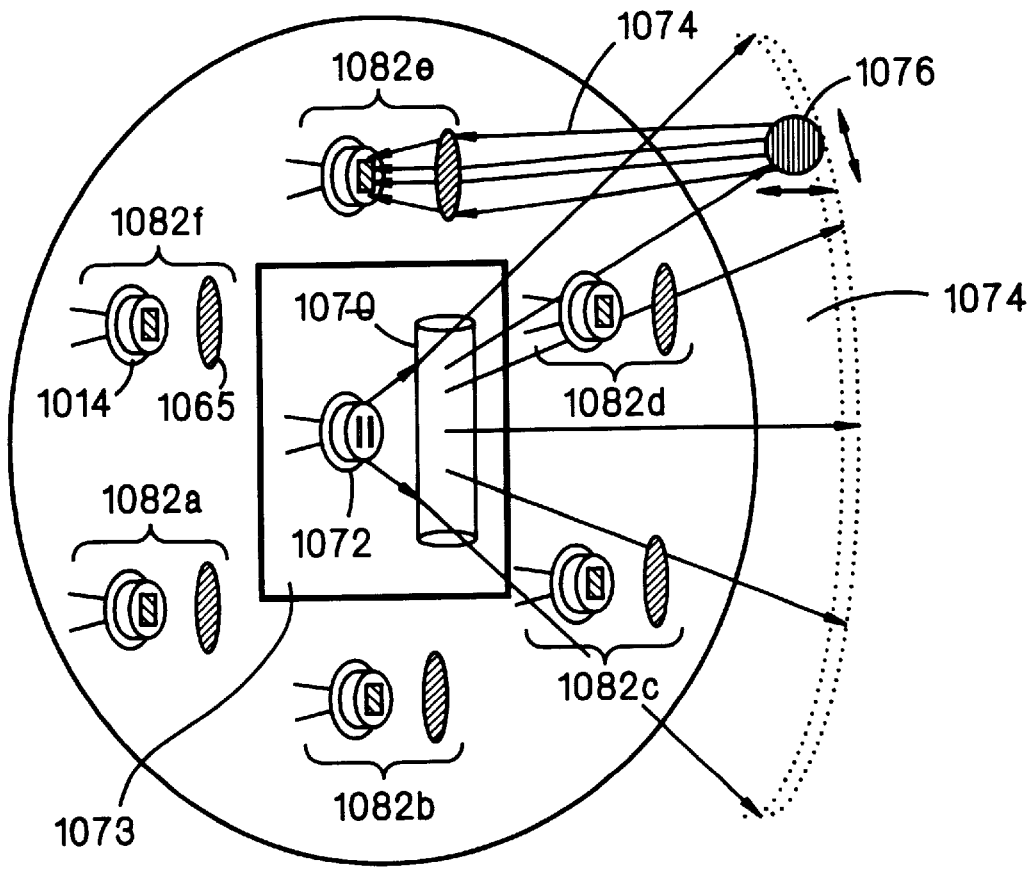
FIG. 42 shows a partial view of an obstruction detection system including the diverging unit shown in FIG. 41 together with several receiver units.
Figure 43:
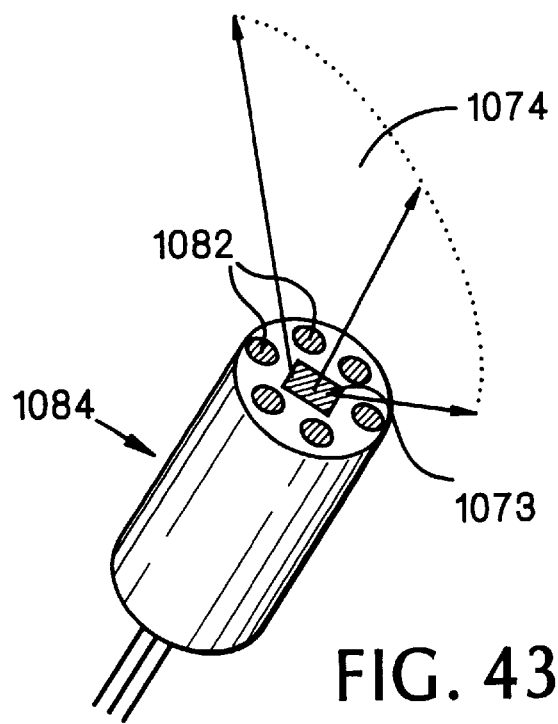
FIG. 43 shows an isometric view of the transmitter/receiver unit shown in FIG. 42.
Figure 44:
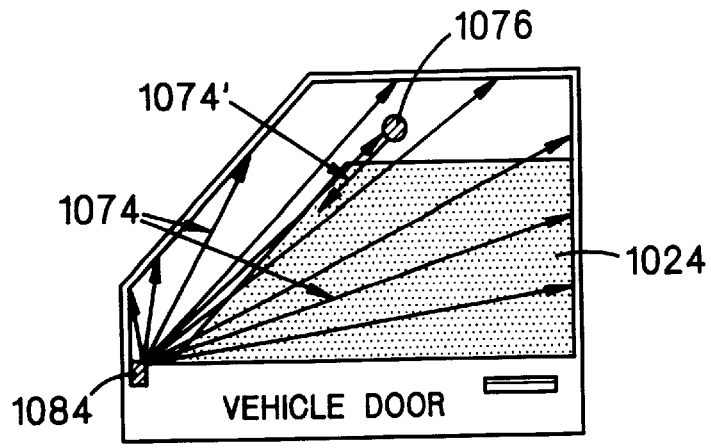
FIG. 44 shows an obstruction detection system including the transmitter/receiver unit shown in FIG. 43.
Figure 45:
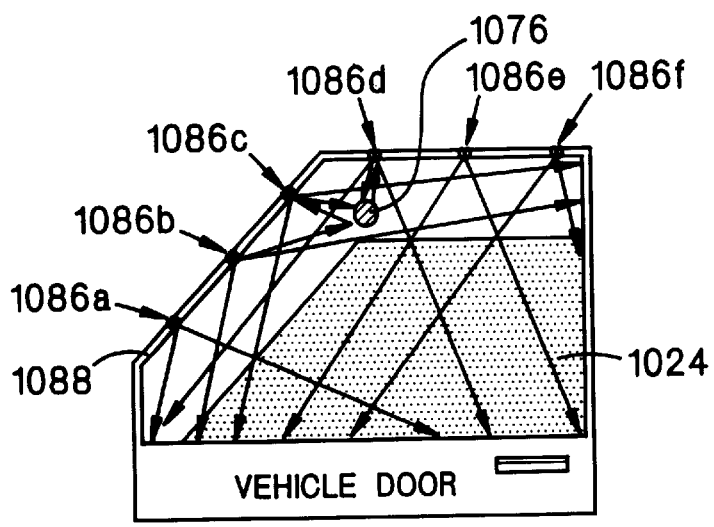
FIG. 45 shows an obstruction detection system including several transmitter/receiver units.

As shown in FIG. 42, numerous receiver units 1082*a–f* are positioned adjacent to the transmitter 1072 and diverging lens 1070. Each receiver/lens unit 1082 includes a receiver 1014 similar to that shown in FIG. 30, and a filter lens unit 1065 similar to that shown in FIG. 36. With reference to FIGS. 43 and 44, the multiple receiver units 1082*a–f* together with the emitter 1072 and diverging lens 1070 (unit 1073) are packaged as a single transmitter/receiver unit 1084 and positioned adjacent to the closing path of an automated vent 1024. In alternative approaches, several transmitter/receiver units 1086*a–f* may be positioned along one or more edge of a closing path as shown in FIG. 45. Preferably, such units are prepackaged on a single strip 1088 which is attached to the window frame of the vehicle.

Figure 46:
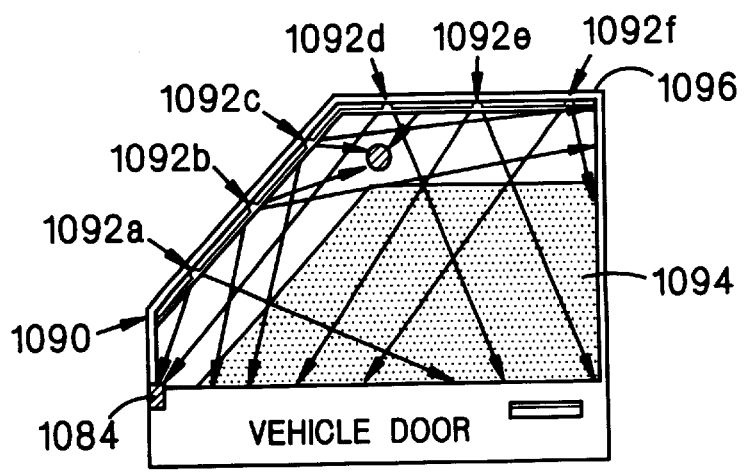
FIG. 46 shows an obstruction detection system including a fiber optic waveguide having several notches.

In another approach, the system includes a fiber optic waveguide 1090 having triangular notches 1092*a–f* cut as shown in FIG. 46. In operation, the laser would transmit the laser light into the waveguide 1090, and the light would escape through the several notches 1092, thus producing a substantially planar beam 1094. The receiver can either be positioned at the opposite end of the fiber optic waveguide, or adjacent the transmitter. In the latter situation the waveguide includes a mirror 1096 positioned at the opposite end of the waveguide. Again, the presence of an unusually bright signal at the receiver is typically indicative of there being an obstruction in the closing path.

In other approaches of the invention, the vent element includes either an attached transmitter, receiver, or waveguide for transmitting the energy signal from a transmitter. In still further approaches, the vent element itself may be comprised of a planar waveguide for transmitting the energy signal.

One concern associated with systems incorporating diverging devices is that reflection of the energy beam off of, for example, the interior roof of an automobile, may produce a false detection signal if excess light is reflected to the receiver. Consequently, the detection and control units of such systems should also detect and correct for excessive levels of reflection which remain constant.

Figure 47:
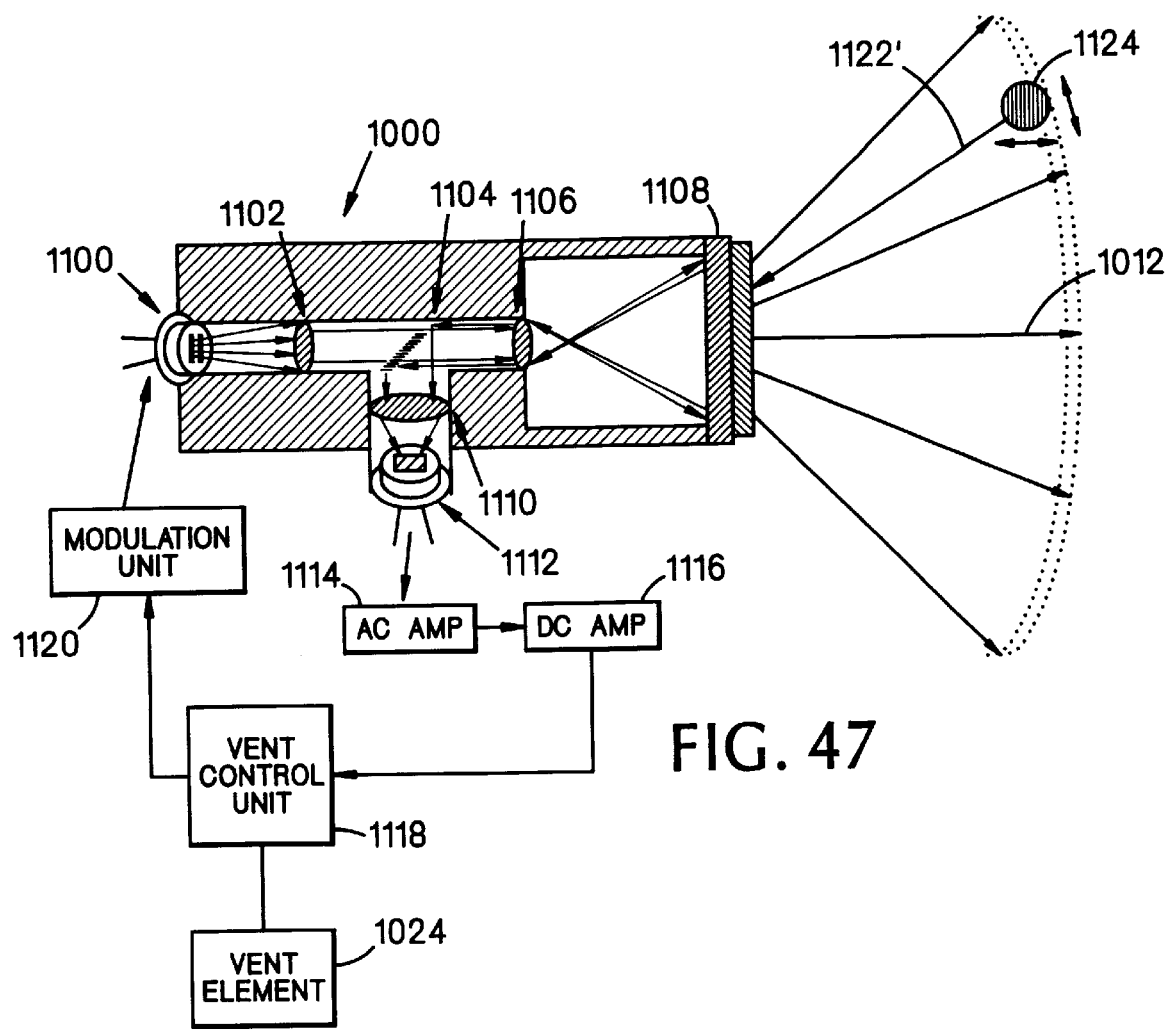
FIG. 47 shows a block diagram of an obstruction detection system including a bi-directional transmitter/receiver unit.

As shown in FIG. 47, a bi-directional transmitter/receiver unit 1000 comprises a laser emitter 1100, an emitter lens 1102, a light splitter 1104 at 45', a parallel focus lens 1106, a positive plano cylindrical lens 1108, a receiver lens 1110, and a signal receiver 1112. The output from the signal receiver 1112 is amplified by the AC amplifier 1114 and the DC amplifier 1116. The vent control unit 1118 controls the movement of the vent element 1024 responsive to the output of the DC amplifier 1116. An output of the vent control unit 1118 is fed back to the modulation unit 1120 which corrects synchronization and other inconsistencies which are within the range of acceptable variation. If, for example, a low frequency modulation of 25 khz is performed on the transmitted signal and the received signal has a low frequency modulation of 30 khz, then the detection unit will not report an error as the received signal is within an acceptable range (25+/−5 khz). The modulation unit will correct the transmitted signal to return it to 25 khz. Alternatively, the control unit could record the modulation of 30 khz and measure variations and changes from this new base.

The bi-directional transmitter/receiver unit 1000 operates as follows. The transmitted light from transmitter 1100 is focused by the lens 1102 and passes through the beam splitter 1104. The light is then focused by the lens 1106 and diverged by cylindrical lens 1108 in to a substantially planar beam 1122. If light reflects off of an obstruction 1124, then the reflected light 1122' will pass back through the cylindrical lens 1108, through the lens 1106 and be split by the beam splitter 1104. A portion of this light will be refracted into the beam splitter and a portion will be reflected by the beam splitter. The reflected portion is directed towards the photo sensitive receiving surface of the receiver 1110. If excessively bright light is received for an extended period of time (such as may be caused by the light reflecting off of the interior of the roof or the sun visor), the control unit could adjust and measure variations from the increased level of brightness.

Figure 48:
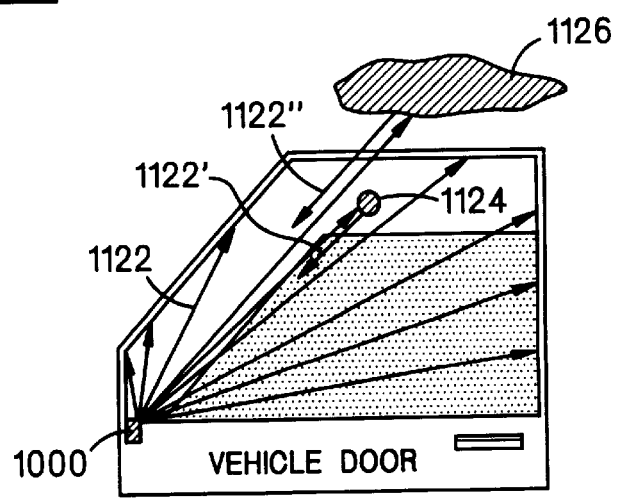
FIG. 48 shows an obstruction detection system in an environment that includes ambient reflection.

As shown in FIG. 48 an environment, such as the interior of an automobile, may include ambient reflection 1122". Such reflection could be produced by the interior roof of an automobile 1126. Ambient reflection 1122" will interfere with reflection 1122' from the object 1124 and drench the receiver of the unit 1000 with reflected light 1122' and 1122". The system must differentiate between the object detection reflection 1122' and the ambient reflection 1122". The system achieves this differentiation through use of the feedback control mentioned above. In general, the ambient reflection 1122" does not change as rapidly as the object reflection 1122'. The system employs numerous modulation techniques as described above to detect the variations in object reflected light 1122' with respect to the more steady state ambient reflection 1122". This feedback provides the system with desirable fail-safe features.

Figure 49:
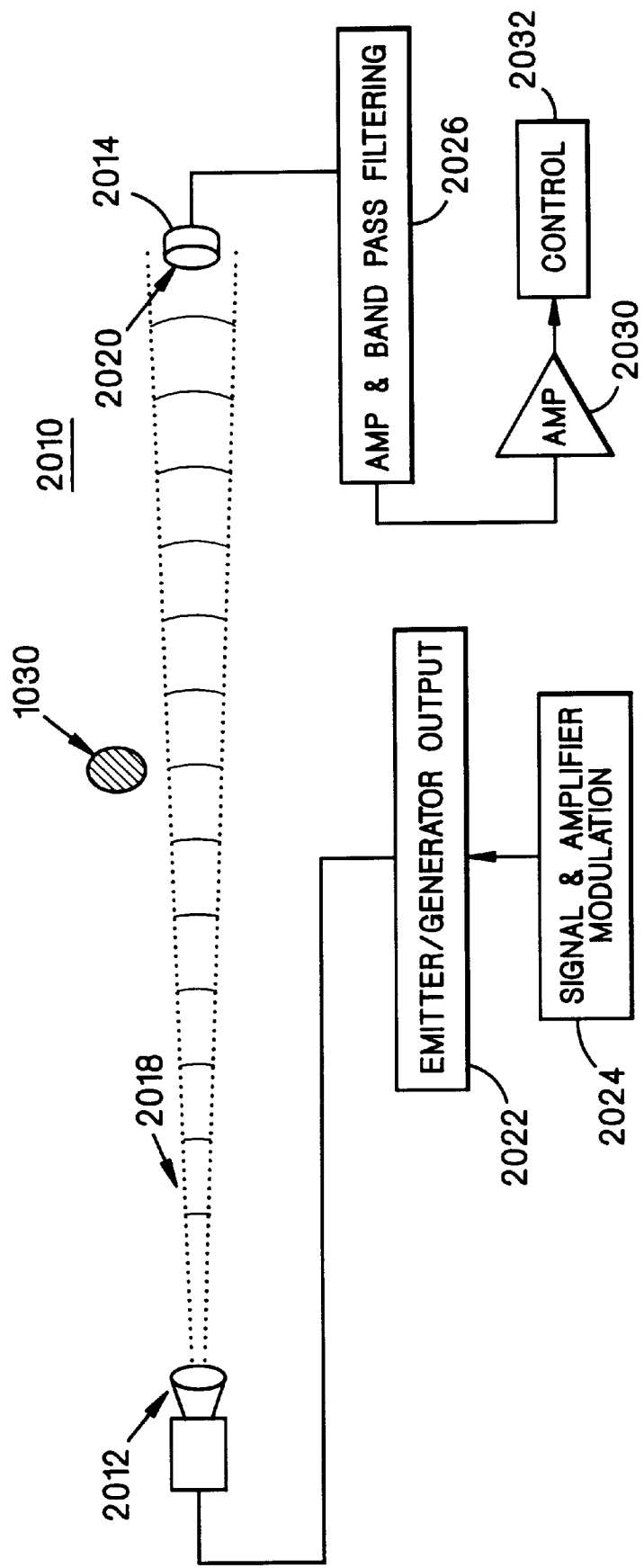
FIG. 49 is a schematic block diagram of a circuit which generates and senses a beam that monitors and controls the window.

Referring to FIG. 49, another alternative obstruction detection system 2010 for a vehicle window uses a pair of transducers, transmitter 2012 and receiver 2014. Transmitter 2012 includes an emitter 2016 which emits a narrow beam 2018 of energy which may be sound, ultrasonic, infrared, or light, for example. This beam is received by sensor 2020 in receiver 2014. Transmitter generator circuit 2022 energizes transmitter 2012 to emit beam 2018. To enhance noise rejection a modulation circuit 2024 may be provided to modulate beam 2018. The output from transmitter generator circuit 2022 is also supplied to amplifier and bandpass filter circuit 2026 so that any necessary modulation detection may be accomplished. If an obstacle 2028 should interfere and obstruct beam 2018, this is detected by sensor 2020 in receiver 2014, amplified in amplifier 2030 and submitted to control 2032, which then interrupts the power to window drive 2034.

Figure 50:
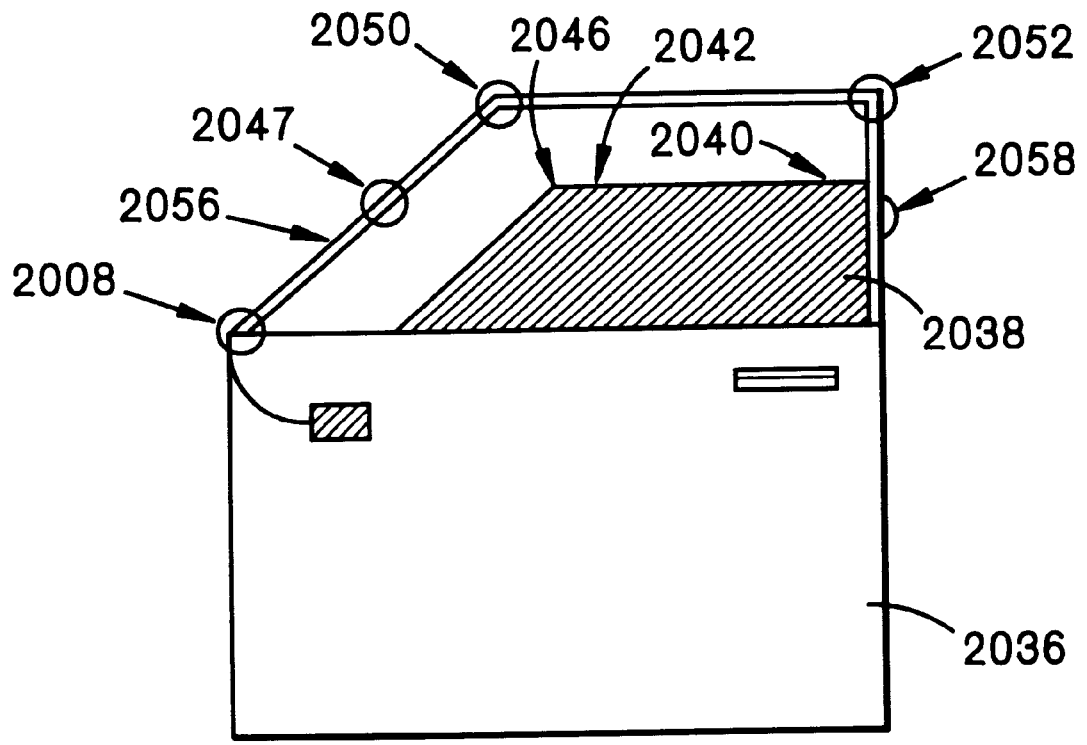
FIG. 50 is a schematic of a vehicle door showing a partially closed window and an arrangement of transmitting and receiving transducers that establish a monitoring beam for a nonlinear, rectilinear window edge.

In order to efficiently provide a beam to monitor the nonlinear edge 2040 of window 2030 in door 2036, FIG. 50, having a rectilinear form of two straight edges 2042 and 2044 joined at apex 2046, three transducers 2048, 2050, and 2052 are used. Transducers 2048, 2050, and 2052 are mounted on section 2055 of frame 2054 which receives the edge 2040 of window 2038. Transducer 2050 is the opposite type of transducer as that a transducers 2048 and 2052. Thus if transducer 2050 is a transmitter, transducers 2048 and 2052 are receivers. Conversely, if transmitter 2050 proximate the intermediate portion 2046 is a receiver, then transducers 2048 and 2052 at the terminal portions 2056 and 2058 of edge 2040 are transmitters. In this way, a beam which conforms closely to the contour of window edge 2040 can be effected with a minimum number of transducers. Typically transmitters and receivers for use with infrared are COX14GE infrared emitter, L14C2GE infrared photo transistor; ultrasonic are P9923 ceramic ultrasonic transducer, P9934 ultrasonic ceramic microphone; sound ar P9922 audio transducer, P9956 electric condenser microphone; laser are P451 laser diodes, BPW38GE photo transistor; and light are P374 light emitter, PN116PA photo transistor.

Figure 51:
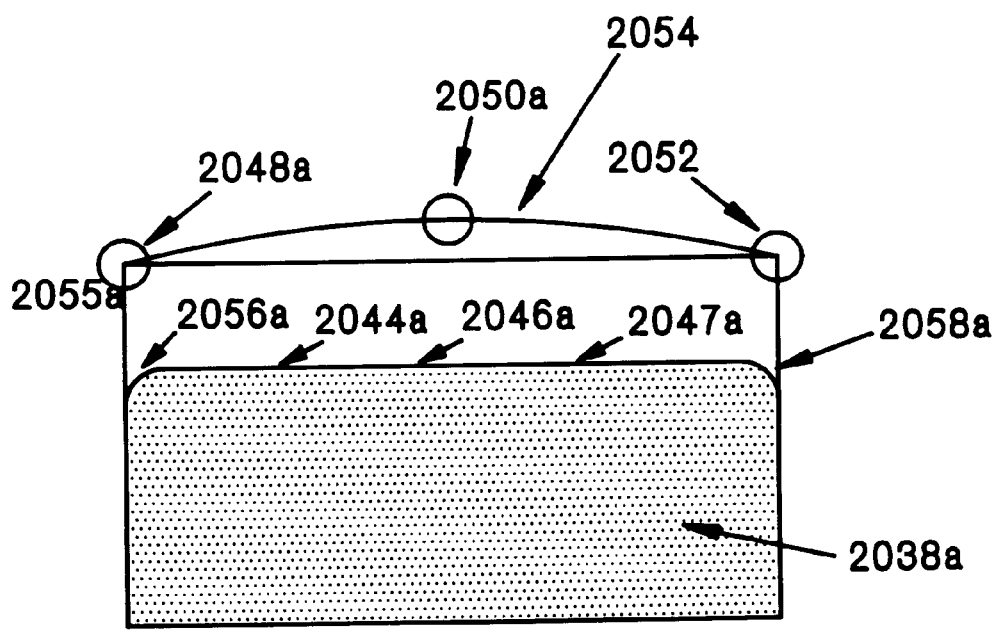
FIG. 51 is a schematic of a vehicle sun roof partially closed showing the arrangement of transducers relative to a nonlinear, curvilinear edge.

A similar construction is shown with respect to sun roof 2057, FIG. 51, where the sun roof panel 2038a has terminal portions 2056a and 2058a and intermediate portion 2046a.

Figure 52:
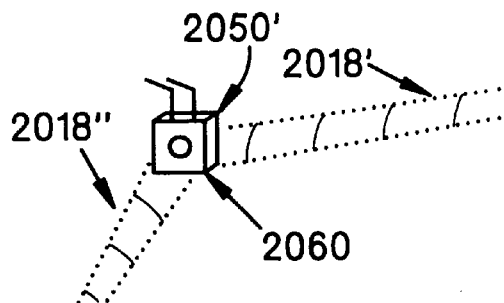
FIG. 52 is a schematic three-dimensional view of a single sensor corner receiver.

In situations where transducer 2050 is a receiver, there is a need to prevent a blind spot from occurring whereby a finger or other small object might be crushed between the apex or intermediate portion 2046 of window 2038, FIG. 50, and the mating corner 2047 of section 2055, where transducer 2050 is located. In that case a receiver 2050', FIG. 52, having a single sensor 2060 which is generally wide-angle, may be used so that even the smallest finger or similar object necessarily interferes with the beam 2018', 2018" even at its convergence at sensor 2060. Such a receiver is a PN127-SPA NPN photo transistor.

Figure 53:
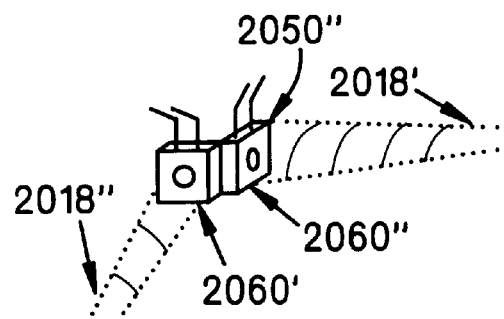
FIG. 53 is a schematic three-dimensional view of a dual sensor corner receiver.

Alternatively, a receiver 2050", FIG. 53, may use two sensors 2060', 2060", which are made small enough, approximately ¼ inch or less, so that each receives a portion of the beam 2018', 2018", but the space 2062 between sensors 2060' and 2060" is made small enough so that even the smallest object to be detected would overlap and block one or the other of sensors 2060' and 2060" and provide the necessary interruption of beam 2018', 2018" to cause the control 2032 to stop the window drive 2034. Such a device is AEM (Automobile Environment Management) System from Prospects Corporation.

Figure 54:
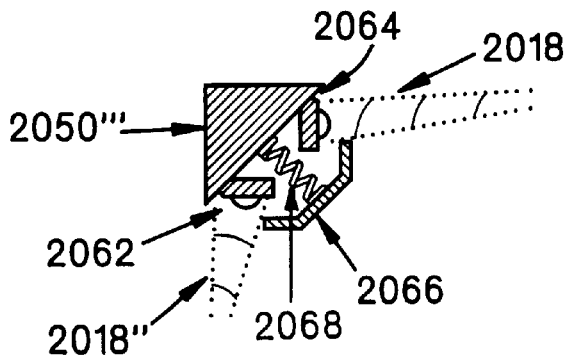
FIG. 54 is a schematic top plan view of a transducer using a spring-biased interrupter.

Whether transducer 2050, FIG. 50, is a transmitter or a receiver, it may be constructed as shown in FIG. 54, where transducer 2050''' has two sensors 2062, 2064 which may as well be emitters, and an interrupter or cover 2066 which is biased by spring 2068 away from sensors or emitters 2062, 2064 in the normal condition. However, when for example an advancing window edge pushes a finger against interrupter 2066, interrupter 2066 will be moved against the force of spring 2068 until it covers sensors 2062 and 2064, thus interrupting beams 2018' and 2018", causing an indication of the presence of an obstacle and causing control 2032 to stop window drive 2034. Such a device is a AEM System from Prospects Corporation.

Figure 55:
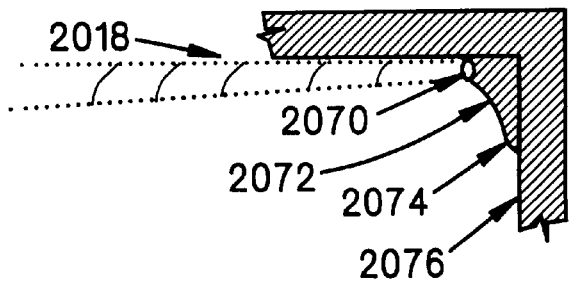
FIG. 55 is a side elevational view of a transducer accompanied by a camming surface for guiding obstructions into the beam.

In any corner situation where an obstruction might be so small that it would miss blocking the transmitter or receiver, the transmitter or receiver 2070, FIG. 55, may be mounted in conjunction with a camming surface 2072 which would guide a finger 2074 toward the transistor or receiver, driven by advancing window edge 2076 until finger 2074 is compelled to block beam 2018. Receiver 2070 may be approximately ¼ inch or less in diameter and surface 2072 may have a radius which varies from 3 inches to 30 inches.

Often when a beam 2080, FIG. 56, is being transmitted from transmitter 2082 to receiver 2084, the presence of an obstacle 2086 may not be detected because of ambient noise. For example, if beam 2080 is a light beam then the ambient light from sun 2088 may be such as to overdrive or saturate receiver 2084 so that even if beam 2080 is totally blocked by obstacle 2086, receiver 2084 receives sufficient light so that it provides no indication that an obstruction has occurred. The same type of interference can occur when the beam from transmitter 2082 itself is deflected as beam 2080' FIG. 57, from a surrounding surface 2090, so that receiver 2084 does not detect the presence of obstacle 2086.

Figure 58:
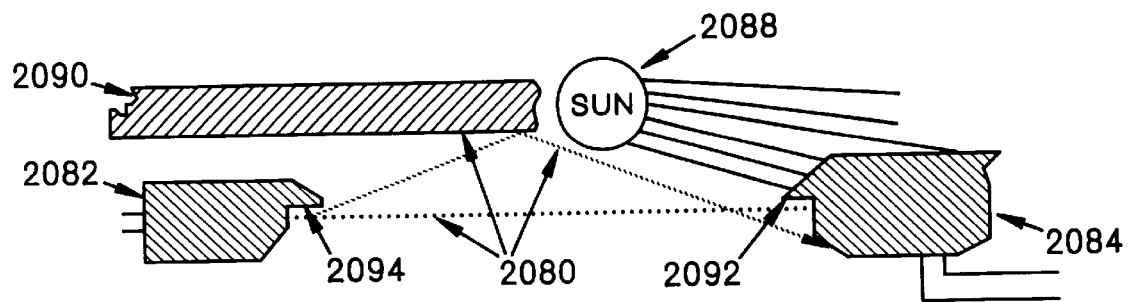
FIG. 58 is a schematic view of a transmitter and receiver employing shades according to this invention.
Figure 59:
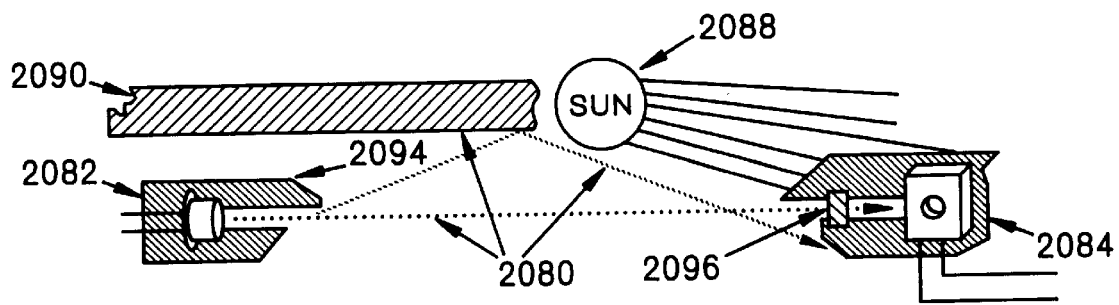
FIG. 59 is a view similar to FIG. 58 in which the transmitter and receiver are using both shades and filters.

This may by remedied in a number of ways according to this invention. As shown in FIG. 58, receiver 2084 may be provided with a shade 2092 that blocks not only the rays of sun 2088, but also the deflected beam 2080'. A similar shade 2094 may be used on a housing mounted with transmitter 2082. Alternatively, band pass filter 2096, FIG. 59, may be used to screen from receiver 2084 all but the particular frequency of light, sound or other energy beam, except that originally contained in beam 2080. This of course would not prevent the effect of the deflected beam 2080' because it would have the same frequency as beam 2080 since it is derived from that beam. However, with further improvement of transmitter or receiver construction such an effect can be eliminated. Shade 2092 as well as shade 2094 may be employed along with filter 2096.

Figure 60:
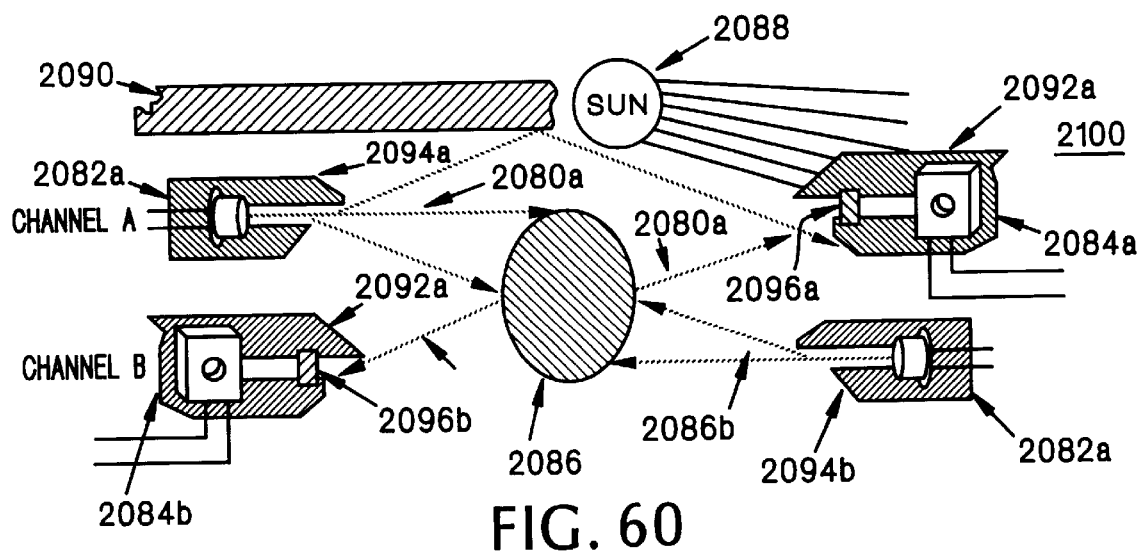
FIG. 60 is a schematic of a dual channel obstruction detection system for a vehicle window according to this invention using different frequencies for each channel.

In another approach, a dual-channel system 2100, FIG. 60, may be used wherein channel A includes transmitter 2082*a* which transmits beam 2080*a* toward receiver 2084*a*. Channel B is reversed with respect to channel A so that transmitter 2082*b* is proximate receiver 2084*a* and receiver 2084*b* is proximate transmitter 2082*a*. This is done so that if the ambient energy is incident upon receiver 2084*a*, it is unlikely that it could also be incident upon receiver 2084*b*, since 2084*b* is in the opposite direction from receiver 2084*a*. When an obstacle 2086 is present, it is possible that beam 2080*a* could strike obstacle 2086 as indicated at 2080*aa* and be reflected as also indicated along 2080*aa* so that it would strike receiver 2084*b*. The same thing would happen with respect to beam 2080*b* whereby beam 2080*bb* would reflected to receiver 2084*a*. To prevent this crossover between the channels, beam 2080*a* and beam 2080*b* are selected to have two different frequencies such as 20 KHz/70 KHz. The receivers are therefore tuned to different frequencies and either one can interfere with the other.

Figure 61:
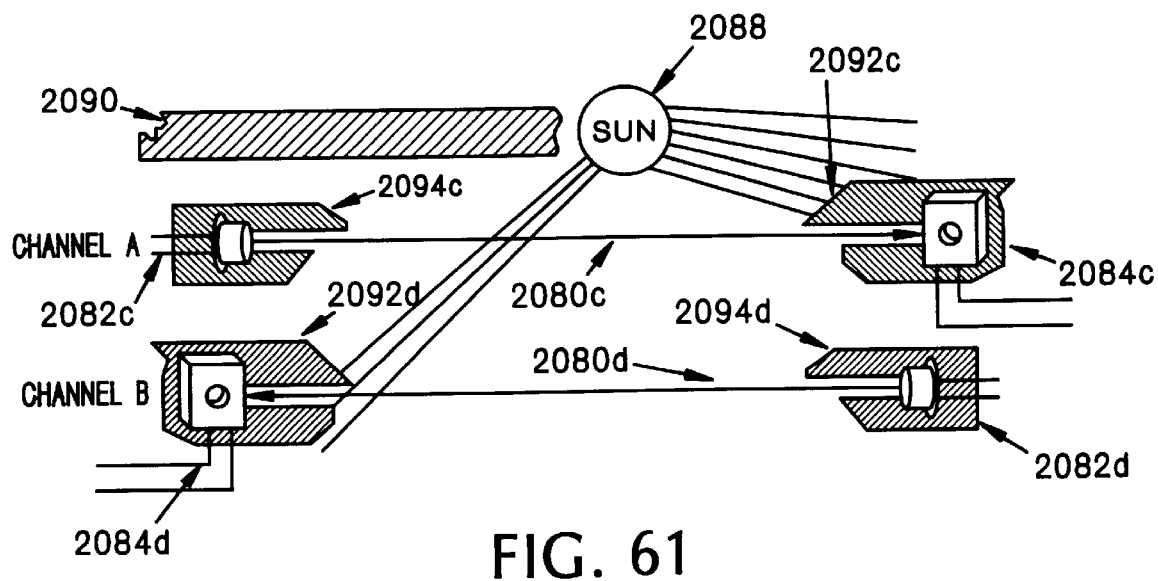
FIG. 61 is a view similar to FIG. 60 wherein the channels may use the same frequency but are operated one at a time.
Figure 62:
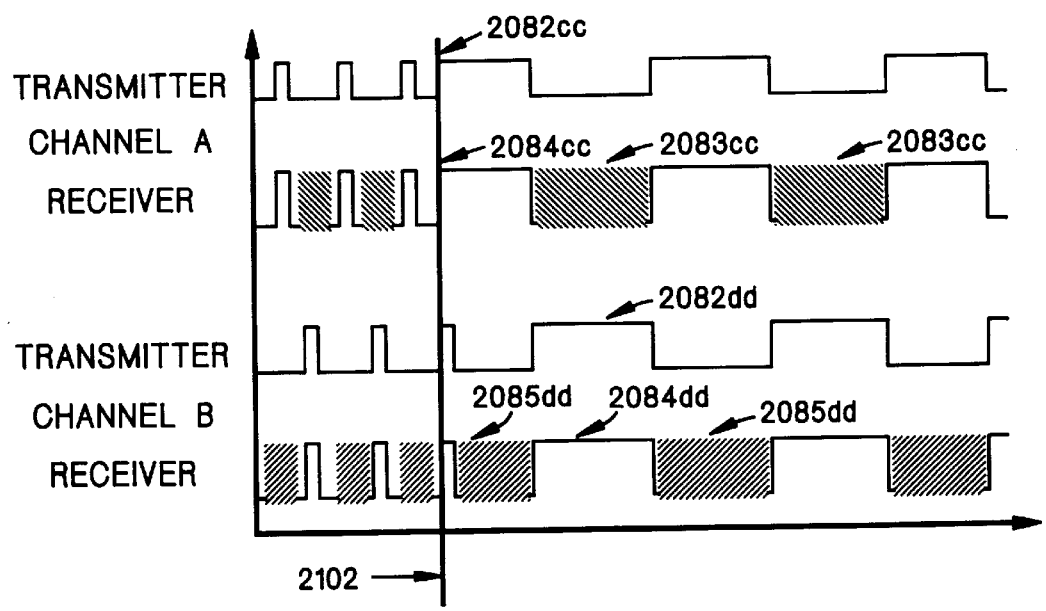
FIG. 62 shows the transmitter and receiver waveforms for each of the channels in FIG. 61.
Figure 63:
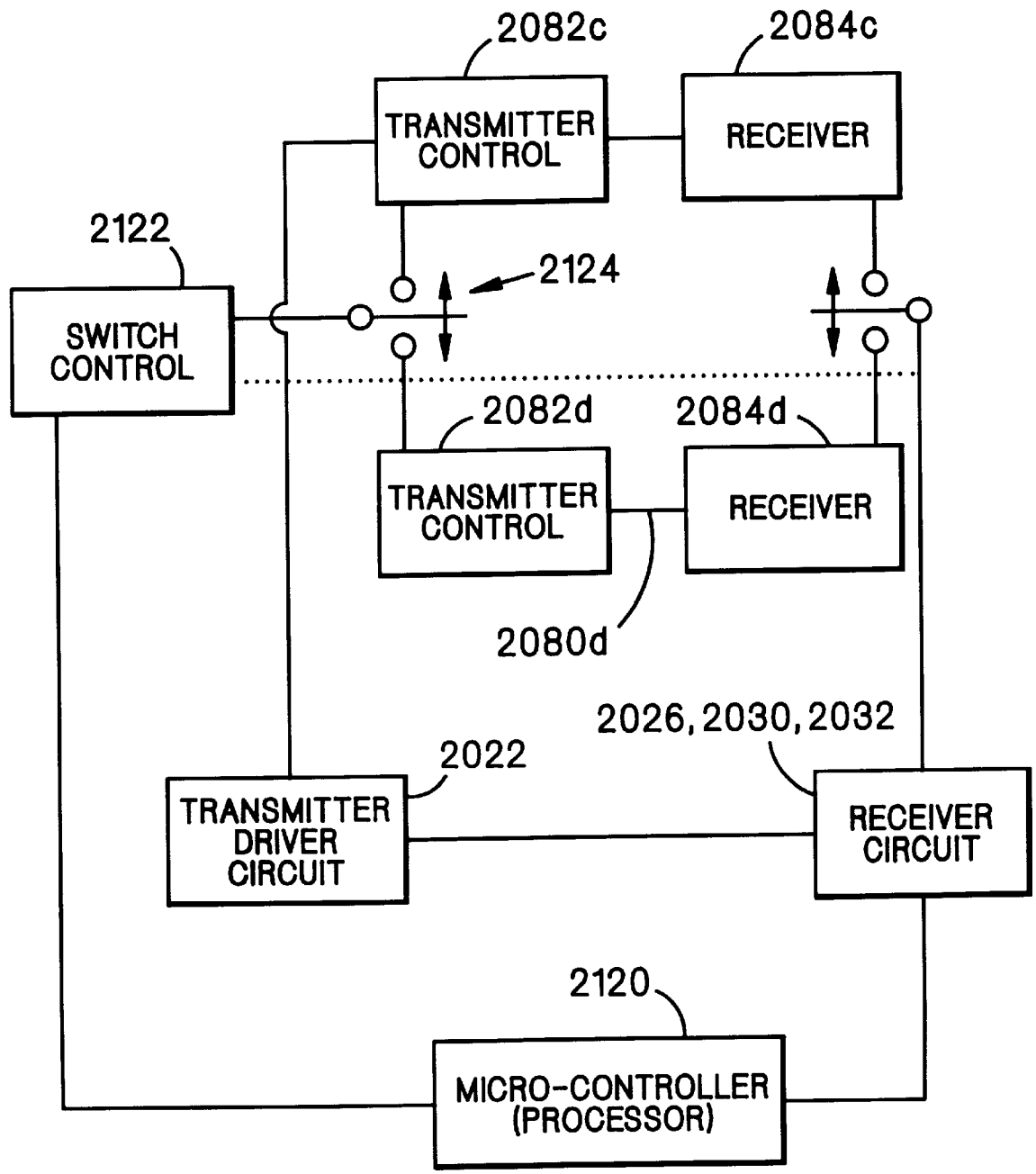
FIG. 63 is a schematic block diagram of a control circuit for operating the dual channel system of FIG. 61.

Alternatively, as shown in FIG. 61, a dual channel system may be constructed in which channel A and channel B provide energy beams 2080*c* and 2080*d* of the same frequency, but their operation is sequenced or multiplexed so that only one beam is on at a time. Thus transmitter 2082*c* sends out a series of pulses 2082*cc*, FIG. 62, which are received by receiver 2084*c* by the series of pulses 2084*cc*. Any difference between the received pulses 2084*cc* and the transmitted pulses 2082*cc* is an indication that an obstacle has been detected. The periods between the pulses, shown crosshatched at 2083*cc*, are ignored, because during these periods transmitter 2082*d* is generating pulses 2082*dd* and receiver 2084*d* is receiving a like series of pulses 2084*dd*. The crosshatched areas indicated at 2085*dd* are the periods during which the input to receiver 2084*d* is ignored, since they are occurring during the period of the pulses 2082*cc*, 2084*cc*. The timing diagram, FIG. 62, also shows the fail safe detection diagnostic operations. The active time period before time line 2102 indicates the active fail safe detection time interval. Before the vent closing operation, a diagnostic OFF/ON signal is send out from the transmitter. The receiver should correspondingly receive the same signal pattern as monitored by the processor 2120. Otherwise, a warning message is generated by processor 2120 and the automatic close-vent operation is blocked. This can be accomplished using a main controller such as microprocessor 2120, FIG. 63, which drives switch control 2122, operates switch 2124 to connect the transmitter generator 2022, FIG. 49, to switch 2124, and selects which of transmitters 2082*c* and 2082*d* is turned on in the alternating sequence. A second switch 2126 may be employed, also supervised by switch control 2122, so that the receiver circuits 2026, 2030, 2032 will not even see the signal from the other channel. Switch 2126 may also be used under control of microprocessor 2120, so that if an obstruction is indicated in one of the channels and not the other, indicating that the one channel is giving false readings, switch 2126 can be simply connected continuously to the still credible channel so that only outputs from that channel are processed for determination of whether a true obstruction has occurred.

Figure 64:
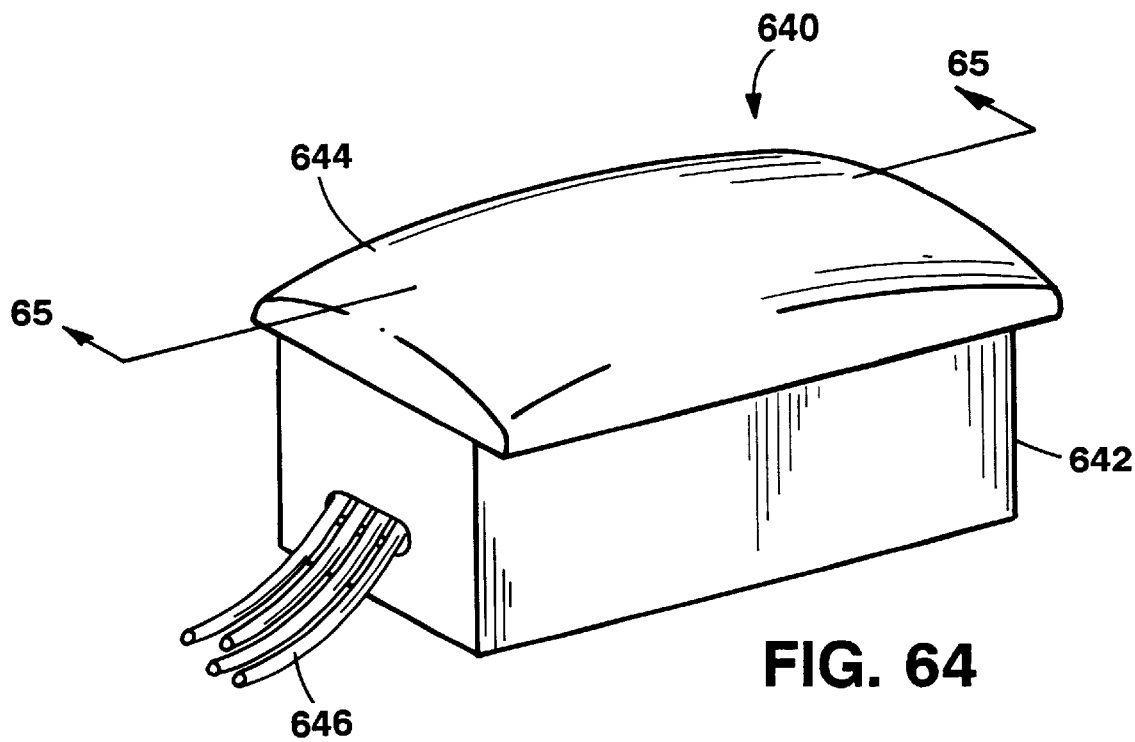
FIG. 64 is a perspective view of a self-contained, compact obstruction sensor.
Figure 65:
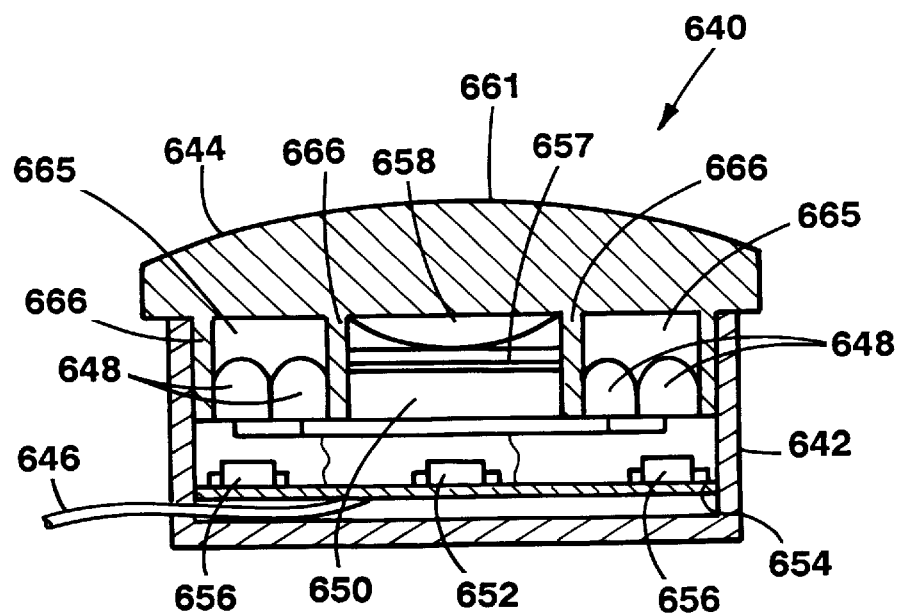
FIG. 65 is a cross sectional view of the sensor of FIG. 64, taken along line 65—65.

Other embodiments are within the following claims. For example, as illustrated in FIG. 64, a compact, self-contained obstruction detection unit 640 provides an obstruction detection output signal in response to an activation input signal. Obstruction detection unit 640 includes a housing 642 and a lens 644 that is shared by emitters and a receiver within the housing. Four wires 646 (electrical power, electrical ground, input, output) permit connection of obstruction detection unit 640 to a system such as a window control system in an automobile. Referring also to FIG. 65, obstruction detection unit 640, like unit 106 (described above with reference to FIGS. 9A–9C), includes four light emitting diodes 648 that function as emitters and a photo IC 650 that functions as a receiver. The diodes and photo IC, which operate as discussed above with respect to units 60, 64 and 106, are controlled by a processor 652 mounted on a circuit board 654 that is positioned in housing 642. The circuit board includes other electrical components 656 and is connected to the diodes and photo IC, and to wires 646. A plano convex lens 658 is positioned between photo IC 650 and lens 644, and a filter 657 is positioned between photo IC 650 and lens 658. In one implementation, the filter is a 950 nanometer bandpass filter.

Figures 66A, 66B:
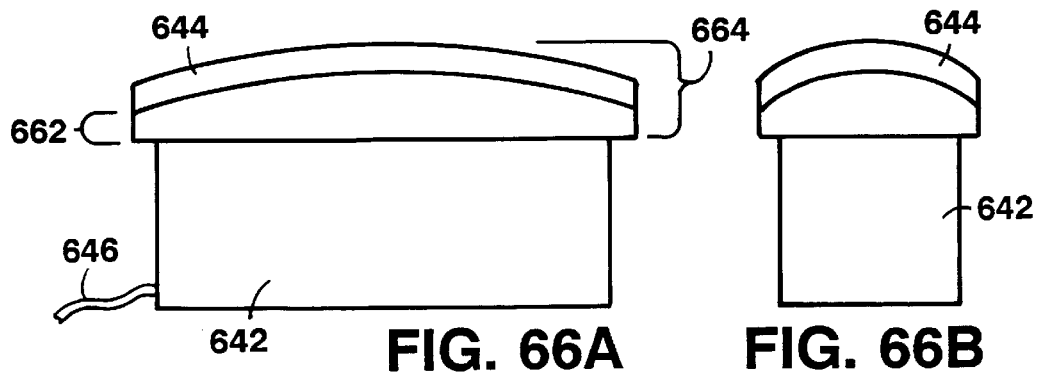
FIGS. 66A–66C are schematic views of the sensor of FIG. 64.
Figure 66C:
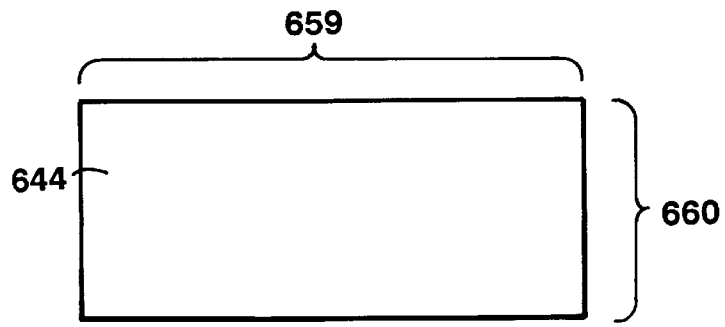

Referring also to FIGS. 66A–66C, the upper surface of lens 644 is generally rectangular in shape (FIG. 66C). To maximize the sensitivity of unit 640 to obstructions, lens 644 is shaped so that each vertical section along the long dimension 659 of the lens has an upper surface that conforms to the arc of a circle. (The surface 661 in FIG. 65 is an example of such an arc of a circle.) To concentrate the energy produced by diodes 648 into a relatively flat energy curtain, lens 644 is shaped so that each vertical section along the short dimension 660 of the lens has a sharper than circular upper surface, such as one that conforms with a parabola or an arc of the narrow dimension of an ellipse. In one example, lens 644 is fifty two millimeters long and twenty six millimeters wide, with the arcs along the long dimension corresponding to a circle having a radius of 102 milliemeters. Lens 644 has a minimum thickness 662 of 2.5 millimeters and a maximum thickness 664 of ten millimeters. Housing 642 is forty six millimeters long, twenty one millimeters wide and twenty two millimeters high.

Common lens 644 and plano convex lens 658 are shaped to optimize the performance of photo IC 650. The performance of diodes 648 is optimized by spacing the diodes 648 from lens 644 to leave an air gap 665 between the diodes and the lens and to focus the energy curtain produced by the diodes and the lens at a desired position. A spacing assembly 666 positions diodes 648, receiver 650 and lens 658 at their proper positions.

Lens 644 is formed from an epoxy resin by an pour casting process. First, diodes 648 and lens 658 are positioned in spacing assembly 666. The spacing assembly is then inverted and placed over a mold having the shape desired for lens 644. Finally, epoxy resin is injected into the mold. After the resin of the lens has set, the photo IC 650 is positioned in the spacing assembly, the diodes and photo IC are connected to the circuit board 654, and the entire assembly is positioned in the housing 642. To avoid air bubbles in the lens (which could reduce the performance thereof), the lens is formed under vacuum by placing the mold and the resin mixture in a bell jar vacuum. In one example, the lens is formed from Tra-Bond F114 Epoxy Adhesive, available from Tra-Con, Inc., and lens 658 is formed from the same material as lens 644.

Figure 67:
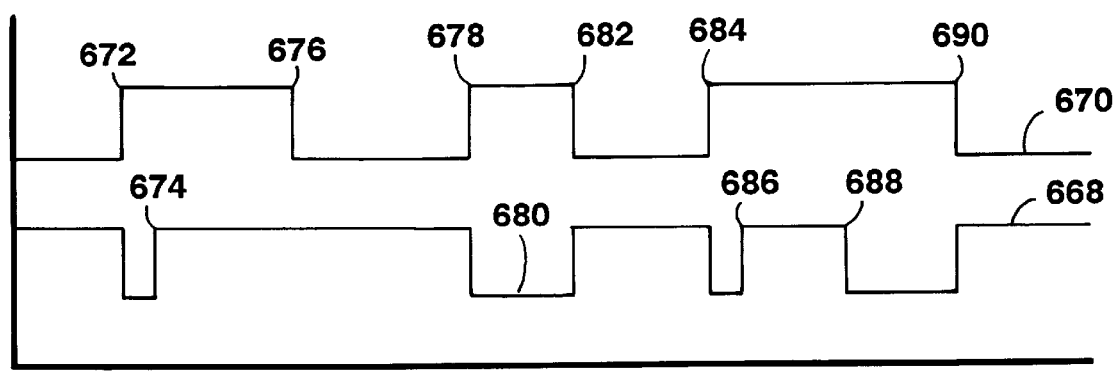
FIG. 67 is a timing diagram of signals related to the sensor of FIG. 64.

Referring to FIG. 67, obstruction detection unit 640 provides an obstruction detection output signal 668 in response to an activation input signal 670. When the input signal has a value corresponding to logical zero (i.e., zero volts), the output signal has a value corresponding to logical one (i.e., five volts). With this arrangement, it can be easily verified that unit 640 is properly connected to power.

At time 672, the input signal changes to a value corresponding to logical one. This activates unit 640, which responds by changing the output signal to a value corresponding to logical zero. At time 674, unit 640 determines that no obstruction is present and changes the output signal back to logical one. The difference between time 672 and time 674 is approximately fifty milliseconds. By changing the output signal to logical zero upon activation, unit 640 provides an affirmative indication that unit 640 has been activated in response to the transition in the input signal. Similarly, by changing the output signal to logical one when no obstruction is detected, unit 640 provides an affirmative indication that no obstruction is present.

Obstruction detection unit 640 continues to monitor for an obstruction until the input signal changes back to logical zero at time 676. Deactivation of unit 640 has no effect on the output signal, which remains at logical one.

At time 678, the input signal again changes to logical one and the output signal change to logical zero in response thereto. However, because an obstruction is present, the output signal remains at logical zero beyond time 680 (approximately fifty milliseconds after time 678). Thus, the presence of an obstruction is indicated by an output signal that remains at logical zero for more than fifty milliseconds. The output signal remains at logical zero until the input signal changes to logical zero at time 682, at which point the output signal changes to logical one. (If the detected obstruction had been removed prior to time 682, the output signal would have immediately changed to logical one.)

At time 684, the input signal changes to logical one, and unit 640 responds by changing the output signal to logical zero. At time 686, unit 640 determines that no obstruction is present and changes the output signal back to logical one. The output signal remains at logical one until unit 640 detects an obstruction at time 688 and changes the output signal to logical zero as an indication thereof. The output signal then remains at logical zero until the input signal changes to logical zero at time 690.

The circuit implemented on circuit board 654 is illustrated in FIG. 68. A voltage regulation circuit 692 converts a six volt voltage from wires 646 to a regulated five volt supply for use by processor 652 and other components. An input circuit 694 receives an input signal from one of wires 646 and supplies the signal to the processor. Similarly, an output circuit 696 receives an output signal from the processor and supplies the signal to one of wires 646.

Processor 652 activates photo diodes 648 by providing a signal 698 to a diode control circuit 700. Processor 652 ensures that the voltage supplied to the photo diodes does not vary with temperature by controlling the voltages supplied to various resistors in a voltage divider of a temperature compensation circuit 702. Processor 652 determines the temperature based on a signal supplied by a voltage divider 704 that includes a resistor 706 and a thermistor 708. The processor is also connected to a reset circuit 710 and a serial electrically erasable and programmable read only memory (EEPROM) 712.

Processor 652 is implemented using a Motorola MC68HC705P9 8-Bit microcontroller unit. The microcontroller includes four data ports. One bit of port A (PA3) is connected to the output circuit 696, another bit (PA2) supplies signal 698 to diode control circuit 700, four bits (PA4..PA7) are connected to resistors of temperature compensation circuit 702, and the remaining bits (PA0..PA1) are connected to the serial EEPROM 712. The three bits of serial I/O port B (Pb5 . . . PB7) are connected to the serial EEPROM. Two bits (PC0 . . . PC1) of analog port C are connected to resistors of temperature compensation circuit 702, one bit (PC5) is connected to photo IC 650, one bit (PC6) is connected to voltage divider 704, and the remaining four bits (PC2 . . . PC4 and PC7) are inactive. Port D is inactive.

Referring to FIG. 3, obstruction detection unit 640 may be substituted for obstruction detection system 52. In this case, the input activation signal substitutes for the driving signals 54 and the output signal substitutes for the detection signals 56. In addition, much of the processing performed by the controller 46 in the system 44 is performed by the processor 652 (FIG. 65). For example, with reference to FIG. 10, after responding to an input activation signal by setting the output signal to logical zero, the processor 652 activates the emitters 648 and determines whether the emitters 648 are operating correctly (step 128). The processor 652 activates the emitters 648 by sending a driving signal that includes a series of 38 kHz pulses that are frequency modulated on a train of lower frequency pulses. Processor 652 then determines whether the emitters are operating correctly by monitoring a detection signal produced by photo IC 650. If the emitters are operating correctly (step 130), the controller 652 monitors the detection signal and determines t, the length of a detection pulse (step 132). The length of a detection pulse is related to the intensity of energy incident on photo IC 650, and, because obstructions reflect energy toward photo IC 650, increases when an obstruction is present. Thus, processor 652 detects obstructions by comparing t to T', an initialization value related to the length of a detection pulse produced by photo IC 650 when no obstructions are present (step 134). T' is generated in an initialization procedure as discussed above with respect to system 44.

If processor 652 determines that t is greater than T' (step 134), this indicates that an obstruction might be present, and processor 652 responds by incrementing a miscompare count (step 136). If the incremented miscompare count is greater than two (step 138), processor 652 determines that an obstruction is actually present and responds by maintaining the output signal at logical zero (or setting the output signal to logical zero if the output is at logical one). The processor 652 also maintains the output signal at logical zero if the emitters are not functioning correctly. If the processor 652 determines that no obstruction is present, the processor sets the output signal to logical one.

Obstruction detection unit 640 may be used in applications other than the automobile application discussed above. For example, it could be used to detect obstructions in or around a machine tool. In addition, it could be positioned in a window opening or doorway of a building to detect intruders or near a doorway to control an automatic door. A power enhanced version could be positioned to produce an energy curtain covering the top of a swimming pool and to thereby detect unauthorized or accidental entry into the pool.

As previously discussed, appendixes A and B, incorporated by reference, are assembly language software for implementing, respectively, an automatic venting system and an automatic sunroof system. The appendixes contain material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

What is claimed is:

1. Apparatus for closing a power driven vent within an opening, the vent including a first closing edge that moves as the vent is closed and the openining including a second closing edge that is contacted by the first closing edge when the vent is in a fully closed position, the apparatus comprising:
   a housing,
   an emitter held by the houing and configured to emit energy across an area defined by the opening,
   a detector held by the housing and configured to detect energy from the emitter reflected by an obstruction without requiring contact between the obstruction and the vent and to deliver a detection signal in response to detection of reflected energy from the emitter, and
   a controller connected to the detector for receiving the detection signal and delivering an output signal indicative of whether an obstruction is present in the opening,
   wherein the vent comprises a window, and the housing holding both the emitter and the detector is positioned in a lower front corner of the opening.

2. The apparatus of claim 1, wherein
   the detector produces pulses having durations related to the intensity of the energy received by the detector, and
   the detector delivers the detection signal when the durations of a predetermined number of consecutive pulses exceed a predetermined value.

3. The apparatus of claim 1, wherein the emitter emits energy modulated at a first modulation frequency and wherein the detector includes a band pass filter that passes energy modulated at the first modulation frequency.

4. The apparatus of claim 3, wherein the emitter emits energy having a first wavelength and wherein the detector includes a second band pass filter that passes energy having the first wavelength.

5. The apparatus of claim 1, wherein the emitter includes a lens that emits the energy signal as a fan-shaped energy curtain.

6. The apparatus of claim 1, further comprising circuitry for activating the detector and the emitter only when the vent is closing.

7. The apparatus of claim 1, wherein the detector produces pulses having durations related to the intensity of the energy received by the detector.

8. The apparatus of claim 7, wherein the detector delivers the detection signal when the duration of at least one pulse exceeds a predetermined value.

9. The apparatus of claim 8, wherein the predetermined value is related to the duration of a pulse when no obstruction is present.

10. The apparatus of claim 9, wherein the predetermined value is related to the average duration of pulses produced when no obstruction is present and the vent moves between an opened position and a closed position.

11. The apparatus of claim 10, wherein the predetermined value includes a correction factor that accounts for variations in the duration of pulses produced when no obstruction is present.

12. The apparatus of claim 1, wherein the emitter is operable to emit energy as a fan-shaped beam.

13. The apparatus of claim 12, wherein the emitter comprises a lens that is shaped to produce the fan-shaped beam.

14. The apparatus of claim 1, wherein the emitter comprises a light emitting diode.

15. The apparatus of claim 14, wherein the emitter comprises multiple light emitting diodes.

16. The apparatus of claim 14, wherein the light emitting diode is spaced from the lens.

17. The apparatus of claim 1, wherein the emitter and the detector share a common lens.

18. The apparatus of claim 17, wherein vertical sections of the common lens in a first dimension have upper surfaces that conform to circular arcs and vertical sections of the common lens in a second dimension have curved upper surfaces that do not conform to circular arcs.

19. The apparatus of claim 18, wherein the common lens has a flat lower surface.

20. The apparatus of claim 17, wherein the common lens comprises epoxy resin.

21. The apparatus of claim 20, wherein the detector further comprises a plano-convex lens formed from the epoxy resin.

22. The apparatus of claim 1, wherein the detector further comprises a plano-convex lens having a planar side in contact with the common lens.

23. The apparatus of claim 1, wherein the detector further comprises a photo IC.

24. The apparatus of claim 23, wherein:

the emitter and the detector share a common lens, and the detector farther comprises a plano-convex lens having a planar side in contact with the common lens and a filter positioned between the photo IC and a convex side of the plano-convex lens.

25. The apparatus of claim 1, wherein the controller is operable to activate the emitter in response to an input signal.

26. The apparatus of claim 1, wherein the controller is operable to change a state of the output signal from a first state to a second state in response to an input signal.

27. The apparatus of claim 1, wherein the controller is operable to change the state of the output signal from the second state to the first state when no obstruction is detected and to maintain the state of the output signal in the second state when an obstruction is detected.

28. The apparatus of claim 1, wherein the controller is operable to deliver the output signal along only a single wire.

29. The apparatus of claim 28, wherein the controller is operable to receive an input signal along only a single wire.

30. The apparatus of claim 29, further comprising an external interface that comprises an input wire and an output wire.

31. The apparatus of claim 30, wherein the external interface further comprises a power wire and a ground wire, and wherein the input wire, output wire, power wire and ground wire are the only wires that extend externally from the housing.

32. The apparatus of claim 1, further comprising:

an input connection and an output connection accessible from outside the housing, wherein the controller is held by the housing and connected to the emitter, the detector, the input connection, and the output connection, and the controller has circuitry that responds to a signal at the input connection by analyzing signals from the detector and providing a signal at the output connection indicative of whether an object is present in the opening.

33. Apparatus for closing a power driven vent within an opening, comprising:

an automatic vent actuator for automatically activating the power driven vent, a manual vent actuator for manually activating the power driven vent, a detector configured to detect an obstruction in the opening without requiring contact between the obstruction and the vent and to deliver a detection signal when an obstruction is detected, the detector being activated to produce the detection signal only when the power driven vent is activated by the automatic vent actuator, a controller connected to the detector for receiving the detection signal, and a manual switch that, while pressed, enabes the manual vent actuator, wherein:

when the manual switch is pressed for less than a predetermined time, the controller enables the automatic vent actuator, and when the power driven vent is activated by the automatic vent actuator and the detection signal is received, the controller deactivates the vent.

34. The apparatus of claim 33, wherein the controller disables the manual vent actuator during the predetermined time to prevent activation of the power driven vent until the controller determines whether to enable the automatic vent actuator.

35. Apparatus for closing a power driven vent within an opening, the vent including a first closing edge that moves as the vent is closed and the opening including a second closing edge that is contacted by the first closing edge when the vent is in a fully closed position, the apparatus comprising:

an emitter that emits energy, a detector configured to detect energy from the emitter reflected by an obstruction without requiring contact between the obstruction and the vent and to deliver a detection signal in response to detection of reflected energy from the emitter, a controller connected to the detector for receiving the detection signal and delivering an output signal indicative of whether an obstruction is present in the opening, circuit connected to activate the detector and the emitter only when the vent is closing, and to verify that the emitter is emitting energy immediately after activating the emitter.

36. The apparatus of claim 35, wherein the detector produces pulses having durations related to the intensity of the energy received by the detector, and the detector delivers the detection signal when the duration of one pulse exceeds a predetermined value.

37. The apparatus of claim 35, wherein the detector and the emitter share a common lens.

38. The apparatus of claim 35, wherein the detector produces pulses having durations related to the intensity of the energy received by the detector.

39. The apparatus of claim 35, wherein the emitter is operable to emit energy as a fan-shaped beam.

40. The apparatus of claim 35, wherein the emitter comprises a light emitting diode.

41. The apparatus of claim 35, wherein the emitter and the detector share a common lens.

42. The apparatus of claim 35, wherein the detector further comprises a photo IC.

43. The apparatus of claim 35, wherein the controller is operable to activate the emitter in response to an input signal.

44. The apparatus of claim 35, wherein the controller is operable to change a state of the output signal from a first state to a second state in response to an input signal.

45. The apparatus of claim 35, wherein the controller is operable to deliver the output signal along only a single wire.

46. A sensor for detecting an obstruction in an opening, comprising:

an emitter operable to emit energy, a detector operable to detect energy emitted by the emitter and to deliver a detection signal in response to an increase in detected emitter energy, control circuitry connected to the emitter and detector, the control circuitry being operable to control the emitter and the detector and to produce an output signal indicative of the detection of an obstruction in the opening in response to the detection signal, and a housing in which the emitter, detector and control circuitry are held, wherein the emitter and the detector share a common lens, and vertical sections of the common lens in a first dimension have upper surfaces that conform to circular arcs and vertical sections of the common lens in a second dimension have curved upper surfaces that do not conform to circular arcs.

47. The sensor of claim 46, wherein the housing is sized and configured for positioning in an opening of an automobile.

48. The sensor of claim 47, wherein the housing is sized and configured for positioning in a window opening of an automobile.

49. The sensor of claim 47, wherein the housing is sized and configured for positioning in a door opening of an automobile.

50. The sensor of claim 46, wherein the emitter is operable to emit energy as a fan-shaped beam.

51. The sensor of claim 46, wherein the emitter comprises a light emitting diode.

52. The sensor of claim 46, wherein the detector further comprises a photo IC.

\* \* \* \* \*